US012624319B2

(12) United States Patent
Sivik et al.

(10) Patent No.: US 12,624,319 B2
(45) Date of Patent: May 12, 2026

(54) WATER DISINTEGRABLE, FOAM PRODUCING ARTICLE FOR USE AS A TOILET BOWL CLEANER

(71) Applicant: The Procter & Gamble Company, Cincinnati, OH (US)

(72) Inventors: Mark Robert Sivik, Mason, OH (US); Alan Edward Sherry, Mason, OH (US); Deepak Ahirwal, Brussels (BE); Frank William Denome, Cincinnati, OH (US); Zaiyou Liu, Cincinnati, OH (US); Kerry Andrew Vetter, Cincinnati, OH (US); Yousef Georges Aouad, Cincinnati, OH (US); Min Mao, Deerfield Township, OH (US)

(73) Assignee: The Procter & Gamble Company, Cincinnati, OH (US)

(*) Notice: Subject to any disclaimer, the term of this patent is extended or adjusted under 35 U.S.C. 154(b) by 509 days.

(21) Appl. No.: 16/713,130

(22) Filed: Dec. 13, 2019

(65) Prior Publication Data

US 2020/0190446 A1 Jun. 18, 2020

Related U.S. Application Data

(60) Provisional application No. 62/782,343, filed on Dec. 19, 2018, provisional application No. 62/779,538, filed on Dec. 14, 2018.

(51) Int. Cl.

| | |
|---|---|
| ***C11D 1/94*** | (2006.01) |
| ***B08B 3/00*** | (2006.01) |
| ***B08B 9/00*** | (2006.01) |
| ***C11D 1/83*** | (2006.01) |
| ***C11D 3/00*** | (2006.01) |
| ***C11D 3/10*** | (2006.01) |
| ***C11D 3/12*** | (2006.01) |
| ***C11D 3/395*** | (2006.01) |
| ***C11D 17/04*** | (2006.01) |
| *C11D 1/14* | (2006.01) |
| *C11D 1/75* | (2006.01) |

(52) U.S. Cl.

CPC ............ *C11D 17/044* (2013.01); *B08B 3/003* (2013.01); *B08B 9/00* (2013.01); *C11D 1/83* (2013.01); *C11D 3/0094* (2013.01); *C11D 3/10* (2013.01); *C11D 3/124* (2013.01); *C11D 3/128* (2013.01); *C11D 3/3953* (2013.01); *C11D 3/3955* (2013.01); *C11D 1/143* (2013.01); *C11D 1/146* (2013.01); *C11D 1/75* (2013.01); *C11D 2111/14* (2024.01)

(58) Field of Classification Search

CPC .. C11D 1/02; C11D 1/12; C11D 1/143; C11D 1/146; C11D 1/37; C11D 1/90; C11D 1/94; C11D 3/0052; C11D 3/042; C11D 3/044; C11D 3/10; C11D 3/50; C11D 3/505; C11D 3/507; C11D 7/08; C11D 9/12; C11D 9/442; C11D 17/02; C11D 17/042; C11D 2111/14; C11D 2111/42

See application file for complete search history.

(56) References Cited

U.S. PATENT DOCUMENTS

| | | | |
|---|---|---|---|
| 3,066,347 | A | 12/1962 | Vosbikian et al. |
| 3,097,787 | A | 7/1963 | Schur |
| 3,341,349 | A | 9/1967 | Feeney et al. |
| 3,823,816 | A | 7/1974 | Controulis et al. |
| 3,994,771 | A | 11/1976 | Morgan, Jr. et al. |
| 4,155,971 | A | 5/1979 | Wysong |
| 4,188,304 | A | 2/1980 | Clarke et al. |
| 4,410,441 | A | 10/1983 | Davies et al. |
| 4,555,354 | A | 11/1985 | Clarke |
| 4,588,630 | A | 5/1986 | Shimalla |
| 4,637,859 | A | 1/1987 | Trokhan |
| 4,741,941 | A | 5/1988 | Englebert |
| 4,762,738 | A | 8/1988 | Keyes et al. |
| 4,776,455 | A | 10/1988 | Anderson et al. |
| 4,806,261 | A | 2/1989 | Ciallella et al. |
| 4,820,435 | A | 4/1989 | Zafiroglu |
| 4,839,076 | A | 6/1989 | Willman et al. |
| 4,876,023 | A | 10/1989 | Dickenson |
| 5,053,270 | A | 10/1991 | Mack |
| 5,160,654 | A | 11/1992 | Falou et al. |
| 5,342,335 | A | 8/1994 | Rhim |
| 5,518,730 | A | 5/1996 | Fuisz |
| 5,534,178 | A | 7/1996 | Bailly et al. |
| 5,665,439 | A | 9/1997 | Andersen |
| 5,780,418 | A | 7/1998 | Niinaka |

(Continued)

FOREIGN PATENT DOCUMENTS

| | | | |
|---|---|---|---|
| CN | 1724725 | A | 1/2006 |
| CN | 103556250 | A | 2/2014 |

(Continued)

OTHER PUBLICATIONS

All Office Actions U.S. Appl. No. 16/713,137.
International Search Report and Written Opinion; Application Ser. No. PCT/US2019/066120; dated Mar. 17, 2020, 11 pages.
U.S. Appl. No. 16/713,137, filed Dec. 13, 2019, Dinah Achola Nyangiro, et al.
"Merriam Webster", Online retrieved from "https://www.merriam-webster.com/dictionary/handle" ;2020; 02 pages.
Vaportec, "Advantages of Continuous Flow Production", dated 2016; pp. 1-5.
All Office Actions; U.S. Appl. No. 14/476,823, filed on Sep. 4, 2014.
All Office Actions; U.S. Appl. No. 16/250,455, filed on Jan. 17, 2019.

(Continued)

*Primary Examiner* — Charles I Boyer
(74) *Attorney, Agent, or Firm* — James E. Oehlenschlager

(57) ABSTRACT

Water disintegrable, foam producing articles comprise a soluble fibrous structure encasing a particulate effervescent cleaning composition comprising an effervescent agent, a particulate foaming surfactant, an effervescent activator, optionally an effervescent protection agent, and optionally an active agent. Methods of using the articles to clean surfaces are also provided.

6 Claims, 9 Drawing Sheets

(56) References Cited

U.S. PATENT DOCUMENTS 5,801,141 A 9/1998 Steber et al.
5,958,334 A * 9/1999 Haddon .................. E03D 9/032 422/5
6,270,623 B1 8/2001 Goda et al.
6,486,095 B1 11/2002 Fujita et al.
6,559,081 B1 5/2003 Erspamer et al.
6,713,441 B1 * 3/2004 DeSenna .............. C11D 3/0052 422/5
6,793,856 B2 9/2004 Hartmann et al.
6,818,606 B1 11/2004 Hanada
6,955,850 B1 10/2005 Cabell et al.
7,226,899 B2 6/2007 Cole
7,285,520 B2 10/2007 Krzysik
7,595,290 B2 * 9/2009 Pounds ................ C11D 17/044 510/297
8,250,837 B2 8/2012 Catlin et al.
8,551,929 B2 10/2013 Graham et al.
8,754,022 B2 * 6/2014 Zhang .................. C11D 3/2082 510/117
8,980,816 B2 3/2015 Dreher
9,005,510 B2 4/2015 Ishaque
9,139,802 B2 9/2015 Weisman et al.
10,376,125 B2 8/2019 Dreher et al.
10,526,570 B2 1/2020 Dreher et al.
10,723,983 B2 7/2020 Dreher et al.
10,792,229 B2 10/2020 Pratt et al.
11,118,033 B2 9/2021 Heinzman
11,697,904 B2 7/2023 Pratt et al.
11,697,905 B2 7/2023 Glassmeyer et al.
11,697,906 B2 7/2023 Weisman et al.
2002/0025215 A1 2/2002 Duden et al.
2002/0077264 A1 6/2002 Roberts et al.
2002/0094942 A1 7/2002 Danneels
2002/0132746 A1 * 9/2002 Desenna ............ C11D 17/0056 510/191
2002/0169092 A1 11/2002 Alexandre et al.
2003/0049326 A1 3/2003 Nimni
2003/0080150 A1 * 5/2003 Cowan ................... A61K 8/365 222/107
2003/0203196 A1 10/2003 Trokhan
2004/0144681 A1 7/2004 Wiedemann et al.
2005/0217045 A1 10/2005 Minkler et al.
2005/0220828 A1 10/2005 Ullom et al.
2005/0250667 A1 * 11/2005 Quellet ................ C11D 3/0052 510/444
2005/0282725 A1 * 12/2005 Dasque ................ C11D 17/043 510/446
2006/0005333 A1 1/2006 Catalfamo et al.
2006/0037724 A1 2/2006 Akai et al.
2006/0075253 A1 4/2006 Sonkin et al.
2006/0213801 A1 9/2006 Karaoren
2006/0243630 A1 11/2006 Bourgoin et al.
2007/0045905 A1 3/2007 Venturino et al.
2007/0071537 A1 3/2007 Reddy et al.
2008/0004198 A1 1/2008 Joinson
2008/0132438 A1 6/2008 Hoffman et al.
2008/0160286 A1 7/2008 Asrar et al.
2008/0177241 A1 7/2008 Hasse et al.
2008/0242572 A1 10/2008 Icht
2009/0181587 A1 7/2009 Kang
2009/0214140 A1 8/2009 Jacobson
2009/0287034 A1 11/2009 Siggelkow
2009/0306277 A1 12/2009 Goenner et al.
2010/0018641 A1 1/2010 Branham
2010/0029377 A1 2/2010 Canterbury et al.
2010/0115708 A1 * 5/2010 Caswell ............... C11D 17/042 510/293
2010/0158987 A1 6/2010 Lehrke
2010/0294678 A1 11/2010 Arnold
2010/0297377 A1 11/2010 Mcneil et al.
2011/0028373 A1 * 2/2011 Fossum .................. C11D 17/00 510/236
2011/0033509 A1 2/2011 Simon
2011/0129510 A1 6/2011 Liebmann
2011/0135587 A1 6/2011 Kinoshita et al.
2011/0207646 A1 8/2011 Baez et al.
2011/0250256 A1 10/2011 Hyun-oh et al.
2011/0301070 A1 12/2011 Ochomogo
2012/0021026 A1 1/2012 Glenn, Jr.
2012/0027838 A1 2/2012 Gordon et al.
2012/0036733 A1 2/2012 Dehn
2012/0052036 A1 3/2012 Glenn, Jr.
2012/0052037 A1 3/2012 Sivik et al.
2012/0053103 A1 3/2012 Sivik
2012/0053106 A1 3/2012 Labeque
2012/0053107 A1 3/2012 Labeque et al.
2012/0053108 A1 3/2012 Glenn, Jr.
2012/0121316 A1 5/2012 Brown et al.
2012/0121669 A1 5/2012 Fontana et al.
2012/0121674 A1 5/2012 Pedoja
2012/0237576 A1 9/2012 Gordon
2013/0017421 A1 1/2013 Onnerud et al.
2013/0053293 A1 2/2013 Dituro et al.
2013/0142852 A1 6/2013 Tojo et al.
2013/0167305 A1 7/2013 Weisman et al.
2013/0171421 A1 7/2013 Weisman
2013/0172226 A1 7/2013 Dreher et al.
2013/0216789 A1 8/2013 Kraus et al.
2013/0256182 A1 10/2013 Petrovicova et al.
2013/0259918 A1 10/2013 Lehrke
2013/0273277 A1 10/2013 Lee
2013/0292273 A1 11/2013 Sekiba et al.
2013/0302566 A1 11/2013 Barnholtz et al.
2014/0086965 A1 3/2014 Dihora
2014/0228194 A1 8/2014 Kepinski et al.
2014/0238889 A1 8/2014 Sunder et al.
2014/0271848 A1 9/2014 Guido et al.
2014/0336029 A1 11/2014 Mirle et al.
2014/0356521 A1 12/2014 Oku et al.
2014/0371411 A1 12/2014 Dipietro
2015/0004197 A1 1/2015 Doerr et al.
2015/0071572 A1 3/2015 Dreher et al.
2015/0125574 A1 5/2015 Arent et al.
2015/0136636 A1 5/2015 Sunder et al.
2015/0136637 A1 5/2015 Meier et al.
2015/0158645 A1 6/2015 Meier
2015/0159082 A1 6/2015 Lee et al.
2015/0190543 A1 7/2015 Marshall et al.
2016/0101026 A1 4/2016 Pratt et al.
2016/0101204 A1 4/2016 Lynch et al.
2016/0122117 A1 5/2016 Moore et al.
2016/0251131 A1 9/2016 Edwards
2016/0251148 A1 9/2016 Edwards
2016/0258083 A1 9/2016 Weisman et al.
2016/0355950 A1 12/2016 Young et al.
2016/0374906 A1 12/2016 Sivik
2017/0233175 A1 8/2017 Keuleers et al.
2017/0275563 A1 * 9/2017 Federle .................... C11D 3/48
2017/0342617 A1 11/2017 Castillo
2017/0362124 A1 12/2017 Sang et al.
2018/0105766 A1 * 4/2018 Caparrós Casco .......................... C11D 17/0073
2018/0216285 A1 8/2018 Pratt et al.
2018/0216286 A1 8/2018 Glassmeyer
2018/0216287 A1 8/2018 Weisman
2018/0216288 A1 8/2018 Weisman et al.
2018/0362905 A1 * 12/2018 Catlin .................. C11D 17/044
2019/0233781 A1 8/2019 Huang et al.
2019/0233784 A1 8/2019 Sivik
2019/0233970 A1 8/2019 Reed
2019/0233974 A1 8/2019 Reed
2020/0102524 A1 4/2020 Dreher et al.
2020/0115833 A1 4/2020 Joseph et al.
2023/0058562 A1 2/2023 Weisman et al.
2023/0304216 A1 9/2023 Pratt et al.
2023/0313445 A1 10/2023 Glassmeyer et al.
2023/0357984 A1 11/2023 Weisman et al.

FOREIGN PATENT DOCUMENTS

DE 202008007644 U1 10/2008
DE 202009017112 U1 4/2010
EP 0095335 A1 11/1983

(56) References Cited

FOREIGN PATENT DOCUMENTS

| | | | |
|---|---|---|---|
| EP | 0178029 | A2 | 4/1986 |
| EP | 0293139 | A2 | 11/1988 |
| EP | 0904933 | A2 | 3/1999 |
| EP | 1543763 | A1 | 6/2005 |
| EP | 2003239 | A1 | 12/2008 |
| EP | 2088187 | A1 | 8/2009 |
| EP | 3549758 | A1 | 10/2019 |
| GB | 1473147 | A | 5/1977 |
| GB | 2254857 | A | 10/1992 |
| JP | S61231210 | A | 10/1986 |
| JP | HO1292185 | A | 11/1989 |
| JP | H0453900 | A | 2/1992 |
| JP | H06228876 | A | 8/1994 |
| JP | H07329983 | A | 12/1995 |
| JP | H0940023 | A | 2/1997 |
| JP | H09216809 | A | 8/1997 |
| JP | H108098 | A | 1/1998 |
| JP | H1072600 | A | 3/1998 |
| JP | H11206661 | A | 8/1999 |
| JP | H11335303 | A | 12/1999 |
| JP | 2000248466 | A | 9/2000 |
| JP | 2000290899 | A | 10/2000 |
| JP | 2001146629 | A | 5/2001 |
| JP | 2004075672 | A | 3/2004 |
| JP | 2005504895 | A | 2/2005 |
| JP | 2006109984 | A | 4/2006 |
| JP | 2008155566 | A | 7/2008 |
| JP | 2012082568 | A | 4/2012 |
| JP | 2012112052 | A | 6/2012 |
| JP | 2017149695 | A | 8/2017 |
| KR | 20100089367 | A | 8/2010 |
| KR | 20110017263 | A | 2/2011 |
| WO | 9220594 | A1 | 11/1992 |
| WO | 9315701 | A1 | 8/1993 |
| WO | 9516470 | A1 | 6/1995 |
| WO | 9720098 | A1 | 6/1997 |
| WO | 0010539 | A1 | 3/2000 |
| WO | 0022218 | A1 | 4/2000 |
| WO | WO 2002/56728 | A1 | 7/2002 |
| WO | 03044153 | A1 | 5/2003 |
| WO | 03084836 | A1 | 10/2003 |
| WO | 2005035857 | A3 | 11/2005 |
| WO | WO 2006/136771 | A1 | 12/2006 |
| WO | 2007090818 | A1 | 8/2007 |
| WO | 2008020246 | * | 2/2008 |
| WO | 2008020246 | A2 | 2/2008 |
| WO | 2010065683 | A1 | 6/2010 |
| WO | 2010065684 | A1 | 6/2010 |
| WO | 2011053677 | A1 | 5/2011 |
| WO | 2011153023 | A1 | 12/2011 |
| WO | 2012003316 | A1 | 1/2012 |
| WO | 2012003351 | A2 | 1/2012 |
| WO | 2012003360 | A2 | 1/2012 |
| WO | 2012003365 | A1 | 1/2012 |
| WO | 2013103626 | A1 | 7/2013 |
| WO | 2013103629 | A1 | 7/2013 |
| WO | 2013103630 | A1 | 7/2013 |
| WO | 2013126531 | A1 | 8/2013 |
| WO | 2016057353 | A1 | 4/2016 |
| WO | 2016057376 | A1 | 4/2016 |
| WO | 2018/140472 | * | 8/2018 |
| WO | 2018140432 | A1 | 8/2018 |
| WO | 2018140472 | A1 | 8/2018 |
| WO | 2018140669 | A1 | 8/2018 |
| WO | 2019147523 | A1 | 8/2019 |
| WO | 2020123888 | A1 | 6/2020 |

OTHER PUBLICATIONS

All Office Actions; U.S. Appl. No. 15/877,585, filed on Jan. 23, 2018.
All Office Actions; U.S. Appl. No. 15/877,593, filed on Jan. 23, 2018.
All Office Actions; U.S. Appl. No. 15/877,602, filed on Jan. 23, 2018.
All Office Actions; U.S. Appl. No. 16/702,663, filed on Dec. 4, 2019.
All Office Actions; U.S. Appl. No. 18/203,871, filed on May 31, 2023.
All Office Actions; U.S. Appl. No. 18/203,895, filed on May 31, 2023.
All Office Actions; U.S. Appl. No. 18/203,885, filed on May 31, 2023.
Anonymous, "Aversive-flacored Inkjet and laserjet printing fabric(s) to prevent injury to children", Research Disclosure, Mason Publications, Hamshire, GB, vol. 434, No. 35, dated Jun. 1, 2000, 2 pages.
Collins Dictionary (https://www.collinsdictionary.com/dictionary/english/ply), page visited on Oct. 4, 2021 ). (Year: 2021).
Database WPI Week 199002, Thomson Scientific, London, GB; AN 1990-011767, XP002757711, 2 pages.
Database WPI Week 199437 Thomson Scientific , London, GB; AN 1994-300331, XP002757712, 2 pages.
Database WPI Week 200067, Thomson Scientific , London, GB; AN 2000-682013, XPO02757716 ; 3 pages.
Database WPI Week 200148, Thomson Scientific, London, GB;AN 2001-446066, XP002757710; 2 pages.
Database WPI Week 201079, Thomson Scientific , London, GB; AN 2010-K40521, XP002757714; 2 pages.
Database WPI Week 201156 Thomson Scientific , London, GB; AN 2011-C10272, XPO02757713; 1 pages.
Database WPI Week 201242, Thomson Scientific , London, GB; AN 2012-G86009, XP002757715; 2 pages.
Lewis K, An assessment of four solvents for the recovery of 2-chlorobenzylidenemalononitrile and capsaicins from "CS" and "Pepper" type lachrymator sprays, and an examination of their persistence on cotton fabric. J Forensic Sci 2001 ; vol. 46, No. 2, pp. 352-355.
All Office Actions; U.S. Appl. No. 18/751,747, filed on Jun. 24, 2024.
All Office Actions; U.S. Appl. No. 18/751,784, filed on Jun. 24, 2024.
All Office Actions; U.S. Appl. No. 18/751,942, filed on Jun. 24, 2024.
U.S. Appl. No. 18/751,747, filed on Jun. 24, 2024, to Stephen Robert Glassmeyer et al.
U.S. Appl. No. 18/751,784, filed on Jun. 24, 2024, to Paul Thomas Weisman et al.
U.S. Appl. No. 18/751,942, filed on Jun. 24, 2024, to Michael Sean Pratt et al.
All Office Actions; U.S. Appl. No. 17/392,327, filed on Aug. 3, 2021.
All Office Actions: U.S. Appl. No. 19/027,332, filed on Jan. 17, 2025.
U.S. Appl. No. 19/027,332, filed on Jan. 17, 2025, Andreas Josef Dreher et al.

* cited by examiner

WATER DISINTEGRABLE, FOAM PRODUCING ARTICLE FOR USE AS A TOILET BOWL CLEANER

TECHNICAL FIELD

The present invention relates to a water disintegrable, foam producing article comprising a soluble fibrous structure encasing a particulate effervescent cleaning composition comprising an effervescent agent, a particulate foaming surfactant, an effervescent activator, optionally an effervescent protecting agent, and optionally an active agent.

BACKGROUND OF THE INVENTION

Compositions for cleaning household surfaces, such as hard surfaces and toilets, are well known in the art. Many such compositions are liquid compositions contained in relatively large bottles which must be dispensed onto the surface being cleaned or dispensed into a vessel, such as a bucket, and diluted with water to form a treatment composition which is then applied to the surface. This can be inconvenient for the consumer and the liquid composition can accumulate on the dispensing orifice of the bottle which can be messy, resulting in the consumer having to wipe the dispensing orifice to clean away residual liquid composition. Also, such relatively large bottles can be inconvenient to carry around the home and store in household cabinets or on shelves.

In addition, many consumers today elect to purchase cleaning products online and have such products shipped directly to the consumer's home. Such liquid cleaning compositions may have a tendency to leak from their bottles, creating a mess within the shipping containers used to ship the product to the consumer's home. Liquid cleaning compositions also tend to comprise a relatively large amount of water which increases the shipping weight and volume of the product being shipped thereby increasing shipping costs.

Consumers of compositions for cleaning household surfaces typically desire such composition to provide foam to signal the cleaning action of the composition. Such liquid compositions, including those which comprise a surfactant capable of generating foam, usually require mechanical manipulation, such as agitating the composition against the treated surface with a scrub brush, in order to generate foam on the treated surface.

It is therefore desired to provide consumers with a composition for cleaning household surfaces that is more convenient to use and store, can be more efficiently shipped directly to a consumer's home or a commercial business establishment. It is also desired to have a toilet bowl composition that does not create a mess, and that can use foam generated from the composition to clean toilet bowl surfaces, to prevent and/or delay re-soiling and to provide freshness benefits, including long-lasting freshness, to areas in and surrounding the toilet.

SUMMARY OF THE INVENTION

The present invention encompasses a water disintegrable, foam producing article comprising a soluble fibrous structure encasing a particulate effervescent cleaning composition comprising an effervescent agent, a particulate foaming surfactant, an effervescent activator, and optionally an effervescent protection agent.

The present invention further relates to methods of making an effervescent foaming composition, methods of cleaning a surface, methods preventing surface re-soiling and methods of providing freshness, including long lasting freshness, using the article of the present invention.

One example of the present invention is a water disintegrable, foam producing article comprising:

a soluble fibrous structure, for example a soluble fibrous web, encasing a particulate effervescent cleaning composition, wherein the particulate effervescent foaming composition comprises:

a) a particulate foaming surfactant, for example wherein the particulate foaming surfactant is selected from the group consisting of linear $C_{11}$-$C_{12}$ alkylbenzene sulfonate, sodium $C_{12}$-$C_{16}$ alkyl methyl taurate, sodium alkyl sulfate, $C_{12}$-$C_{18}$ alpha olefin sulfonate, disodium lauroyl or cocoyl glutamate, sulfonated $C_{12}$-$C_{16}$ alkyl polyglycosides (APG), lauryl sulfosuccinate, $C_{12}$-$C_{16}$ dimethyl amine oxide, lauramido propyl betaine, cocamido propyl betaine, lauramido propyl hydroxyl sultaine, cocamido propyl hydroxyl sultaine, and mixtures thereof;

b) an effervescent agent, for example wherein the effervescent agent is selected from the group consisting of sodium bicarbonate, sodium carbonate, and mixtures thereof;

c) an effervescent activator, for example wherein the effervescent activator is selected from the group consisting of citric acid, tartaric acid, sulfamic acid, sulfuric acid on silica carrier, and mixtures thereof;

d) optionally, an effervescent protecting agent, for example wherein the effervescent protecting agent is selected from the group consisting of silica, zeolite, and mixtures thereof; and e) optionally, an active agent, for example wherein the active agent is selected from the group consisting of perfumes, soil release polymers, enzymes, bacterial spores, chelants, antimicrobial compounds, bleaches, and mixtures thereof.

The water disintegrable, foam producing article may comprise:

a) from about 15% to about 60% effervescent agent, for example wherein the effervescent agent is selected from the group consisting of sodium bicarbonate, sodium carbonate, and mixtures thereof;

b) from about 0.8% to about 15% foaming surfactant, for example wherein the particulate foaming surfactant is selected from the group consisting of linear $C_{11}$-$C_{12}$ alkylbenzene sulfonate, sodium $C_{12}$-$C_{16}$ alkyl methyl taurate, sodium alkyl sulfate, $C_{12}$-$C_{18}$ alpha olefin sulfonate, disodium lauroyl or cocoyl glutamate, sulfonated $C_{12}$-$C_{16}$ alkyl polyglycosides (APG), lauryl sulfosuccinate, $C_{12}$-$C_{16}$ dimethyl amine oxide, lauramido propyl betaine, cocamido propyl betaine, lauramido propyl hydroxyl sultaine, cocamido propyl hydroxyl sultaine, and mixtures thereof, such as selected from the group consisting of sulfonated $C_{12}$-$C_{16}$ alkylpolyglucoside, $C_8$-$C_8$ alkyl sulfate, $C_{12}$-$C_{16}$ alkyl N-methyl taurate, lauramido propyl betaine, cocamido propyl betaine, lauramido propyl hydroxyl sultaine, cocamido propyl hydroxyl sultaine, $C_{12}$-$C_{16}$ dimethyl amine oxide, and mixtures thereof;

c) from about 15% to about 60% effervescent activator, for example wherein the effervescent activator is selected from the group consisting of citric acid, tartaric acid, sulfamic acid, sulfuric acid on silica carrier, and mixtures thereof, such as selected from the group consisting of citric acid coated with silicone dioxide, sodium citrate, and mixtures thereof; and d) optionally from 0.1% to 20% active agent, for example wherein the active agent is selected from the group consisting of perfumes, soil release polymers, enzymes, bacterial spores, chelants, antimicrobial compounds, bleaches, and mixtures thereof, such as selected from the group consisting of perfumes, soil release polymers, enzymes, bleaches, and mixtures thereof.

The soluble fibrous structure of the water disintegrable, foam producing article may form a pouch which encases the particulate effervescent cleaning composition. The particulate effervescent cleaning composition may be commingled with the soluble fibrous structure to form a coform structure.

The soluble fibrous structure of the water disintegrable, foam producing article may comprises fibrous elements having a surfactant present therein or the fibrous elements may be essentially free of or free of surfactants.

The particulate effervescent foaming composition of the water disintegrable, foam producing article may be made by a method comprising the steps of:

a) forming an effervescent foaming composition precursor by blending together an effervescent agent particle, an effervescent activator particle, and a foaming surfactant particle; and
b) blending the effervescent foaming composition precursor with a perfume delivery system comprising one or more perfumes and optionally, one or more perfume carriers selected from the group consisting of silica, zeolite, and mixtures thereof, by mixing.

The particulate effervescent foaming composition of the water disintegrable, foam producing article may be made by a method comprising the steps of:

a) forming an effervescent foaming composition precursor by blending together an effervescent agent particle, an effervescent activator particle, and a foaming surfactant particle; and
b) blending the effervescent foaming composition precursor with a soil release polymer delivery system comprising a soil release polymer and optionally, one or more soil release polymer carriers selected from the group consisting of silica, zeolite, and mixtures thereof, by mixing.

The particulate effervescent foaming composition of the water disintegrable, foam producing article may be made by a method comprising the steps of:

a) forming an effervescent foaming composition precursor by blending together an effervescent agent particle, an effervescent activator particle, and a foaming surfactant particle; and
b) blending the effervescent foaming composition precursor with an enzyme delivery system comprising an enzyme and one or more enzyme carriers selected from the group consisting of silica, zeolite, and mixtures thereof, by mixing.

The particulate effervescent foaming composition of the water disintegrable, foam producing article may be made by a method comprising the steps of:

a) forming an effervescent foaming composition precursor by blending together an effervescent agent particle, an effervescent activator particle, and a foaming surfactant particle; and
b) blending the effervescent foaming composition precursor with a bleach selected from the group consisting of 6-phthalimido peroxyhexanoic acid, sodium percarbonate, potassium monopersulfate, and mixtures thereof.

A toilet bowl containing water in need of cleaning, for example removing soil from the toilet bowl, such as from the surface of the toilet bowl, may be cleaned by a method comprising the steps of:

a) adding a water disintegrable, foam producing article according to the present invention to the water within the toilet bowl;
b) allowing the article to disintegrate in the water to produce a foam; and
c) flushing the toilet after a period of at least 30 minutes from the addition of the article.

A toilet bowl containing water in need of cleaning, for example removing soil from the toilet bowl, such as the surface of the toilet bowl, may be cleaned by a method comprising the steps of:

a) adding an active agent-containing a water disintegrable, foam producing article according to the present invention to the water within the toilet bowl;
b) allowing the water to rapidly disintegrate the article to produce a foam, for example wherein the foam comprises one or more of the following materials, any one of which may be in particle form:
   a) particulate foaming surfactants;
   b) effervescent agents;
   c) effervescent activators;
   d) effervescent protecting agents;
   e) active agents, for example an active agent selected from the group consisting of perfumes, enzymes, bacterial spores, soil release polymers, chelants, antimicrobial compounds, bleaches, and mixtures thereof; and
   f) mixtures thereof;
c) allowing the foam to grow above the water line of the toilet bowl; and
d) allowing the foam to deposit on a surface above the water line of the toilet bowl.

Such a cleaning method may further comprise the step of allowing the foam to collapse depositing one or more of the materials onto a surface above the water line of the toilet bowl, for example such that at least one of the one or more of the materials is deposited on the surface at least 10 cm above the water line of the toilet bowl.

Such a cleaning method may further comprise the step of allowing the one or more materials to dry on the surface above the water line of the toilet bowl, for example such that at least one of the one or more materials dries on the surface at least 10 cm above the water line of the toilet bowl.

A surface of a toilet bowl may be treated to prevent soil adhesion on the surface of the toilet bowl containing water by a method comprising the steps of:

a) adding a water disintegrable, foam producing article according to the present invention to the water in the toilet bowl;
b) allowing the water to rapidly disintegrate the article to produce a foam, for example wherein the foam comprises one or more of the following materials, any one of which may be in particle form:
   a) particulate foaming surfactants;
   b) effervescent agents;
   c) effervescent activators;
   d) effervescent protecting agents;
   e) active agents, for example an active agent selected from the group consisting of perfumes, enzymes, bacterial spores, soil release polymers, chelants, antimicrobial compounds, bleaches, and mixtures thereof; and
   f) mixtures thereof;

c) allowing the foam to grow above the water line of the toilet bowl; and d) allowing the foam to deposit on a surface above the water line of the toilet bowl.

Such a treating method may further comprise the step of allowing the foam to collapse depositing one or more of the materials onto a surface above the water line of the toilet bowl, for example such that at least one of the one or more of the materials is deposited on the surface at least 10 cm above the water line of the toilet bowl.

Such a treating method may further comprise the step of allowing the one or more materials to dry on the surface above the water line of the toilet bowl, for example such that at least one of the one or more materials dries on the surface at least 10 cm above the water line of the toilet bowl.

Freshness, for example an immediate and/or long-lasting freshness, such as a pleasant or clean smell, for example obtained from one or more perfume ingredients, to an area surrounding a toilet bowl containing water may be delivered by a method comprising the steps of:

a) adding a water disintegrable, foam producing article according to the present invention to the water in the toilet bowl;

b) allowing the water to rapidly disintegrate the article to produce a foam, for example wherein the foam comprises one or more of the following materials, any one of which may be in particle form:

a) particulate foaming surfactants;
  b) effervescent agents;
  c) effervescent activators;
  d) effervescent protecting agents;
  e) active agents, for example an active agent selected from the group consisting of perfumes, enzymes, bacterial spores, soil release polymers, chelants, anti-microbial compounds, bleaches, and mixtures thereof; and
  f) mixtures thereof;

c) allowing the foam to grow above the water line of the toilet bowl; and d) allowing the foam to deposit on a surface above the water line of the toilet bowl.

Such a delivery of freshness method may further comprise the step of allowing the foam to collapse depositing one or more of the materials onto a surface above the water line of the toilet bowl, for example such that at least one of the one or more of the materials is deposited on the surface at least 10 cm above the water line of the toilet bowl.

Such a delivery of freshness method may further comprise the step of allowing the one or more materials to dry on the surface above the water line of the toilet bowl, for example such that at least one of the one or more materials dries on the surface at least 10 cm above the water line of the toilet bowl.

A surface in need of cleaning, for example a hard surface, such as dishes, utensils, pots, pans, and countertops, may be cleaned by a method comprising the steps of:

a) providing a vessel, for example a sink, such as a household sink and/or commercial sink, or a bucket or a spray bottle, containing water;

b) adding a water disintegrable, foam producing article according to the present invention to the water in the vessel;

c) allowing the article to disintegrate in the water to form a cleaning solution, for example a foaming cleaning solution, such as a foaming cleaning solution comprising one or more of the following materials, any one of which may be in particle form:

a) particulate foaming surfactants;
  b) effervescent agents;
  c) effervescent activators;
  d) effervescent protecting agents;
  e) active agents, for example an active agent selected from the group consisting of perfumes, enzymes, bacterial spores, soil release polymers, chelants, anti-microbial compounds, bleaches, and mixtures thereof; and
  f) mixtures thereof; and d) contacting the surface with the cleaning solution to clean the surface.

Such a surface cleaning method may further comprise the step of dispensing the cleaning solution onto a surface to produce a foam and allowing the foam to collapse depositing one or more of the materials onto the surface.

Such a surface cleaning method may further comprise the step of allowing the one or more materials to dry on the surface.

The present invention provides novel water disintegrable, foam producing articles and methods for making such articles and components thereof, methods for using such articles to clean, such as to clean toilet bowls and/or other surfaces, methods for treating surfaces, for example toilet bowl surface to prevent adhesion of soil, and methods for delivering freshness.

DETAILED DESCRIPTION OF THE INVENTION

Definitions

Figure 1:
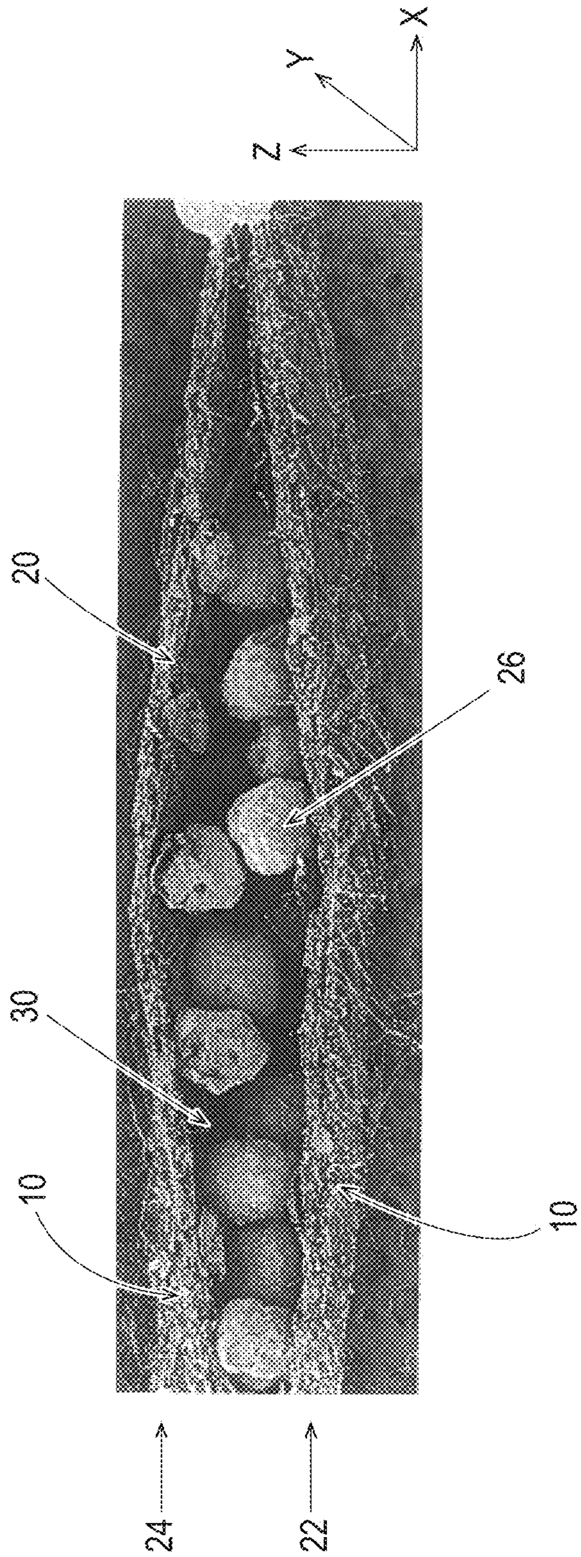
FIG. 1 is a scanning electron microscope photograph of a cross-sectional view of an example of a fibrous structure according to the present disclosure.

"Fibrous structure" as used herein means a structure that comprises one or more fibrous elements. In one aspect, a fibrous structure according to the present disclosure means an association of fibrous elements that together form a structure, such as a unitary structure, capable of performing a function.

The fibrous structures of the present disclosure may be homogeneous or may be layered. If layered, the fibrous structures may comprise at least two and/or at least three and/or at least four and/or at least five layers, for example one or more fibrous element layers, one or more particle layers and/or one or more fibrous element/particle mixture layers. A layer may comprise a particle layer within the fibrous structure or between fibrous element layers within a fibrous structure. A layer comprising fibrous elements may sometimes be referred to as a ply. A ply may be a fibrous structure which may be homogeneous or layered as described herein.

In one aspect, a single-ply fibrous structure according to the present disclosure or a multi-ply fibrous structure comprising one or more fibrous structure plies according to the present disclosure may exhibit a basis weight of less than 5000 $g/m^2$ as measured according to the Basis Weight Test Method described herein. In one aspect, the single- or multi-ply fibrous structure according to the present disclosure may exhibit a basis weight of greater than 10 $g/m^2$ to about 5000 $g/m^2$ and/or greater than 10 $g/m^2$ to about 3000 $g/m^2$ and/or greater than 10 $g/m^2$ to about 2000 $g/m^2$ and/or greater than 10 $g/m^2$ to about 1000 $g/m^2$ and/or greater than 20 $g/m^2$ to about 800 $g/m^2$ and/or greater than 30 $g/m^2$ to about 600 $g/m^2$ and/or greater than 50 $g/m^2$ to about 500 $g/m^2$ and/or greater than 300 $g/m^2$ to about 3000 $g/m^2$ and/or greater than 500 $g/m^2$ to about 2000 $g/m^2$ as measured according to the Basis Weight Test Method. In a preferred aspect of the invention, the fibrous structure has a basis weight ranging from about 25 $g/m^2$ to about 150 $g/m^2$, more preferably from about 40 $g/m^2$ to about 100 $g/m^2$. Basis weights less than about 25 $g/m^2$ are too flimsy to prevent the foaming particles of the invention from leaching out during normal shipping and handling operations. Basis weight fibrous materials in excess of about 100 $g/m^2$ are more expensive and less rapidly solubilized/disintegrated upon contact with cold water.

In one aspect, the fibrous structure of the present disclosure is a "unitary fibrous structure."

"Unitary fibrous structure" as used herein is an arrangement comprising a plurality of two or more and/or three or more fibrous elements that are inter-entangled or otherwise associated with one another to form a fibrous structure and/or fibrous structure plies. A unitary fibrous structure of the present disclosure may be one or more plies within a multi-ply fibrous structure. In one aspect, a unitary fibrous structure of the present disclosure may comprise three or more different fibrous elements. In another aspect, a unitary fibrous structure of the present disclosure may comprise two or more different fibrous elements.

"Article" as used herein refers to a consumer use unit, a consumer unit dose unit, a consumer use saleable unit, a single dose unit, or other use form comprising a unitary fibrous structure and/or comprising one or more fibrous structures of the present disclosure.

"Fibrous element" as used herein means an elongate particulate having a length greatly exceeding its average diameter, i.e. a length to average diameter ratio of at least about 10. A fibrous element may be a filament or a fiber. In one aspect, the fibrous element is a single fibrous element rather than a yarn comprising a plurality of fibrous elements.

The fibrous elements of the present disclosure may be spun from filament-forming compositions also referred to as fibrous element-forming compositions via suitable spinning process operations, such as meltblowing, spunbonding, electro-spinning, and/or rotary spinning.

The fibrous elements of the present disclosure may be monocomponent (single, unitary solid piece rather than two different parts, like a core/sheath bicomponent) and/or multicomponent. For example, the fibrous elements may comprise bicomponent fibers and/or filaments. The bicomponent fibers and/or filaments may be in any form, such as side-by-side, core and sheath, islands-in-the-sea and the like.

"Filament" as used herein means an elongate particulate as described above that exhibits a length of greater than or equal to 5.08 cm (2 in.) and/or greater than or equal to 7.62 cm (3 in.) and/or greater than or equal to 10.16 cm (4 in.) and/or greater than or equal to 15.24 cm (6 in.).

Filaments are typically considered continuous or substantially continuous in nature. Filaments are relatively longer than fibers. Non-limiting examples of filaments include meltblown and/or spunbond filaments. Non-limiting examples of polymers that can be spun into filaments include natural polymers, such as starch, starch derivatives, cellulose, such as rayon and/or lyocell, and cellulose derivatives, hemicellulose, hemicellulose derivatives, and synthetic polymers including, but not limited to polyvinyl alcohol and also thermoplastic polymer filaments, such as polyesters, nylons, polyolefins such as polypropylene filaments, polyethylene filaments, and biodegradable thermoplastic fibers such as polylactic acid filaments, polyhydroxyalkanoate filaments, polyesteramide filaments and polycaprolactone filaments.

"Fiber" as used herein means an elongate particulate as described above that exhibits a length of less than 5.08 cm (2 in.) and/or less than 3.81 cm (1.5 in.) and/or less than 2.54 cm (1 in.).

Fibers are typically considered discontinuous in nature. Non-limiting examples of fibers include staple fibers produced by spinning a filament or filament tow of the present disclosure and then cutting the filament or filament tow into segments of less than 5.08 cm (2 in.) thus producing fibers.

"Filament-forming composition" and/or "fibrous element-forming composition" as used herein means a composition that is suitable for making a fibrous element of the present disclosure such as by meltblowing and/or spunbonding. The filament-forming composition comprises one or more filament-forming materials that exhibit properties that make them suitable for spinning into a fibrous element. In one aspect, the filament-forming material comprises a polymer. In addition to one or more filament-forming materials, the filament-forming composition may comprise one or more additives, for example one or more active agents. In addition, the filament-forming composition may comprise one or more polar solvents, such as water, into which one or more, for example all, of the filament-forming materials and/or one or more, for example all, of the active agents are dissolved and/or dispersed prior to spinning a fibrous element, such as a filament from the filament-forming composition.

"Pouch wall material" as used herein means a material that forms one or more of the walls of a pouch such that an internal volume of the pouch is defined and enclosed, at least partially or entirely by the pouch wall material. The pouch wall material is typically comprised of a fibrous structure as described herein. As such, such fibrous structure is referred as a fibrous wall material.

"Fibrous wall material" as used herein means that the pouch wall material at least partially includes fibrous elements, for example filaments, such as inter-entangled filaments in the form of a fibrous structure. The fibrous wall materials of the present invention may be homogeneous or may be layered. If layered, the fibrous wall materials may comprise at least two and/or at least three and/or at least four and/or at least five layers.

"Apertured fibrous wall material" as used herein means that the pouch wall material comprises a plurality of holes, for example more than 2 and/or more than 3 and/or more than 4 and/or more than 5.

"Particle" or "particulate" as used herein means a solid additive, such as a powder, granule, encapsulate, microcapsule, and/or prill. The shape of the particle can be in the form of spheres, rods, plates, tubes, squares, rectangles, discs, stars, fibers or have regular or irregular random forms.

"Commingled" and/or "commingling" as used herein means the state or form where particles are mixed with fibrous elements, for example filaments. The mixture of filaments and particles can be throughout a composite structure or within a plane or a region of the composite structure. In one aspect, the commingled filaments and particles may form at least a surface of a composite structure. In one aspect, the particles may be homogeneously dispersed throughout the composite structure and/or plane and/or region of the composite structure. In one aspect, the particles may be homogeneously distributed throughout the composite structure, which avoids and/or prevents sag and/or free movement and/or migration of the particles within the composite structure to other areas within the composite structure thus resulting in higher concentrated zones of particles and lower concentrated zones or zero concentration zones of particles within the composite structure.

"Additive" as used herein means any material present in the fibrous element of the present disclosure that is not a filament-forming material. In one aspect, an additive comprises an active agent. In another aspect, an additive comprises a processing aid. In still another aspect, an additive comprises a filler. In one aspect, an additive comprises any material present in the fibrous element that its absence from the fibrous element would not result in the fibrous element losing its fibrous element structure, in other words, its absence does not result in the fibrous element losing its solid form. In another aspect, an additive, for example an active agent, comprises a non-polymer material.

In another aspect, an additive may comprise a plasticizer for the fibrous element. Non-limiting examples of suitable plasticizers for the present disclosure include polyols, copolyols, polycarboxylic acids, polyesters and dimethicone copolyols. Examples of useful polyols include, but are not limited to, glycerin, diglycerin, propylene glycol, ethylene glycol, butylene glycol, pentylene glycol, cyclohexane dimethanol, hexanediol, 2,2,4-trimethylpentane-1,3-diol, polyethylene glycol (200-600), pentaerythritol, sugar alcohols such as sorbitol, manitol, lactitol and other mono- and polyhydric low molecular weight alcohols (e.g., C2-C8 alcohols); mono di- and oligo-saccharides such as fructose, glucose, sucrose, maltose, lactose, high fructose corn syrup solids, and dextrins, and ascorbic acid.

In one aspect, the plasticizer includes glycerin and/or propylene glycol and/or glycerol derivatives such as propoxylated glycerol. In still another aspect, the plasticizer is selected from the group consisting of glycerin, ethylene glycol, polyethylene glycol, propylene glycol, glycidol, urea, sorbitol, xylitol, maltitol, sugars, ethylene bisformamide, amino acids, and mixtures thereof.

In another aspect, an additive may comprise a rheology modifier, such as a shear modifier and/or an extensional modifier. Non-limiting examples of rheology modifiers include but not limited to polyacrylamide, polyurethanes and polyacrylates that may be used in the fibrous elements of the present disclosure. Non-limiting examples of rheology modifiers are commercially available from The Dow Chemical Company (Midland, MI).

In yet another aspect, an additive may comprise one or more colors and/or dyes that are incorporated into the fibrous elements of the present disclosure to provide a visual signal when the fibrous elements are exposed to conditions of intended use and/or when an active agent is released from the fibrous elements and/or when the fibrous element's morphology changes.

In still yet another aspect, an additive may comprise one or more release agents and/or lubricants. Non-limiting examples of suitable release agents and/or lubricants include fatty acids, fatty acid salts, fatty alcohols, fatty esters, sulfonated fatty acid esters, fatty amine acetates, fatty amide, silicones, aminosilicones, fluoropolymers, and mixtures thereof. In one aspect, the release agents and/or lubricants may be applied to the fibrous element, in other words, after the fibrous element is formed. In one aspect, one or more release agents/lubricants may be applied to the fibrous element prior to collecting the fibrous elements on a collection device to form a fibrous structure. In another aspect, one or more release agents/lubricants may be applied to a fibrous structure formed from the fibrous elements of the present disclosure prior to contacting one or more fibrous structures, such as in a stack of fibrous structures. In yet another aspect, one or more release agents/lubricants may be applied to the fibrous element of the present disclosure and/or fibrous structure comprising the fibrous element prior to the fibrous element and/or fibrous structure contacting a surface, such as a surface of equipment used in a processing system so as to facilitate removal of the fibrous element and/or fibrous structure and/or to avoid layers of fibrous elements and/or plies of fibrous structures of the present disclosure sticking to one another, even inadvertently. In one aspect, the release agents/lubricants comprise particulates.

In even still yet another aspect, an additive may comprise one or more anti-blocking and/or detackifying agents. Non-limiting examples of suitable anti-blocking and/or detackifying agents include starches, starch derivatives, crosslinked polyvinylpyrrolidone, crosslinked cellulose, microcrystalline cellulose, silica, metallic oxides, calcium carbonate, talc, mica, and mixtures thereof.

"Active agent" as used herein means an additive that produces an intended effect in an environment external to a fibrous element and/or a particle and/or a fibrous structure comprising a fibrous element of the present disclosure, such as when the fibrous element and/or a particle and/or fibrous structure is exposed to conditions of intended use of the fibrous element and/or a particle and/or a fibrous structure comprising a fibrous element. In one aspect, an active agent comprises an additive that treats a surface, such as a hard surface (i.e., kitchen countertops, bath tubs, toilets, toilet bowls, sinks, floors, walls, teeth, cars, windows, mirrors, dishes). Examples of such active agents include surfactants, perfumes, soil release polymers, enzymes, bacterial spores, antimicrobial compounds, chelants and bleaches. In another aspect, an active agent comprises an additive that treats an environment (i.e., deodorizes, purifies, perfumes air). In one aspect, the active agent is formed in situ, such as during the formation of the fibrous element and/or particle containing the active agent, for example the fibrous element and/or particle may comprise a water-soluble polymer (e.g., starch) and a surfactant (e.g., anionic surfactant), which may create a polymer complex or coacervate that functions as the active agent.

"Carrier" or "carrier particle" as used herein means a particle used to encase an active agent. Carriers are inert, preferably high surface area inorganic particles with a median particle size of less than about 2 mm, more preferably less than about 1 mm or from about 10 μm to about 800 μm. Carrier particles are preferably used to encase liquid and oil active agents. By 'liquid' it is meant a chemical raw material that comprises less than about 30% water, more preferably less than about 20% water. In one embodiment, the liquid active agent comprises less than 10% water. By 'oil', it is meant a liquid substance at 25° C. that substantially free of water, more preferably completely free of water. Oils can be, for example, nonionic surfactants, organic or inorganic acids or triglycerides. Many oils are perfume components, including but not limited to, lemon oil, lavender oil, d-limonene, ethyl linalool, and the like.

The benefits of carrier particles for liquids and/or oils are twofold. First, the inert character and high surface area of the carrier particles helps shield and protect embedded active agents from outside environment forces, including limiting evaporation rate and eliminating/reducing chemical reactivity with other components present in the effervescent foaming particle composition. Second, small particle size results in a lightweight particle that is easier to be transported lifted onto hard surfaces located above the air-water interface of a vessel such as a commercial sink or a toilet bowl surface. As such, carrier particles can act as important deposition aids for liquid and oil active agents. While not required for all aspects of the present invention, carriers can help magnify the benefits achieved by the compositions of the invention.

Non-limiting examples of carrier particles include precipitated silica, zeolites and mixtures thereof, especially precipitated silica compounds available from Evonik under the tradename Zeodent. When present, carrier particles can comprise from about 0.05% to about 10%, more preferably from about 0.1% to about 5% by weight of the effervescent foaming composition.

"Treat" as used herein with respect to treating a surface means that the active agent provides a benefit to a surface or environment. "Treat" therefore includes regulating and/or immediately improving a surface's or environment's appearance, cleanliness, smell, purity and/or feel. Treats may include providing a benefit to environments like a toilet bowl, sink, garbage-disposal, pipe, bucket or other container by cleaning or disinfecting it.

In another aspect, treating means removing stains and/or odors from containers such as dishware including pots and pans.

"Hard surface active agent" as used herein means an active agent when applied to floors, countertops, sinks, windows, mirrors, showers, baths, and/or toilets provides a benefit and/or improvement to the floors, countertops, sinks, windows, mirrors, showers, baths, and/or toilets. Non-limiting examples of benefits and/or improvements to the floors, countertops, sinks, windows, mirrors, showers, baths, and/or toilets include food and/or soil removal, cleaning (for example by surfactants), stain removal, stain reduction, grease removal, water spot removal and/or water spot prevention, limescale removal, disinfection, shining, polishing, and freshening.

"Weight ratio" as used herein means the ratio between two materials on their dry basis. For example, the weight ratio of filament-forming materials to active agents within a fibrous element is the ratio of the weight of filament-forming material on a dry weight basis (g or %) in the fibrous element to the weight of additive, such as active agent(s) on a dry weight basis (g or %—same units as the filament-forming material weight) in the fibrous element. In another aspect, the weight ratio of particles to fibrous elements within a fibrous structure is the ratio of the weight of particles on a dry weight basis (g or %) in the fibrous structure to the weight of fibrous elements on a dry weight basis (g or %—same units as the particle weight) in the fibrous structure.

The term "substantially free of" or "substantially free from" as used herein refers to either the complete absence of an ingredient or a minimal amount thereof merely as impurity or unintended byproduct of another ingredient. A composition that is "substantially free" of/from a component means that the composition comprises less than about 0.5%, 0.25%, 0.1%, 0.05%, or 0.01%, or even 0%, by weight of the composition, of the component.

"Soluble", "Water soluble" and/or "Water-soluble material" as used herein means a material that is miscible in water, unless otherwise specified. In other words, a material that is capable of forming a stable homogeneous solution with water at ambient conditions (e.g., does not separate for greater than 5 minutes after forming the homogeneous solution).

"Ambient conditions" as used herein means 23° C.±1.0° C. and a relative humidity of 50%±2%.

"Weight average molecular weight" as used herein means the weight average molecular weight as determined using gel permeation chromatography according to the protocol found in Colloids and Surfaces A. Physico Chemical & Engineering Aspects, Vol. 162, 2000, pg. 107-121.

"Article dimensions," as used herein, refers to the length, width, height, mass, volume, density, and the like, of an article.

"Length," as used herein with respect to a fibrous element, means the length along the longest axis of the fibrous element from one terminus to the other terminus. If a fibrous element has a kink, curl or curves in it, then the length is the length along the entire path of the fibrous element from one terminus to the other terminus. With respect to dimensions of an article, "length" may be defined differently. For example, with respect to articles of irregular shape, the length refers to the maximum feret or caliper diameter, which is the longest distance between two parallel planes tangential to the boundary of the article. For a rectilinear-shaped article, for example, the length refers to the distance from one edge to an opposite edge. In one aspect, an average length can be provided by measuring ten substantially similar replicate articles, compiling an average of the ten individual article length measurements, and reporting the value to the nearest 0.01 cm, where the individual article length measurements can be taken by any appropriate instrument that is calibrated, NIST traceable, and capable of a measurements to the nearest 0.01 cm.

"Diameter" as used herein, with respect to a fibrous element, is measured according to the Diameter Test Method described herein. In one aspect, a fibrous element of the present disclosure exhibits a diameter of less than 100 μm and/or less than 75 μm and/or less than 50 μm and/or less than 25 μm and/or less than 20 μm and/or less than 15 μm and/or less than 10 μm and/or less than 6 μm and/or greater than 1 μm and/or greater than 3 μm.

"Width," as used herein with respect to dimensions of an article, may refer to the measurement according to its conventional definition. For a rectilinear-shaped article, for example, the width refers to the distance from one edge to an opposite edge. However, with respect to articles of irregular shape, the width refers to the maximum feret or caliper diameter, which is the longest distance between two parallel planes tangential to the boundary of the article. In one aspect, an average width can be provided by measuring ten substantially similar replicate articles, compiling an average of the ten individual article width measurements, and reporting the value to the nearest 0.01 cm, where the individual article width measurements can be taken by any appropriate instrument that is calibrated, NIST traceable, and capable of a measurements to the nearest 0.01 cm.

"Height," as used herein with respect to dimensions of an article, may refer to the measurement according to its conventional definition. The height, or thickness, of an article, for example, can be measured by the Thickness Test Method described herein.

"Volume," as used herein with respect to dimensions of an article, may refer to the measurement according to its conventional definition. For example, the volume of an article can be calculated by measuring a projected area of the article, as viewed orthogonally to a plane of the length and width of the article, and multiplying the area by the height of the article. In one aspect, an average volume can be provided by measuring ten substantially similar replicate articles, compiling an average of the ten individual article volume measurements, and reporting the value to the nearest 0.01 cc.

"By weight on a dry fibrous element basis" and/or "by weight on a dry particle basis" and/or "by weight on a dry fibrous structure basis" means the weight of the fibrous element and/or particle and/or fibrous structure, respectively, measured immediately after the fibrous element and/or particle and/or fibrous structure, respectively, has been conditioned in a conditioned room at a temperature of 23° C.±1.0° C. and a relative humidity of 50%±10% for 2 hours. In one aspect, by weight on a dry fibrous element basis and/or dry particle basis and/or dry fibrous structure basis means that the fibrous element and/or particle and/or fibrous structure comprises less than 20% and/or less than 15% and/or less than 10% and/or less than 7% and/or less than 5% and/or less than 3% and/or to 0% and/or to greater than 0% based on the dry weight of the fibrous element and/or particle and/or fibrous structure of moisture, such as water, for example free water.

"Associate," "Associated," "Association," and/or "Associating" as used herein with respect to fibrous elements and/or particle means combining, either in direct contact or in indirect contact, fibrous elements and/or particles such that a fibrous structure is formed. In one aspect, the associated fibrous elements and/or particles may be bonded together for example by adhesives and/or thermal bonds. In another aspect, the fibrous elements and/or particles may be associated with one another by being deposited onto the same fibrous structure making belt and/or patterned belt.

In one aspect, two or more fibrous structure plies may be bonded together by a chemical bonding agent, for example an adhesive, such as a water-containing adhesive. In another aspect, two or more fibrous structure plies may be bonded together by mechanical entanglement of fibrous elements, for example filaments, from one fibrous structure ply into an adjacent fibrous structure ply of a multi-ply fibrous structure, for example a multi-ply article. In another aspect, two or more fibrous structure plies may be bonded together by pressure bonds formed between two adjacent fibrous structure plies of a multi-ply fibrous structure, for example multi-ply article.

"Ply" or "Plies" as used herein means an individual fibrous structure optionally to be disposed in a substantially contiguous, face-to-face relationship with other plies, forming a multiple ply fibrous structure. It is also contemplated that a single fibrous structure can effectively form two "plies" or multiple "plies", for example, by being folded on itself. A ply may comprise layers of filaments, filament/particle blends, and/or particles. In another aspect, there may be a layer of filaments or particles between plies.

Particulate Effervescent Foaming Composition

The water disintegrable, foam producing article of the present invention comprises a particulate effervescent cleaning composition that is encased in a soluble fibrous structure of the article. The particulate effervescent foaming composition will generally comprise an effervescent agent, a particulate foaming surfactant, and an effervescent activator. The particulate effervescent cleaning composition optionally further comprises an effervescent protecting agent and/or adjunct ingredients or active particles.

Effervescent Agent

The particulate effervescent cleaning composition comprises an effervescent agent that is capable of effervescence. The term "effervescent," as defined herein, means any product capable of forming bubbles in liquid environments and may also be considered any product capable of liberating carbon dioxide in or out of liquid environments. Likewise, "effervescence" means forming bubbles in liquid environments or liberating a gas such as carbon dioxide in or out of liquid environments. Alternatively, "effervescence" means fizzing or foaming of an article upon encountering a liquid or aqueous environment. In certain aspects, the presence of bubbles results from the formation of a gas such as carbon dioxide. For instance, when added to a liquid, such as water, a salt such a bicarbonate salt results in a chemical reaction that liberates carbon dioxide when properly activated, such as by dissolution and mixing with an appropriate effervescent activator.

The effervescent agent is a required component of the present invention. While not wishing to be limited by theory, it is believed that the fizzing action from liberation of CO2 provides agitation and lift for the foaming surfactant present in the composition. As a consequence, foam creation and foam height, which are key to providing benefits in this invention, are significantly enhanced by the effervescent agent.

Examples of suitable effervescent agents include salts such as alkali and alkali earth metal salts. Non-limiting examples of suitable alkali metal salts include sodium carbonate, calcium carbonate, magnesium carbonate, ammonium carbonate, potassium carbonate, sodium bicarbonate, potassium bicarbonate, calcium bicarbonate, or mixtures thereof. Sodium based effervescent agents most preferred, especially relative to the corresponding potassium-based agents due to improved stability in humid environments (e.g., RH≥65%). Smaller effervescent agent particle sizes are preferred to accelerate reactivity when the particles are added to water. The mean particle size range for the effervescent agents, especially sodium-based effervescent agents is from about 50 μm to about 200 μm, more preferably from about 50 μm to about 150 μm and most preferably from about 50 μm to about 100 μm.

Effervescent agent can be incorporated in the particulate effervescent cleaning composition at a level of from about 5% to about 70%, preferably from about 10% to about 65%, preferably from about 15% to about 60%, by weight of the particulate effervescent cleaning composition, or at a level of from about 5% to about 70%, preferably from about 10% to about 65%, preferably from about 15% to about 60%, by weight of the article.

Particulate Foaming Surfactant

The particulate effervescent cleaning composition comprises a particulate foaming surfactant. Non-limiting examples of surfactants suitable as particulate foaming surfactants include anionic surfactants, cationic surfactants, nonionic surfactants, zwitterionic surfactants, amphoteric surfactants, or mixtures thereof.

The surfactants utilized in the particulate effervescent cleaning composition will be in particulate form, for example, as spray dried powders, agglomerates, or carrier-based particles. As described below with respect to fibrous elements of the soluble fibrous structure, similar surfactants can be incorporated into the fibrous elements and may or may not be in particulate form.

The surfactants useful herein can be linear or branched. In one aspect, suitable linear surfactants include those derived from agrochemical oils such as coconut oil, palm kernel oil, soybean oil, or other vegetable-based oils or vegetable-based triglycerides.

a. Anionic Surfactants

Suitable anionic surfactants include the sodium, potassium, ammonium, alkanol ammonium, magnesium and calcium salts of linear or branched, saturated or unsaturated C8-C24 derivatives of the following surfactants: alkyl sulfates (either primary or secondary), alkyl ether sulfates, alkyl polyglucoside sulfates, alkyl alkoxylate sulfates, mid-chain branched alkyl aryl sulfonates, sulfated monoglycerides, sulfonated olefins including alpha olefin sulfonates, alkyl aryl sulfonates, primary or secondary alkane sulfonates, sulfonated alkylpolyglucosides including laurylglucoside hydroxypropyl sulfonate, alkyl sulfosuccinates, alkyl (acyl) taurates and methyl taurates, alkyl (acyl) isethionates, alkyl glycerylether sulfonates, sulfonated methyl esters, sulfonated fatty acids, alkyl phosphates, alkyl (acyl) glutamates, alkyl (acyl) sarcosinates, alkyl sulfoacetates, acylated peptides, alkyl ether carboxylates, acyl lactylates, anionic fluorosurfactants, lauroyl glutamate, and combinations thereof. Other suitable anionic surfactants are described in McCutcheon's Detergents and Emulsifiers, North American Edition (1986), Allured Publishing Corp. and McCutcheon's, Functional Materials, North American Edition (1992), Allured Publishing Corp.

Alkyl sulfates and alkyl ether sulfates suitable for use herein include materials with the respective formula $ROSO_3M$ and $RO(C_2H_4O)_xSO_3M$, wherein R is alkyl or alkenyl of from about 8 to about 24 carbon atoms, x is 1 to 10, and M is a water-soluble cation such as ammonium, sodium, potassium and triethanol ammonium.

In one aspect, anionic surfactants useful in the fibrous elements and/or particles of the present disclosure include $C_9$-$C_{15}$ alkyl benzene sulfonates (LAS), $C_8$-$C_{20}$ alkyl ether sulfates, for example alkyl poly (ethoxy) sulfates, $C_8$-$C_{18}$ alkyl sulfates, sodium cocoyl glutamate, lauryl sulfosuccinate, disodium cocoyl glutamate, sodium $C_{14-16}$ alpha olefin sulfonate, the sodium salt of laurylglucoside hydroxypropyl sulfonate and mixtures thereof. For reasons of foam quality (e.g., lather-like foam that builds and is persistent), many of the preferred surfactants, including anionic (and zwitterionic surfactants) are employed in the personal care industry. The anionic surfactants may be purchased in ready-to-use form as powders, needles, agglomerates or as blown powders from suitable suppliers. For example, sodium methyl cocoyl taurate and sodium cocoyl isethionate are commercially available as free-flowing powders and the tradenames PUREACT WSP and PUREACT 1-78 from Innospec Corporation, and sodium lauryl glucoside hydroxypropyl sulfonate is available as a free-flowing powder under the tradename Suga Nate 160 Dry from Colonial Chemical. Sodium coconut sulfate is widely available in the form of needles, noodles or powders; the noodles are preferably ground up before use so as to lower particle size to below 200 μm. High foaming surfactant blends in powder or agglomerate form that include anionic surfactants (often in combination with zwitterionic surfactants) are also suitable for the invention. Thus, such as Coladet EQ-154 from Colonial Chemical, a spray dried mixture of alpha $C_{14}$-$C_{16}$ olefin sulfonate, dodecyl sulfosuccinate and lauramido propyl betaine particles, are also commercially available. Alternatively, suitable powder/particle anionic surfactants can be prepared by spray drying or agglomerating surfactants that are commercially available as aqueous compositions. In a preferred embodiment, surfactant particle is made by spray drying. For example, spray drying a 50% disodium cocoyl glutamate solution yields a suitable particle (<70 μm) for use herein.

For applications wherein the fibrous element and encased active agent particles are dissolved in water such that the pH of the corresponding solution is below about pH 4, anionic surfactants are preferably selected from the class of surfactants consisting of alk(en)yl sulfonate, sulfonate and phosphate surfactants, and mixtures thereof; for applications wherein the fibrous element and encased active agent particles are dissolved in water such that the corresponding solution pH is above about pH 4, anionic surfactants are preferably selected from the class of surfactants consisting of sulfonate, phosphate, sulfate and carboxylate surfactants. The selection of the anionic surfactant particle system is chosen to enhance the formation of foam and foam height, and preferably to simultaneously maximize foam stability. As such, the anionic surfactant system preferably consists of surfactants comprising a broad set of alkyl chain lengths with the average surfactant chain length preferably between 12 and 16, more preferably between 12 and 14. Thus, coconut alkyl sulfate comprising a broad set of chain lengths is generally preferred to a high purity single chain length corresponding surfactant material. In one aspect, divalent ion magnesium and/or calcium salts are added to sodium or potassium-based anionic surfactants to improve foam quality and longevity. Non-limiting examples of divalent salts include magnesium sulfate, magnesium chloride, calcium chloride, magnesium citrate, magnesium acetate and the like. The ability to combine anionic surfactants together, or to combine anionic surfactants, optionally with divalent ion salts, with other classes of surfactants, including nonionic, zwitterionic and amphoteric surfactants so as to maximize the level of foam produced by the fibrous elements and associated particles is considered to be of one of ordinary skill in the art. In one preferred embodiment, anionic surfactants provide. In one aspect of the invention, anionic surfactants alone provide the desired foam characteristics, including enhanced foam height, quality (e.g., lather-like foam) and longevity. In another aspect of the invention, anionic surfactants combined with zwitterionic surfactants provide the desired foam properties.

In a preferred embodiment, the anionic surfactant particle is chosen to not be hygroscopic. A simple means to ascertain this to be the case is to expose the surfactant particle to 50% and 80% humidity conditions and observe the degree to which the particle absorbs moisture. This can be done visually or analytically by measuring weight gain from humidity exposure over a 24 hour time period. In this regard, it is noted that cocoyl methyl taurates, broad cut ($C_8$-$C_{18}$) and mid-cut ($C_{12}$-$C_{14}$) coconut sulfates, cocoyl isethionates, sulfonated $C_{12}$-$C_{16}$ alkyl polyglucosides, $C_{14}$-$C_{16}$ alpha olefin sulfonates and $C_8$-$C_{18}$ alkyl sulfates, all of which are high foaming surfactants, also offer superior hygroscopic properties. High foaming combinations of surfactant particles which show good hydrolytic stability in powered/particle form can accordingly be prepared.

b. Cationic Surfactants

Non-limiting examples of suitable cationic surfactants include, but are not limited to, those having the formula:

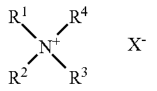

in which $R^1$, $R^2$, $R^3$, and $R^4$ are each independently selected from (a) an aliphatic group of from 1 to 26 carbon atoms, or (b) an aromatic, alkoxy, polyoxyalkylene, alkylcarboxy, alkylamido, hydroxyalkyl, aryl or alkylaryl group having up to 22 carbon atoms; and X is a salt-forming anion such as those selected from halogen, (e.g. chloride, bromide), acetate, citrate, lactate, glycolate, phosphate, nitrate, sulphate, and C1-C5 alkylsulphate radicals. In one aspect, the alkylsulphate radical is methosulfate and/or ethosulfate.

Suitable quaternary ammonium cationic surfactants of general formula may include cetyltrimethylammonium chloride, behenyltrimethylammonium chloride (BTAC), stearyltrimethylammonium chloride, cetylpyridinium chloride, octadecyltrimethylammonium chloride, hexadecyltrimethylammonium chloride, octyldimethylbenzylammonium chloride, decyldimethylbenzylammonium chloride, stearyldimethylbenzylammonium chloride, didodecyldimethylammonium chloride, didecyldimethylammonium chloride, dioctadecyldimethylammonium chloride, distearyldimethylammonium chloride, tallowtrimethylammonium chloride, cocotrimethylammonium chloride, 2-ethylhexylstearyldimethylammonum chloride, dipalmitoylethyldimethylammonium chloride, ditallowoylethyldimethylammonium chloride, distearoylethyldimethylammonium methosulfate, PEG-2 oleylammonium chloride and salts of these, where the chloride is replaced by halogen, (e.g., bromide), acetate, citrate, lactate, glycolate, phosphate nitrate, sulphate, or $C_1$-$C_5$ alkylsulphate. Quaternary ammonium halides registered or known to provide antimicrobial benefits such as bis-(3-aminopropyl dodecylamine), $C_{12}$-$C_{18}$ alkyl benzyl ammonium chloride and $C_{12}$-$C_{18}$ alkyl ethylbenzyl ammonium chloride can be particularly beneficial in this invention for control and elimination of bacteria and molds, as well as associated malodors from these microorganisms. Cationic derivatives of secondary and tertiary amines, derivatives of heterocyclic secondary and tertiary amines, or derivatives of quaternary ammonium, quaternary phosphonium or tertiary sulfonium compounds can also be used.

Non-limiting examples of suitable cationic surfactants are commercially available under the trade names ARQUAD® from Akzo-Nobel Surfactants (Chicago, IL) and BARQUAT from Lonza®

In one aspect, suitable cationic surfactants include quaternary ammonium surfactants, for example that have up to 26 carbon atoms include: alkoxylate quaternary ammonium (AQA) surfactants as discussed in U.S. Pat. No. 6,136,769; dimethyl hydroxyethyl quaternary ammonium as discussed in U.S. Pat. No. 6,004,922; dimethyl hydroxyethyl lauryl ammonium chloride; polyamine cationic surfactants as discussed in WO 98/35002, WO 98/35003, WO 98/35004, WO 98/35005, and WO 98/35006; cationic ester surfactants as discussed in U.S. Pat. Nos. 4,228,042, 4,239,660 4,260,529 and 6,022,844; and amino surfactants as discussed in U.S. Pat. No. 6,221,825 and WO 00/47708, for example amido propyldimethyl amine (APA).

In one aspect the cationic ester surfactants can hydrolyze under the conditions of a laundry wash.

c. Nonionic Surfactants

Non-limiting examples of suitable nonionic surfactants include alkoxylated alcohols (AE's) and alkyl phenols, polyhydroxy fatty acid amides (PFAA's), alkyl polyglycosides (APG's), glycerol ethers that can form solid particles at room temperature. Many ethoxylated alcohols and other nonionics are liquids at 25° C., and are ideally incorporated as particles via the use of zeolite or silica carrier particles.

In one aspect, non-limiting examples of nonionic surfactants useful in the present disclosure include: $C_{12}$-$C_{18}$ alkyl ethoxylates, such as, NEODOL® nonionic surfactants from Shell; $C_6$-$C_{12}$ alkyl phenol alkoxylates wherein the alkoxylate units are a mixture of ethyleneoxy and propyleneoxy units; $C_{12}$-$C_{18}$ alcohol and $C_6$-$C_{12}$ alkyl phenol condensates with ethylene oxide/propylene oxide block alkyl polyamine ethoxylates such as PLURONIC® from BASF; $C_{14}$-$C_{22}$ mid-chain branched alcohols, BA, as discussed in U.S. Pat. No. 6,150,322; $C_{14}$-$C_{22}$ mid-chain branched alkyl alkoxylates, $BAE_x$, wherein x is from 1-30, as discussed in U.S. Pat. Nos. 6,153,577, 6,020,303 and 6,093,856; alkylpolysaccharides as discussed in U.S. Pat. No. 4,565,647 Llenado, issued Jan. 26, 1986; specifically alkylpolyglycosides as discussed in U.S. Pat. Nos. 4,483,780 and 4,483,779; polyhydroxy detergent acid amides as discussed in U.S. Pat. No. 5,332,528; and ether capped poly (oxyalkylated) alcohol surfactants as discussed in U.S. Pat. No. 6,482,994 and WO 01/42408.

Examples of commercially available nonionic surfactants suitable for the present disclosure include: Neodol® 45-7 (the condensation product of $C_{14}$-$C_{15}$ linear alcohol with 7 moles of ethylene oxide) marketed by Shell Chemical Company; Kyro® EOB (the condensation product of $C_{13}$-$C_{15}$ alcohol with 9 moles ethylene oxide), marketed by The Procter & Gamble Company. The nonionic surfactants may exhibit an HLB range of from about 8 to about 17 and/or from about 12 to about 16. Condensates with propylene oxide and/or butylene oxides may also be used.

Examples of other suitable nonionic surfactants are the commercially-available Pluronic® surfactants, marketed by BASF, the commercially available Tetronic® compounds, marketed by BASF, and the commercially available Plurafac® surfactants, marketed by BASF.

In one aspect of the invention, nonionic surfactants combined with anionic surfactants provide desirable foam properties; in other aspect, nonionic surfactant combined with zwiterionic and anionic surfactant provide desirable foam properties.

d. Zwitterionic Surfactants

Non-limiting examples of zwitterionic surfactants include betaines, amine oxides, sulfobetaines (sultaines) and mixtures thereof. Examples of suitable betaines include alkyl ($C_{12}$-$C_{16}$) dimethyl betaine (e.g., Mackam CB ULS HP from Solvay), and cocamido propyl betaine (e.g., Tego 17 from Evonik). Examples of suitable amine oxides include $C_{12}$-$C_{16}$ dimethyl amine oxide such as Ammonyx LO and Ammonyx MO available from the Stepan Corporation. Sulfobetaines according to the invention include coconut-based chain length sulfobetaines (sultaines) and hydroxy propyl sulfobetaines (sultaines), including lauramido propyl hydroxyl sultaine and cocoamido propyl hydroxyl sultaine available from Colonial Chemical under the tradenames Cola Teric LMHS and Cola Teric CBS respectively.

$C_{12}$-$C_{16}$ dimethyl amine oxide, cocamido propyl sultaine and cocamido propyl betaine surfactant powders/particles are among preferred surfactants for use herein, either as single surfactant particles (e.g., coacamido propyl hydroxyl sultaine as the only surfactant in the composition) or in combination with surfactant particles of other surfactant type classes. The zwitterionic surfactant particles are preferably produced as particles by spray drying corresponding commercially available aqueous raw materials. In addition to high foam, these surfactants offer broad range compatibility with other classes of surfactants, including anionic, cationic and non-ionic surfactants. They can be combined with cationic tertiary amine and quaternary ammonium surfactants to provide antimicrobial benefits; they are also particularly useful when combined with sulfonated and sulfated anionic surfactants as foam boosters and stabilizers. Such surfactant combinations can optionally include magnesium and/or calcium salt particles. In one aspect, the surfactant system comprises a combination of coconut sulfate, amine oxide and magnesium salt particles blended together; in another aspect the surfactant system comprises sulfonated alkylpolyglucoside and cocamido propyl betaine particles blended together.

e. Amphoteric Surfactants

Non-limiting examples of amphoteric surfactants include: aliphatic derivatives of secondary or tertiary amines, or aliphatic derivatives of heterocyclic secondary and tertiary amines in which the aliphatic radical can be straight- or branched-chain and mixtures thereof. One of the aliphatic substituents may contain at least about 8 carbon atoms, for example from about 8 to about 18 carbon atoms, and at least one contains an anionic water-solubilizing group, e.g. carboxy, sulfonate, sulfate. See U.S. Pat. No. 3,929,678 at column 19, lines 18-35, for suitable examples of amphoteric surfactants.

The particulate foaming surfactant may have a particle size distribution such that the D50 particle size is from about 50 micrometers to about 2000 micrometers, preferably from about 100 micrometers to about 1500 micrometers, preferably from about 150 micrometers to about 1200 micrometers, preferably from about 200 micrometers to about 1000 micrometers, preferably from about 300 micrometers to about 850 micrometers, preferably from about 350 micrometers to about 700 micrometers. The particulate foaming surfactant may have a particle size distribution such that the D20 particle size is greater than about 150 micrometers, preferably greater than about 200 micrometers, preferably greater than about 250 micrometers; and the D80 particle size is less than about 1400 micrometers, preferably less than about 1200 micrometers, preferably less than about 1000 micrometers. The particulate foaming surfactant may have a particle size distribution such that the D10 particle size is greater than about 150 micrometers, preferably greater than about 200 micrometers, preferably greater than about 250 micrometers; and the D90 particle size is less than about 1400 micrometers, preferably less than about 1200 micrometers, preferably less than about 1000 micrometers. The particle size distribution is measured according to the PARTICLE SIZE DISTRIBUTION TEST METHOD described herein below.

Particulate foaming surfactant can be incorporated in the particulate effervescent cleaning composition at a level of from about 0.1% to about 60% and/or from about 0.5% to about 25% and/or from about 0.5% to about 20% and/or from about 0.5% to about 15% and/or from about 0.5% to about 10% and/or from about 0.8% to about 10% by weight of the particulate effervescent cleaning composition and/or at a level of from about 0.1` `% to about 60% from about 0.5% to about 25% and/or from about 0.5% to about 20% and/or from about 0.5% to about 15% and/or from about 0.8% to about 15% by weight of the article.

Effervescent Activator

The particulate effervescent cleaning composition further comprises an effervescent activator. The effervescent activator activates the effervescent agent when combined with the effervescent agent and water.

Suitable effervescent activators include acids, especially when the effervescent agent is a carbonate or bicarbonate salt. Examples of acids suitable for use include, but are not limited to, tartaric acid, citric acid, fumaric acid, succinic acid, adipic acid, malic acid, oxalic acid, or sulfamic acid, either alone or in combination. Polymeric organic acids can also be used; non-limiting examples include poly (acrylic acid), poly (acrylic acid co-maleic acid), poly (maleic acid), and the like. Non-limiting examples of inorganic acids that can be used include urea hydrochloride, sodium bisulfate, phosphoric acid, and the like. Preferably, the effervescent activator is citric acid and/or tartaric acid, and more preferably citric acid.

In certain aspects, the effervescent activator is an acid comprising a coating. The coating can help prevent the effervescent activator from prematurely activating the effervescent agent. A preferred acid is citric acid and preferred coatings include maltodextrin, citrate, or anti-caking agents such as silicon dioxide. Preferred effervescent activators include citric acid coated with maltodextrin (available under the tradename Citric Acid DC), citric acid coated with citrate (available under the tradename CITROCOAT® N), or citric acid coated with silicon dioxide (available under the tradename Citric Acid S40).

When such effervescent activators are used which comprise a protective coating, then it may not be preferred or necessary to include an effervescent protecting agent in the particulate effervescent cleaning composition. When the effervescent activator does not comprise a protective coating, then it can be preferred to include an effervescent protecting agent in the particulate effervescent cleaning composition. To further ensure the storage stability of the article, it can be preferred to include both an effervescent activator comprising a protective coating and an effervescent protecting agent in the particulate effervescent cleaning composition.

The selection of specific effervescent agents and/or effervescent activators and their relative proportions depends, at least in part, upon the requirements for the amount of carbon dioxide release.

Effervescent activator can be incorporated in the particulate effervescent cleaning composition at a level of from about 5% to about 70%, preferably from about 10% to about 65%, preferably from about 15% to about 60%, by weight of the particulate effervescent cleaning composition, or at a level of from about 5% to about 70%, preferably from about 10% to about 65%, preferably from about 15% to about 60%, by weight of the article. The weight ratio of effervescent agent to effervescent activator can be used to fine-tune foam level as well as to control pH of the solubilized particles. In general, lower pH improves toilet bowl cleaning, especially hard water stains and deposits, but this often comes at the expense of foam height. The weight ratio of effervescent agent to effervescent agent activator is preferably from about 10:1 to about 1:10, more preferably from about 1:5 to about 5:1 and most preferably from about 1:3 to about 3:1. The exact ratio will depend on the nature of the effervescent activator. For carbonate-based activators, the weight ratio of agent to activator is preferably from about 5:1 to about 1:5; for bicarbonate-based activators, the weight ratio of agent to activator is preferably from about 10:1 to about 1:10.

In one example, at least one of the effervescent agent and effervescent activator is in anhydrous form. In one aspect, both the effervescent agent and the effervescent activator are in anhydrous form.

Effervescent Protecting Agents

The particulate effervescent cleaning composition of the present invention can optionally further comprise an effervescent protecting agent. Effervescent protecting agents can serve to prevent or mitigate premature activation of the effervescent agent by the effervescent activator. For example, the effervescent protecting agent can prevent ambient humidity from prematurely activating a combination of the effervescent agent and the effervescent activator in the article (e.g. during shipment or storage).

Suitable effervescent protecting agents include desiccants, inorganic absorbents, organic absorbents, and the like. Non-limiting examples of desiccants include silica, metal salts, metal sulfates, and the like. Non-limiting examples of inorganic absorbents include porous materials such as ceramics, zeolites, and the like. Non-limiting examples of organic absorbents include absorbent gels, peat moss, coir, and the like. Preferred effervescent protecting agents include silica and/or zeolite.

Effervescent protecting agents can be incorporated in the particulate effervescent cleaning composition at a level of from about 0.1% to about 25%, preferably from about 0.5% to about 15%, preferably from about 1% to about 15%, by weight of the particulate effervescent cleaning composition, or at a level of from about 0.1% to about 25%, preferably from about 0.5% to about 20%, preferably from about 1% to about 15%, by weight of the article.

The particulate effervescent cleaning composition can optionally further comprise adjunct ingredients and actives, as described in detail herein below. A preferred adjunct ingredient active for inclusion in the particulate effervescent cleaning composition is perfume.

Methods of Making Effervescent Foaming Compositions

The present invention also relates to methods of making effervescent foaming compositions. Non-limiting examples of such methods are described below. The invention includes a method for making an effervescent foaming system comprising the steps of:

a) coating an effervescent agent particle with a foaming surfactant to produce a coated effervescent agent particle; and
b) blending said coated effervescent agent particle with an effervescent activator particle to produce an effervescent foaming system.

The invention also includes a method for making an effervescent foaming system comprising the steps of:

a) coating an effervescent activator particle with a foaming surfactant, to produce a coated effervescent activator particle; and
b) blending said coated effervescent activator particle with an effervescent agent particle to produce an effervescent foaming system.

The invention also provides for a method for making a foaming composition comprising the steps of:

a) forming an effervescent foaming system; and
b) blending said effervescent foaming system with a perfume delivery system comprising a silica or zeolite carrier and perfume.

The invention also provides for a method for making a foaming composition comprising the steps of:

a) forming an effervescent foaming composition precursor by blending together an effervescent agent particle, an effervescent activator particle and a foaming surfactant particle; and
b) blending said effervescent foaming composition precursor with a bleach selected from the group consisting of potassium monopersulfate, 6-phthalimido peroxyhexanoic acid, sodium percarbonate, and mixtures thereof.

The invention also provides a method for making an effervescent foaming composition comprising the steps of:

a) forming an effervescent foaming composition precursor by blending together an effervescent agent particle, an effervescent activator particle and a foaming surfactant particle; and
b) blending said effervescent foaming composition precursor with a soil release polymer delivery system comprising a silica or zeolite carrier and soil release polymer.

The invention also provides a method for making an effervescent foaming composition comprising the steps of:

a) forming an effervescent foaming composition precursor by blending together an effervescent agent particle, an effervescent activator particle and a foaming surfactant particle; and
b) blending said effervescent foaming composition precursor with an enzyme delivery system comprising a silica or zeolite carrier and enzyme.

The invention also provides a method for making an effervescent foaming composition comprising the steps of:

a) forming an effervescent foaming composition precursor by blending together an effervescent agent particle, an effervescent activator particle and a foaming surfactant particle; and
b) blending said effervescent foaming composition precursor with a bacterial spore delivery system comprising a silica or zeolite carrier and bacterial spore.

The invention also provides a method for making an effervescent foaming composition comprising the steps of:

a) forming an effervescent foaming composition precursor by blending together an effervescent agent particle, an effervescent activator particle and a foaming surfactant particle; and
b) blending said effervescent foaming composition precursor with an antimicrobial compound.

Soluble Fibrous Structure

The water disintegrable, foam producing article of the present invention comprises a soluble fibrous structure that encases the particulate effervescent cleaning composition. The fibrous structure may be in the form of one or more layers or plies. The fibrous structure may be in the form of a pouch having encased therein the particulate effervescent cleaning composition. Alternately, the fibrous structure may be in any other form that is capable of containing and subsequently releasing the particulate effervescent cleaning composition, such as a co-form wherein the particulate effervescent cleaning composition is commingled with fibrous elements of the soluble fibrous structure.

In one aspect, the fibrous structure comprises a plurality of identical or substantially identical (from a compositional perspective) fibrous elements according to the present disclosure. In another aspect, the fibrous structure may comprise two or more different fibrous elements according to the present disclosure. Non-limiting examples of differences in the fibrous elements may be physical differences such as differences in diameter, length, texture, shape, rigidness, elasticity, and the like; chemical differences such as crosslinking level, solubility, melting point, Tg, active agent, filament-forming material, color, level of active agent, basis weight, level of filament-forming material, presence of any coating on fibrous element, biodegradable or not, hydrophobic or not, contact angle, and the like; differences in whether the fibrous element loses its physical structure when the fibrous element is exposed to conditions of intended use; differences in whether the fibrous element's morphology changes when the fibrous element is exposed to conditions of intended use; and differences in rate at which the fibrous element releases one or more of its active agents when the fibrous element is exposed to conditions of intended use. In one aspect, two or more fibrous elements and/or particles within the fibrous structure may comprise different active agents. This may be the case where the different active agents may be incompatible with one another, for example an anionic surfactant (such as a shampoo active agent) and a cationic surfactant (such as a hair conditioner active agent).

In one aspect, the fibrous elements and/or particles of the particulate effervescent cleaning agent may be arranged within the fibrous structure to provide the fibrous structure with two or more regions or layers that comprise different active agents. For example, one region of the fibrous structure may comprise the effervescent agent and another region may contain the effervescent activator.

Suitable soluble fibrous structures are also described in more detail in U.S. Patent Application Publication No. 2018/0216288 A1 incorporated herein by reference.

Fibrous Elements

The fibrous elements may be water-soluble or water-insoluble. In one aspect, the fibrous elements comprise one or more filament-forming materials. In another aspect, the fibrous elements comprise one or more active agents. In still another aspect, the fibrous elements comprise one or more filament-forming materials and one or more active agents. In another aspect, the fibrous elements may comprise water-soluble fibrous elements.

The fibrous element, such as a filament and/or fiber, of the present disclosure comprises one or more filament-forming materials. In addition to the filament-forming materials, the fibrous element may further comprise one or more active agents that are releasable from the fibrous element, such as when the fibrous element and/or fibrous structure comprising the fibrous element is exposed to conditions of intended use. In one aspect, the total level of the one or more filament-forming materials present in the fibrous element is less than 80% by weight on a dry fibrous element basis and/or dry fibrous structure basis and the total level of the one or more active agents present in the fibrous element is greater than 20% by weight on a dry fibrous element basis and/or dry fibrous structure basis.

In one aspect, the fibrous element of the present disclosure comprises about 100% and/or greater than 95% and/or greater than 90% and/or greater than 85% and/or greater than 75% and/or greater than 50% by weight on a dry fibrous element basis and/or dry fibrous structure basis of one or more filament-forming materials. For example, the filament-forming material may comprise polyvinyl alcohol, starch, carboxymethylcellulose, and other suitable polymers, especially hydroxyl polymers.

In another aspect, the fibrous element of the present disclosure comprises one or more filament-forming materials and one or more active agents wherein the total level of filament-forming materials present in the fibrous element is from about 5% to less than 80% by weight on a dry fibrous element basis and/or dry fibrous structure basis and the total level of active agents present in the fibrous element is greater than 20% to about 95% by weight on a dry fibrous element basis and/or dry fibrous structure basis.

In one aspect, the fibrous element of the present disclosure comprises at least 10% and/or at least 15% and/or at least 20% and/or less than less than 80% and/or less than 75% and/or less than 65% and/or less than 60% and/or less than 55% and/or less than 50% and/or less than 45% and/or less than 40% by weight on a dry fibrous element basis and/or dry fibrous structure basis of the filament-forming materials and greater than about 20% and/or at least about 30% and/or at least about 35% and/or at least about 40% and/or at least about 45% and/or at least about 50% and/or at least about 60% and/or less than about 95% and/or less than about 90% and/or less than about 85% and/or less than about 80% and/or less than about 75% by weight on a dry fibrous element basis and/or dry fibrous structure basis of active agents.

In one aspect, the fibrous element of the present disclosure comprises at least 5% and/or at least 10% and/or at least 15% and/or at least 20% and/or less than 50% and/or less than 45% and/or less than 40% and/or less than 35% and/or less than 30% and/or less than 25% by weight on a dry fibrous element basis and/or dry fibrous structure basis of the filament-forming materials and greater than about 30% and/or at least about 50% and/or at least about 55% and/or at least about 60% and/or at least about 65% and/or at least about 70% and/or less than about 95% and/or less than about 90% and/or less than about 85% and/or less than about 80% and/or less than about 75% by weight on a dry fibrous element basis and/or dry fibrous structure basis of active agents. In one aspect, the fibrous element of the present disclosure comprises greater than 80% by weight on a dry fibrous element basis and/or dry fibrous structure basis of active agents.

In another aspect, the one or more filament-forming materials and active agents are present in the fibrous element at a weight ratio of total level of filament-forming materials to active agents of 4.0 or less and/or 3.5 or less and/or 3.0 or less and/or 2.5 or less and/or 2.0 or less and/or 1.85 or less and/or less than 1.7 and/or less than 1.6 and/or less than 1.5 and/or less than 1.3 and/or less than 1.2 and/or less than 1 and/or less than 0.7 and/or less than 0.5 and/or less than 0.4 and/or less than 0.3 and/or greater than 0.1 and/or greater than 0.15 and/or greater than 0.2.

In still another aspect, the fibrous element of the present disclosure comprises from about 10% and/or from about 15% to less than 80% by weight on a dry fibrous element basis and/or dry fibrous structure basis of a filament-forming material, such as polyvinyl alcohol polymer, starch polymer, and/or carboxymethylcellulose polymer, and greater than 20% to about 90% and/or to about 85% by weight on a dry fibrous element basis and/or dry fibrous structure basis of an active agent. The fibrous element may further comprise a plasticizer, such as glycerin and/or pH adjusting agents, such as citric acid.

In yet another aspect, the fibrous element of the present disclosure comprises from about 10% and/or from about 15% to less than 80% by weight on a dry fibrous element basis and/or dry fibrous structure basis of a filament-forming material, such as polyvinyl alcohol polymer, starch polymer, and/or carboxymethylcellulose polymer, and greater than 20% to about 90% and/or to about 85% by weight on a dry fibrous element basis and/or dry fibrous structure basis of an active agent, wherein the weight ratio of filament-forming material to active agent is 4.0 or less. The fibrous element may further comprise a plasticizer, such as glycerin and/or pH adjusting agents, such as citric acid.

In even another aspect of the present disclosure, a fibrous element comprises one or more filament-forming materials and one or more active agents selected from the group consisting of: enzymes, bleaching agents, builder, chelants, dispersants, and mixtures thereof that are releasable and/or released when the fibrous element and/or fibrous structure comprising the fibrous element is exposed to conditions of intended use. In one aspect, the fibrous element comprises a total level of filament-forming materials of less than 95% and/or less than 90% and/or less than 80% and/or less than 50% and/or less than 35% and/or to about 5% and/or to about 10% and/or to about 20% by weight on a dry fibrous element basis and/or dry fibrous structure basis and a total level of active agents selected from the group consisting of: enzymes, bleaching agents, builder, chelants, perfumes, antimicrobials, antibacterials, antifungals, and mixtures thereof of greater than 5% and/or greater than 10% and/or greater than 20% and/or greater than 35% and/or greater than 50% and/or greater than 65% and/or to about 95% and/or to about 90% and/or to about 80% by weight on a dry fibrous element basis and/or dry fibrous structure basis. In one aspect, the active agent comprises one or more enzymes. In another aspect, the active agent comprises one or more bleaching agents. In yet another aspect, the active agent comprises one or more builders. In still another aspect, the active agent comprises one or more chelants. In still another aspect, the active agent comprises one or more perfumes. In even still another aspect, the active agent comprises one or more antimicrobials, antibacterials, and/or antifungals.

In yet another aspect of the present disclosure, the fibrous elements of the present disclosure may comprise active agents that may create health and/or safety concerns if they become airborne. For example, the fibrous element may be used to inhibit enzymes within the fibrous element from becoming airborne.

In one aspect, the fibrous elements of the present disclosure may be meltblown fibrous elements. In another aspect, the fibrous elements of the present disclosure may be spunbond fibrous elements. In another aspect, the fibrous elements may be hollow fibrous elements prior to and/or after release of one or more of its active agents.

The fibrous elements of the present disclosure may be hydrophilic or hydrophobic. The fibrous elements may be surface treated and/or internally treated to change the inherent hydrophilic or hydrophobic properties of the fibrous element.

In one aspect, the fibrous element exhibits a diameter of less than 100 μm and/or less than 75 μm and/or less than 50 μm and/or less than 25 μm and/or less than 10 μm and/or less than 5 μm and/or less than 1 μm as measured according to the Diameter Test Method described herein. In another aspect, the fibrous element of the present disclosure exhibits a diameter of greater than 1 μm as measured according to the Diameter Test Method described herein. The diameter of a fibrous element of the present disclosure may be used to control the rate of release of one or more active agents present in the fibrous element and/or the rate of loss and/or altering of the fibrous element's physical structure.

The fibrous element may comprise two or more different active agents. In one aspect, the fibrous element comprises two or more different active agents, wherein the two or more different active agents are compatible with one another. In another aspect, the fibrous element comprises two or more different active agents, wherein the two or more different active agents are incompatible with one another.

In one aspect, the fibrous element may comprise an active agent within the fibrous element and an active agent on an external surface of the fibrous element, such as an active agent coating on the fibrous element. The active agent on the external surface of the fibrous element may be the same or different from the active agent present in the fibrous element. If different, the active agents may be compatible or incompatible with one another.

In another aspect, the fibrous structure or article of the present disclosure may comprise a coating on the external fibrous elements or filaments on one of the surfaces of the plies of the article. The coating may be applied to a surface of a ply and the surface with the coating may be an outer surface of the overall article or may be a surface internal to the article. Placement of the coating depends upon the benefit or active agent desired to be delivered. For example, coatings on an outer surface ply of the article would be more readily visible to a consumer, as it is on a consumer viewable surface. A coating on internal surface ply of the article may be less visible, as it may be hidden from direct view by a consumer. Placement of the coating on an internal surface and/or an outer surface of the article will be achieved as part of the article making process. A coating on an internal surface ply may be different or the same as coatings on the outer surface of the article. In one aspect, an article may have coatings on outer surfaces and/or internal surfaces of the article. In another aspect, an article may have coatings on outer surfaces and/or internal surfaces of plies making up the article. In yet another aspect, an article may have a silicone active agent comprising a coating or an amino-silicone comprising a coating on outer surfaces and/or internal surfaces of plies making up the article.

In one aspect, one or more active agents may be uniformly distributed or substantially uniformly distributed throughout the fibrous element. In another aspect, one or more active agents may be distributed as discrete regions within the fibrous element. In still another aspect, at least one active agent is distributed uniformly or substantially uniformly throughout the fibrous element and at least one other active agent is distributed as one or more discrete regions within the fibrous element. In still yet another aspect, at least one active agent is distributed as one or more discrete regions within the fibrous element and at least one other active agent is distributed as one or more discrete regions different from the first discrete regions within the fibrous element.

Filament-Forming Material

The filament-forming material is any suitable material, such as a polymer or monomers capable of producing a polymer that exhibits properties suitable for making a filament, such as by a spinning process.

In one aspect, the filament-forming material may comprise a polar solvent-soluble material, such as an alcohol-soluble material and/or a water-soluble material.

In another aspect, the filament-forming material may comprise a non-polar solvent-soluble material.

In still another aspect, the filament-forming material may comprise a water-soluble material and be free (less than 5% and/or less than 3% and/or less than 1% and/or 0% by weight on a dry fibrous element basis and/or dry fibrous structure basis) of water-insoluble materials.

In yet another aspect, the filament-forming material may be a film-forming material. In still yet another aspect, the filament-forming material may be synthetic or of natural origin and it may be chemically, enzymatically, and/or physically modified.

In even another aspect of the present disclosure, the filament-forming material may comprise a polymer selected from the group consisting of: polymers derived from acrylic monomers such as the ethylenically unsaturated carboxylic monomers and ethylenically unsaturated monomers, polyvinyl alcohol, polyvinylformamide, polyvinylamine, polyacrylates, polymethacrylates, copolymers of acrylic acid and methyl acrylate, polyvinylpyrrolidones, polyalkylene oxides, starch and starch derivatives, pullulan, gelatin, and cellulose derivatives (for example, hydroxypropylmethyl celluloses, methyl celluloses, carboxymethy celluloses).

In still another aspect, the filament-forming material may comprises a polymer selected from the group consisting of: polyvinyl alcohol, polyvinyl alcohol derivatives, starch, starch derivatives, cellulose derivatives, hemicellulose, hemicellulose derivatives, proteins, sodium alginate, hydroxypropyl methylcellulose, chitosan, chitosan derivatives, polyethylene glycol, tetramethylene ether glycol, polyvinyl pyrrolidone, hydroxymethyl cellulose, hydroxyethyl cellulose, carboxymethyl cellulose, and mixtures thereof.

In another aspect, the filament-forming material comprises a polymer is selected from the group consisting of: pullulan, hydroxypropylmethyl cellulose, hydroxyethyl cellulose, hydroxypropyl cellulose, polyvinyl pyrrolidone, carboxymethylcellulose, sodium alginate, xanthan gum, tragacanth gum, guar gum, acacia gum, Arabic gum, polyacrylic acid, methylmethacrylate copolymer, carboxyvinyl polymer, dextrin, pectin, chitin, levan, elsinan, collagen, gelatin, zein, gluten, soy protein, casein, polyvinyl alcohol, carboxylated polyvinyl alcohol, sulfonated polyvinyl alcohol, starch, starch derivatives, hemicellulose, hemicellulose derivatives, proteins, chitosan, chitosan derivatives, polyethylene glycol, tetramethylene ether glycol, hydroxymethyl cellulose, and mixtures thereof.

Water-Soluble Materials

Non-limiting examples of water-soluble materials include water-soluble polymers. The water-soluble polymers may be synthetic or natural original and may be chemically and/or physically modified. In one aspect, the polar solvent-soluble polymers exhibit a weight average molecular weight of at least 10,000 g/mol and/or at least 20,000 g/mol and/or at least 40,000 g/mol and/or at least 80,000 g/mol and/or at least 100,000 g/mol and/or at least 1,000,000 g/mol and/or at least 3,000,000 g/mol and/or at least 10,000,000 g/mol and/or at least 20,000,000 g/mol and/or to about 40,000,000 g/mol and/or to about 30,000,000 g/mol. So as to drive material solubilisation and disintegration properties in water, especially cold water (e.g., 5° C.-30° C.), polymers of molecular weight from about 10,000 g/mol to about 1,000,000 g/mol are preferred, and polymers of molecular weight from about 20,000 g/mol to about 500,000 g/mol are most preferred.

Non-limiting examples of water-soluble polymers include water-soluble hydroxyl polymers, water-soluble thermoplastic polymers, water-soluble biodegradable polymers, water-soluble non-biodegradable polymers and mixtures thereof. In one aspect, the water-soluble polymer comprises polyvinyl alcohol. In another aspect, the water-soluble polymer comprises starch. In yet another aspect, the water-soluble polymer comprises polyvinyl alcohol and starch. In yet another aspect, the water-soluble polymer comprises carboxymethyl cellulose. In yet another aspect, the polymer comprises carboxymethyl cellulose and polyvinyl alcohol.

a. Water-soluble Hydroxyl Polymers—Non-limiting examples of water-soluble hydroxyl polymers in accordance with the present disclosure include polyols, such as polyvinyl alcohol, polyvinyl alcohol derivatives, polyvinyl alcohol copolymers, starch, starch derivatives, starch copolymers, chitosan, chitosan derivatives, chitosan copolymers, cellulose derivatives such as cellulose ether and ester derivatives, cellulose copolymers, hemicellulose, hemicellulose derivatives, hemicellulose copolymers, gums, arabinans, galactans, proteins, carboxymethylcellulose, and various other polysaccharides and mixtures thereof.

In one aspect, a water-soluble hydroxyl polymer of the present disclosure comprises a polysaccharide.

"Polysaccharides" as used herein means natural polysaccharides and polysaccharide derivatives and/or modified polysaccharides. Suitable water-soluble polysaccharides include, but are not limited to, starches, starch derivatives, chitosan, chitosan derivatives, cellulose derivatives, hemicellulose, hemicellulose derivatives, gums, arabinans, galactans and mixtures thereof. The water-soluble polysaccharide may exhibit a weight average molecular weight of from about 10,000 to about 40,000,000 g/mol and/or greater than 100,000 g/mol and/or greater than 1,000,000 g/mol and/or greater than 3,000,000 g/mol and/or greater than 3,000,000 to about 40,000,000 g/mol.

The water-soluble polysaccharides may comprise non-cellulose and/or non-cellulose derivative and/or non-cellulose copolymer water-soluble polysaccharides. Such non-cellulose water-soluble polysaccharides may be selected from the group consisting of: starches, starch derivatives, chitosan, chitosan derivatives, hemicellulose, hemicellulose derivatives, gums, arabinans, galactans and mixtures thereof.

In another aspect, a water-soluble hydroxyl polymer of the present disclosure comprises a non-thermoplastic polymer.

The water-soluble hydroxyl polymer may have a weight average molecular weight of from about 10,000 g/mol to about 40,000,000 g/mol and/or greater than 100,000 g/mol and/or greater than 1,000,000 g/mol and/or greater than 3,000,000 g/mol and/or greater than 3,000,000 g/mol to about 40,000,000 g/mol. Higher and lower molecular weight water-soluble hydroxyl polymers may be used in combination with hydroxyl polymers having a certain desired weight average molecular weight.

Well known modifications of water-soluble hydroxyl polymers, such as natural starches, include chemical modifications and/or enzymatic modifications. For example, natural starch can be acid-thinned, hydroxy-ethylated, hydroxy-propylated, and/or oxidized. In addition, the water-soluble hydroxyl polymer may comprise dent corn starch.

Naturally occurring starch is generally a mixture of linear amylose and branched amylopectin polymer of D-glucose units. The amylose is a substantially linear polymer of D-glucose units joined by (1,4)-α-D links. The amylopectin is a highly branched polymer of D-glucose units joined by (1,4)-α-D links and (1,6)-α-D links at the branch points. Naturally occurring starch typically contains relatively high levels of amylopectin, for example, corn starch (64-80% amylopectin), waxy maize (93-100% amylopectin), rice (83-84% amylopectin), potato (about 78% amylopectin), and wheat (73-83% amylopectin). Though all starches are potentially useful herein, the present disclosure is most commonly practiced with high amylopectin natural starches derived from agricultural sources, which offer the advantages of being abundant in supply, easily replenishable and inexpensive.

As used herein, "starch" includes any naturally occurring unmodified starches, modified starches, synthetic starches and mixtures thereof, as well as mixtures of the amylose or amylopectin fractions; the starch may be modified by physical, chemical, or biological processes, or combinations thereof. The choice of unmodified or modified starch for the present disclosure may depend on the end product desired. In one aspect of the present disclosure, the starch or starch mixture useful in the present disclosure has an amylopectin content from about 20% to about 100%, more typically from about 40% to about 90%, even more typically from about 60% to about 85% by weight of the starch or mixtures thereof.

Suitable naturally occurring starches can include, but are not limited to, corn starch, potato starch, sweet potato starch, wheat starch, sago palm starch, tapioca starch, rice starch, soybean starch, arrow root starch, amioca starch, bracken starch, lotus starch, waxy maize starch, and high amylose corn starch. Naturally occurring starches particularly, corn starch and wheat starch, are the preferred starch polymers due to their economy and availability.

Polyvinyl alcohols herein can be grafted with other monomers to modify its properties. A wide range of monomers has been successfully grafted to polyvinyl alcohol. Non-limiting examples of such monomers include vinyl acetate, styrene, acrylamide, acrylic acid, 2-hydroxyethyl methacrylate, acrylonitrile, 1,3-butadiene, methyl methacrylate, methacrylic acid, maleic acid, itaconic acid, sodium vinylsulfonate, sodium allylsulfonate, sodium methylallyl sulfonate, sodium phenylallylether sulfonate, sodium phenylmethallylether sulfonate, 2-acrylamide-methyl propane sulfonic acid (AMPs), vinylidene chloride, vinyl chloride, vinyl amine and a variety of acrylate esters.

In one aspect, the water-soluble hydroxyl polymer is selected from the group consisting of: polyvinyl alcohols, hydroxymethylcelluloses, hydroxyethylcelluloses, hydroxypropylmethylcelluloses, carboxymethylcelluloses, and mixtures thereof. A non-limiting example of a suitable polyvinyl alcohol includes those commercially available from Sekisui Specialty Chemicals America, LLC (Dallas, TX) under the CELVOL® trade name Another non-limiting example of a suitable polyvinyl alcohol includes G Polymer commercially available from Nippon Ghosei. A non-limiting example of a suitable hydroxypropylmethylcellulose includes those commercially available from the Dow Chemical Company (Midland, MI) under the METHOCEL® trade name including combinations with above mentioned polyvinyl alcohols. Most preferred hydroxyl polymers for use herein are poly (vinyl alcohol) polymers.

b. Water-soluble Thermoplastic Polymers—Non-limiting examples of suitable water-soluble thermoplastic polymers include thermoplastic starch and/or starch derivatives, polylactic acid, polyhydroxyalkanoate, polycaprolactone, polyesteramides and certain polyesters, and mixtures thereof.

The water-soluble thermoplastic polymers of the present disclosure may be hydrophilic or hydrophobic. The water-soluble thermoplastic polymers may be surface treated and/or internally treated to change the inherent hydrophilic or hydrophobic properties of the thermoplastic polymer.

The water-soluble thermoplastic polymers may comprise biodegradable polymers.

Any suitable weight average molecular weight for the thermoplastic polymers may be used. For example, the weight average molecular weight for a thermoplastic polymer in accordance with the present disclosure is greater than about 10,000 g/mol and/or greater than about 40,000 g/mol and/or greater than about 50,000 g/mol and/or less than about 500,000 g/mol and/or less than about 400,000 g/mol and/or less than about 200,000 g/mol.

Filament-Forming Composition

The fibrous elements of the present disclosure are made from a filament-forming composition. The filament-forming composition is a polar-solvent-based composition. In one aspect, the filament-forming composition is an aqueous composition comprising one or more filament-forming materials and one or more active agents.

The filament-forming composition of the present disclosure may have a shear viscosity as measured according to the Shear Viscosity Test Method described herein of from about 1 Pascal·Seconds to about 25 Pascal·Seconds and/or from about 2 Pascal·Seconds to about 20 Pascal·Seconds and/or from about 3 Pascal·Seconds to about 10 Pascal·Seconds, as measured at a shear rate of 3,000 $sec^{-1}$ and at the processing temperature (50° C. to 100° C.).

The filament-forming composition may be processed at a temperature of from about 50° C. to about 100° C. and/or from about 65° C. to about 95° C. and/or from about 70° C. to about 90° C. when making fibrous elements from the filament-forming composition.

In one aspect, the filament-forming composition may comprise at least 20% and/or at least 30% and/or at least 40% and/or at least 45% and/or at least 50% to about 90% and/or to about 85% and/or to about 80% and/or to about 75% by weight of one or more filament-forming materials, one or more active agents, and mixtures thereof. The filament-forming composition may comprise from about 10% to about 80% by weight of a polar solvent, such as water.

In one aspect, non-volatile components of the filament-forming composition may comprise from about 20% and/or 30% and/or 40% and/or 45% and/or 50% to about 75% and/or 80% and/or 85% and/or 90% by weight based on the total weight of the filament-forming composition. The non-volatile components may be composed of filament-forming materials, such as backbone polymers, active agents and combinations thereof. Volatile components of the filament-forming composition will comprise the remaining percentage and range from 10% to 80% by weight based on the total weight of the filament-forming composition.

"Polymer processing" as used herein means any spinning operation and/or spinning process by which a fibrous element comprising a processed filament-forming material is formed from a filament-forming composition. The spinning operation and/or process may include spun bonding, melt blowing, electro-spinning, rotary spinning, continuous filament producing and/or tow fiber producing operations/processes. A "processed filament-forming material" as used herein means any filament-forming material that has undergone a melt processing operation and a subsequent polymer processing operation resulting in a fibrous element.

The fluid viscosity will depend on the temperature and may depend of the shear rate. The definition of a shear thinning fluid includes a dependence on the shear rate. The surface tension will depend on the makeup of the fluid and the temperature of the fluid.

In one aspect, the filament-forming composition may comprise one or more release agents and/or lubricants. Non-limiting examples of suitable release agents and/or lubricants include fatty acids, fatty acid salts, fatty alcohols, fatty esters, sulfonated fatty acid esters, fatty amine acetates and fatty amides, silicones, amino-silicones, fluoropolymers and mixtures thereof.

In one aspect, the filament-forming composition may comprise one or more anti-blocking and/or detackifying agents. Non-limiting examples of suitable anti-blocking and/or detackifying agents include starches, modified starches, crosslinked polyvinylpyrrolidone, crosslinked cellulose, microcrystalline cellulose, silica, metallic oxides, calcium carbonate, talc and mica.

Active agents of the present disclosure may be added to the filament-forming composition prior to and/or during fibrous element formation and/or may be added to the fibrous element after fibrous element formation. For example, a perfume active agent may be applied to the fibrous element and/or fibrous structure comprising the fibrous element after the fibrous element and/or fibrous structure according to the present disclosure are formed. In another aspect, an enzyme active agent may be applied to the fibrous element and/or fibrous structure comprising the fibrous element after the fibrous element and/or fibrous structure according to the present disclosure are formed. In still another aspect, one or more particles, which may not be suitable for passing through the spinning process for making the fibrous element, may be applied to the fibrous element and/or fibrous structure comprising the fibrous element after the fibrous element and/or fibrous structure according to the present disclosure are formed.

Extensional Aids

In one aspect, the fibrous element comprises an extensional aid. Non-limiting examples of extensional aids can include polymers, other extensional aids, and combinations thereof.

In one aspect, the extensional aids have a weight-average molecular weight of at least about 500,000 Da. In another aspect, the weight average molecular weight of the extensional aid is from about 500,000 to about 25,000,000, in another aspect from about 800,000 to about 22,000,000, in yet another aspect from about 1,000,000 to about 20,000,000, and in another aspect from about 2,000,000 to about 15,000,000. The high molecular weight extensional aids are preferred in some examples due to the ability to increase extensional melt viscosity and reducing melt fracture.

The extensional aid, when used in a meltblowing process, is added to the composition of the present disclosure in an amount effective to visibly reduce the melt fracture and capillary breakage of fibers during the spinning process such that substantially continuous fibers having relatively consistent diameter can be melt spun. Regardless of the process employed to produce fibrous elements and/or particles, the extensional aids, when used, can be present from about 0.001% to about 10%, by weight on a dry fibrous element basis and/or dry particle basis and/or dry fibrous structure basis, in one aspect, and in another aspect from about 0.005 to about 5%, by weight on a dry fibrous element basis and/or dry particle basis and/or dry fibrous structure basis, in yet another aspect from about 0.01 to about 1%, by weight on a dry fibrous element basis and/or dry particle basis and/or dry fibrous structure basis, and in another aspect from about 0.05% to about 0.5%, by weight on a dry fibrous element basis and/or dry particle basis and/or dry fibrous structure basis.

Non-limiting examples of polymers that can be used as extensional aids can include alginates, carrageenans, pectin, chitin, guar gum, xanthum gum, agar, gum arabic, karaya gum, tragacanth gum, locust bean gum, alkylcellulose, hydroxyalkylcellulose, carboxyalkylcellulose, and mixtures thereof.

Nonlimiting examples of other extensional aids can include modified and unmodified polyacrylamide, polyacrylic acid, polymethacrylic acid, polyvinyl alcohol, polyvinylacetate, polyvinylpyrrolidone, polyethylene vinyl acetate, polyethyleneimine, polyamides, polyalkylene oxides including polyethylene oxide, polypropylene oxide, polyethylenepropylene oxide, and mixtures thereof.

The fibrous element can optionally comprise surfactant. Suitable surfactants include those described hereinbefore with respect to the particulate effervescent cleaning composition. Surfactants for use in the fibrous element may or may not be in particulate form. Preferred surfactants for incorporation into fibrous elements include amine oxide and/or anionic surfactants such as linear benzene sulfonates.

The Figures illustrate various aspects of the water disintegrable, foam producing articles of the present invention. References to "particles" are intended to refer to particles of the particulate effervescent cleaning composition, unless otherwise noted.

As shown in FIG. 1, another aspect of an article 20, for example a fibrous structure according to the present disclosure comprises a first fibrous structure layer or ply 22 comprising a plurality of fibrous elements, for example filaments 10, a second fibrous structure layer 24 comprising a plurality of fibrous elements, for example filaments 10, and a plurality of particles or a particle layer 26 positioned between the first and second fibrous structure layers 22 and 24. A similar fibrous structure can be formed by depositing a plurality of particles on a surface of a first ply of fibrous structure comprising a plurality of fibrous elements and then associating a second ply of fibrous structure comprising a plurality of fibrous elements such that the particles or a particle layer are positioned between the first and second fibrous structure plies.

Figure 2:
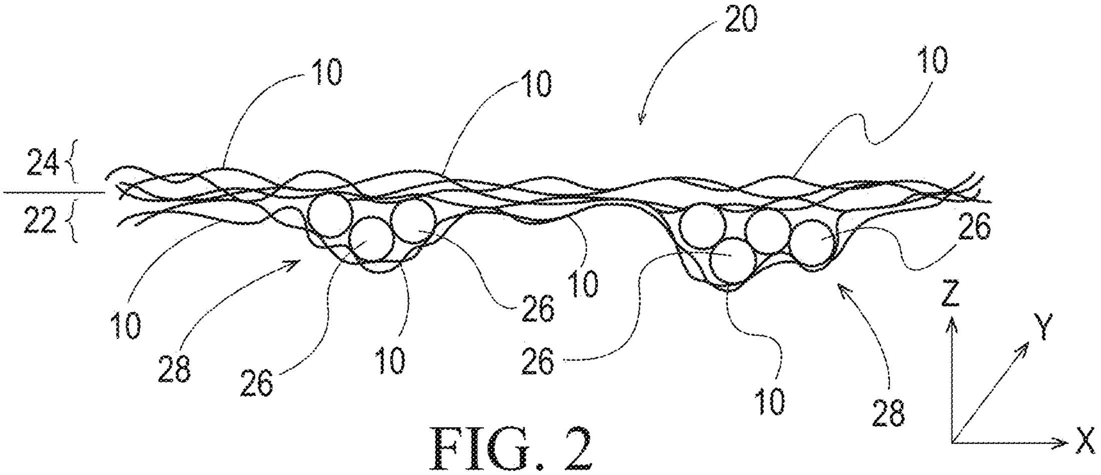
FIG. 2 is a schematic representation of a cross-sectional view of another example of a fibrous structure according to the present disclosure.

As shown in FIG. 2, another aspect of an article 20, for example a fibrous structure of the present disclosure comprises a first fibrous structure layer 22 comprising a plurality of fibrous elements, for example filaments 10, wherein the first fibrous structure layer 22 comprises one or more pockets 28 (also referred to as recesses, unfilled domes, or deflected zones), which may be in an irregular pattern or a non-random, repeating pattern. One or more of the pockets 28 may contain one or more particles 26. The article 20 in this example further comprises a second fibrous structure layer 24 that is associated with the first fibrous structure layer 22 such that the particles 26 are entrapped in the pockets 28. Like above, a similar article can be formed by depositing a plurality of particles in pockets of a first ply of fibrous structure comprising a plurality of fibrous elements and then associating a second ply of fibrous structure comprising a plurality of fibrous elements such that the particles are entrapped within the pockets of the first ply. In one aspect, the pockets may be separated from the fibrous structure to produce discrete pockets.

Figure 3:
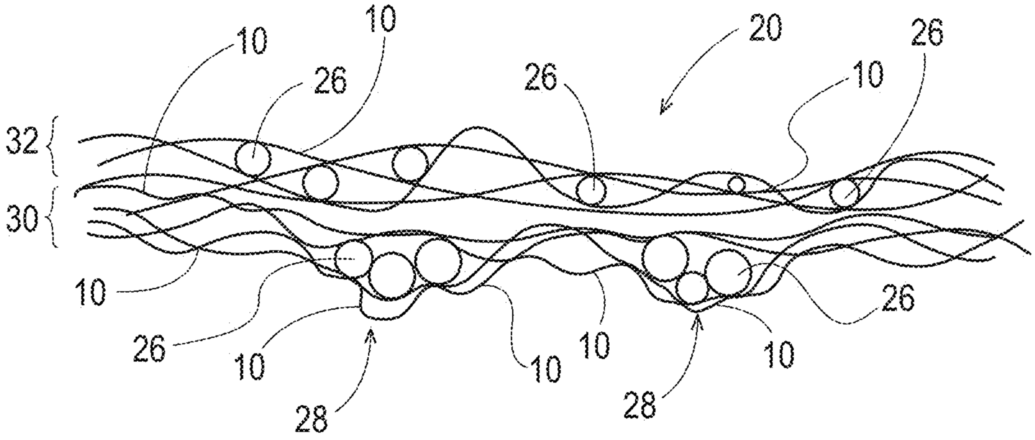
FIG. 3 is a schematic representation of a cross-sectional view of another example of a fibrous structure according to the present disclosure.

As shown in FIG. 3, another aspect of an article 20, for example a multi-ply fibrous structure of the present disclosure comprises a first ply 30 of a fibrous structure according to FIG. 2 above and a second ply 32 of fibrous structure associated with the first ply 30, wherein the second ply 32 comprises a plurality of fibrous elements, for example filaments 10, and a plurality of particles 26 dispersed, in this case randomly, in the x, y, and z axes, throughout the article 20.

Figure 4:
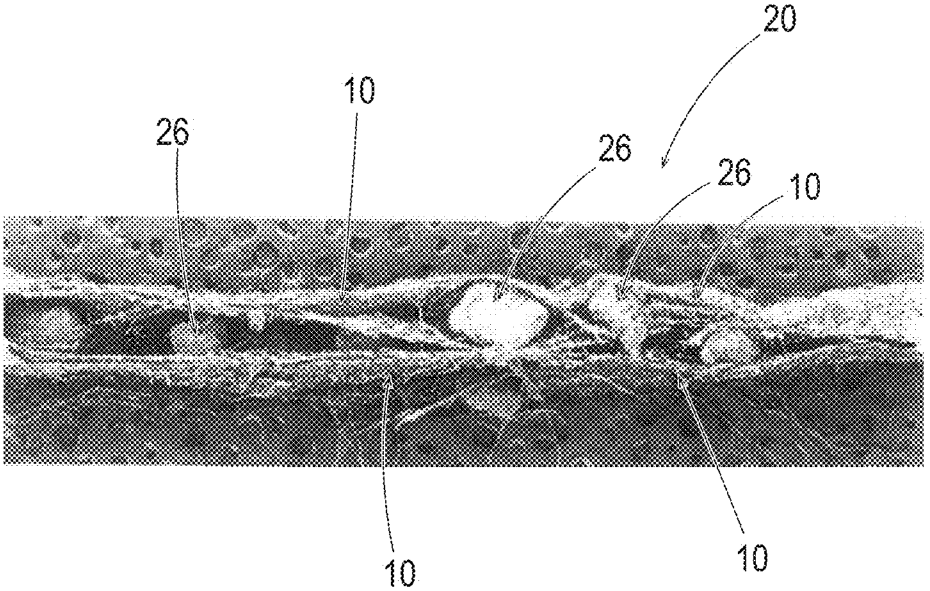
FIG. 4 is a scanning electron microscope photograph of a cross-sectional view of another example of a fibrous structure according to the present disclosure.

As shown in FIG. 4, another aspect of an article 20, for example a fibrous structure of the present disclosure comprises a plurality of fibrous elements, for example filaments 10, such as active agent-containing filaments, and a plurality of particles 26, for example active agent-containing particles, dispersed, in this case randomly, in the x, y, and z axes, throughout the fibrous structure of the article 20.

Figure 5:
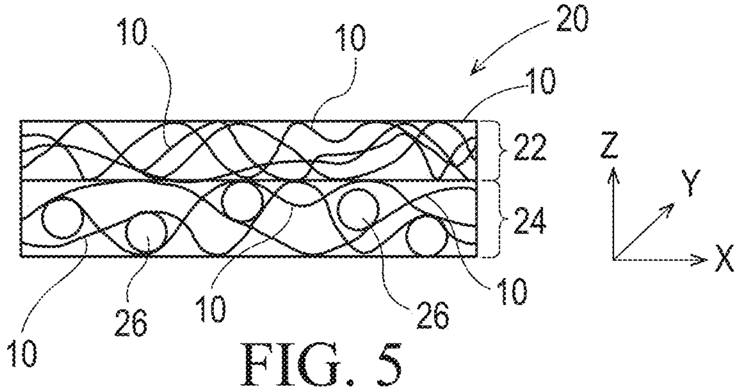
FIG. 5 is a schematic representation of a cross-sectional view of another example of a fibrous structure according to the present disclosure.

As shown in FIG. 5, another aspect of an article 20, for example a fibrous structure of the present disclosure comprises a first fibrous structure layer 22 comprising a plurality of fibrous elements, for example filaments 10, and a second fibrous structure layer 24 comprising a plurality of fibrous elements, for example filaments 10, for example active agent-containing filaments, and a plurality of particles 26, for example active agent-containing particles, dispersed, in this case randomly, in the x, y, and z axes, throughout the second fibrous structure layer 24. Alternatively, in another aspect, the plurality of particles 26, for example active agent-containing particles, may be dispersed in an irregular pattern or a non-random, repeating pattern within the second fibrous structure layer 24. Like above, a similar article comprising two plies of fibrous structure comprising a first fibrous structure ply 22 comprising a plurality of fibrous elements, for example filaments 10, and a second fibrous structure ply 24 comprising a plurality of fibrous elements, for example filaments 10, for example active agent-containing filaments, and a plurality of particles 26, for example active agent-containing particles, dispersed, in this case randomly, in the x, y, and z axes, throughout the second fibrous structure ply 24. Alternatively, in another aspect, the plurality of particles 26, for example active agent-containing particles, may be dispersed in an irregular pattern or a non-random, repeating pattern within the second fibrous structure ply 24.

Figure 6:
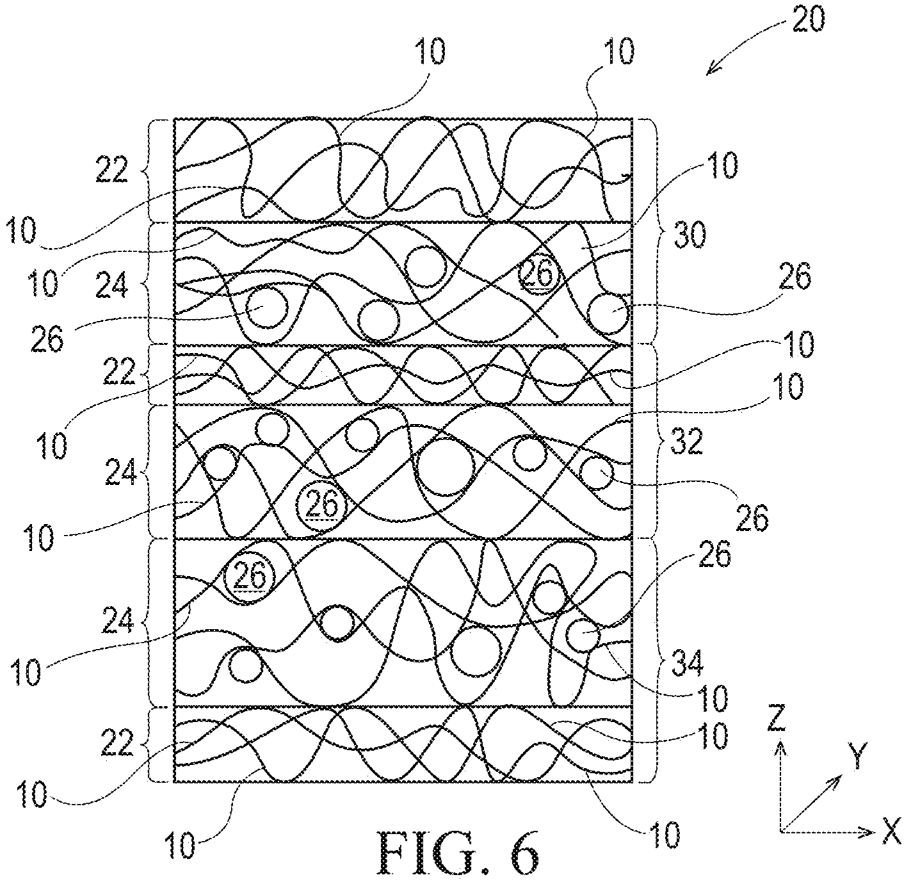
FIG. 6 is a schematic representation of a cross-sectional view of another example of a fibrous structure according to the present disclosure.

FIG. 6 shows another aspect of an article 20, for example a multi-ply fibrous structure of the present disclosure comprising a first ply 30 of a fibrous structure as shown in FIG. 5 comprising a first fibrous structure layer 22 comprising a plurality of fibrous elements, for example filaments 10, and a second fibrous structure layer 24 comprising a plurality of fibrous elements, for example filaments 10, for example active agent-containing filaments, and a plurality of particles 26, for example active agent-containing particles, dispersed, in this case randomly, in the x, y, and z axes, throughout the second fibrous structure layer 24, a second ply 32 of a fibrous structure associated with the first ply 30, wherein the second ply 32 comprises a first fibrous structure layer 22 comprising a plurality of fibrous elements, for example filaments 10, and a second layer 24 comprising a plurality of fibrous elements, for example filaments 10, for example active agent-containing filaments, and a plurality of particles 26, for example active agent-containing particles, dispersed, in this case randomly, in the x, y, and z axes, throughout the second fibrous structure layer 24, and a third ply 34 of a fibrous structure associated with the second ply 32, wherein the third ply 34 comprises a first fibrous structure layer 22 comprising a plurality of fibrous elements, for example filaments 10, and a second fibrous structure layer 24 comprising a plurality of fibrous elements, for example filaments 10, for example active agent-containing filaments, and a plurality of particles 26, for example active agent-containing particles, dispersed, in this case randomly, in the x, y, and z axes, throughout the second fibrous structure layer 24.

Forms of the Water Disintegrable, Foam Producing Article

The water disintegrable, foam producing article of the present invention can be provided in various forms, depending on how the soluble fibrous structure(s) and the particulate effervescent cleaning composition are combined to create the article, thereby encasing the particulate effervescent cleaning composition with the soluble fibrous structure (s).

In certain aspects, the article of the present invention is in the form of a co-form, in which the particulate effervescent cleaning composition is co-mingled with the fibrous elements of the soluble fibrous structure(s).

In certain aspects, the article of the present invention is in the form of a pouch, in which the soluble fibrous structure(s) form a pouch defining an internal volume in which the particulate effervescent cleaning composition is disposed. In this regard, the soluble fibrous structure(s) comprises edge seal(s) to form the pouch and to contain the particulate effervescent cleaning composition within the internal volume of the pouch.

Co-Form Form

In one aspect, the fibrous structures of the present invention may comprise single or multiple layers, at least one of which comprise fibrous elements. Layers may include additives (for example, pastes or sprays) applied to said fibers and/or particles commingled with said fibers in a composite structure.

Particles of the particulate effervescent cleaning composition may be commingled with the fibrous elements (e.g. filaments) of the fibrous structures during manufacture, resulting in a co-form. In this regard, at least one layer of the fibrous structure is a co-form. As such, the article of the present invention can be in the form of a co-form, wherein the soluble fibrous structure comprises at least one layer comprising fibrous elements commingled with the particulate effervescent cleaning composition.

Figure 7:
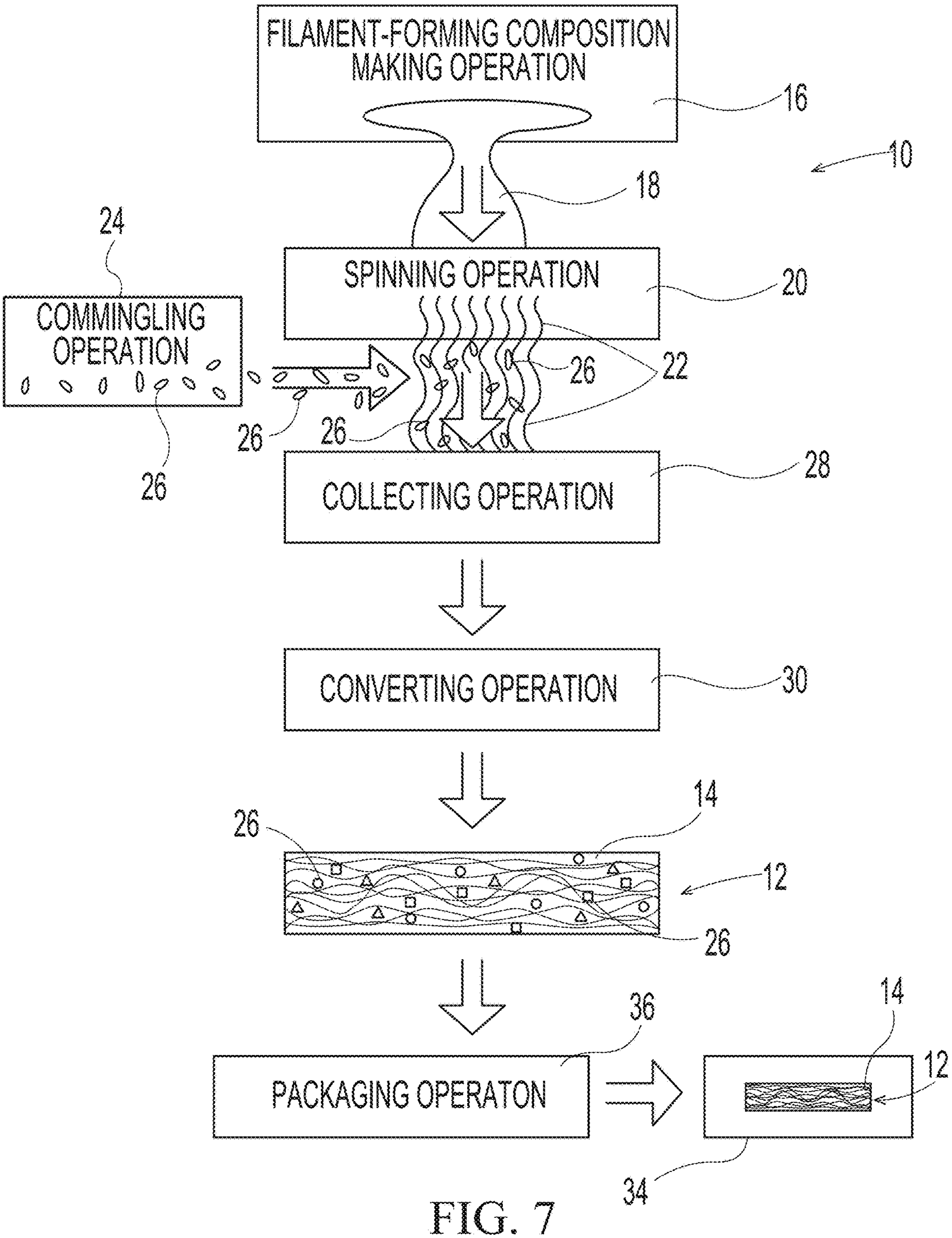
FIG. 7 is a schematic representation of an example of a process for making a fibrous structure according to the present invention.

FIG. 7 illustrates a process of making an article in the form of a co-form. While filaments 22 are being formed, the particle source is turned on and particles 26 are introduced into the filament 22 stream. The particles 26 are commingled with the filaments 22 within a spinning enclosure. The commingled filaments 22 and particles 26 are collected on a collection device (e.g. a forming belt) as a composite structure (filaments 22 and particles 26 commingled together). The composite structure is referred to as a fibrous structure 14 in the form of a co-form.

Processes of making articles in the form of a co-form are described in more detail in US 2019/0233974 A1 incorporated herein by reference.

Pouch Form

Figure 8:
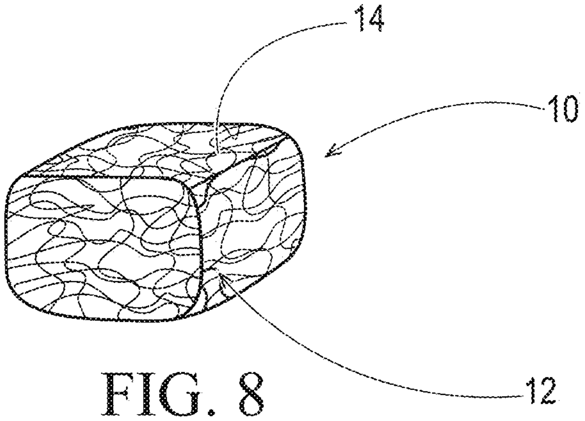
FIG. 8 is a schematic representation of an example of an article in pouch form according to the present invention.
Figure 9:
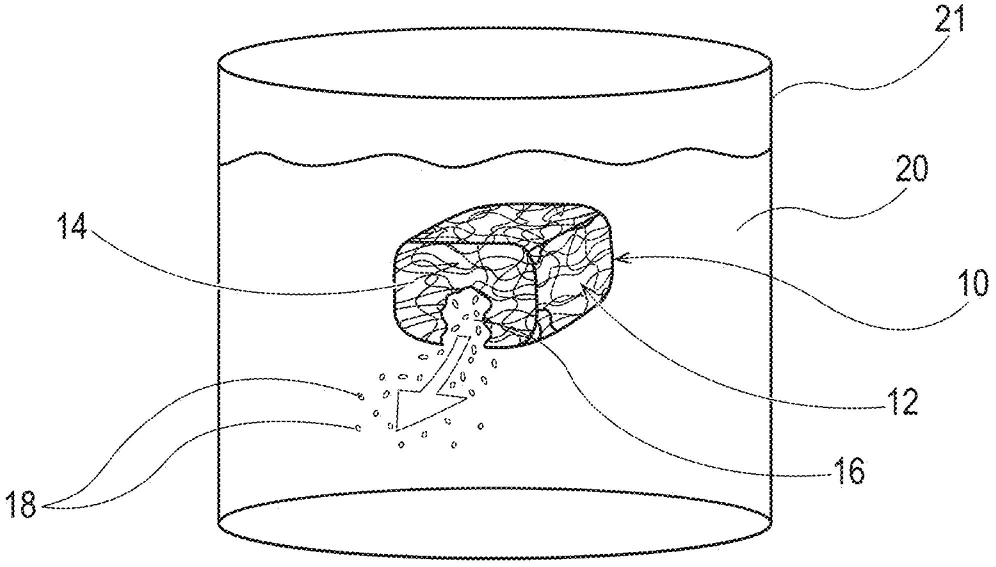
FIG. 9 is a schematic representation of the article in pouch form of FIG. 8 during use.

As shown in FIGS. 8 and 9, an example of a pouch 10 of the present invention comprises a pouch wall material 12, such as a fibrous wall material 14, for example a water-soluble fibrous wall material. The pouch wall material 12 defines an internal volume 16 of the pouch 10. The contents 18 of the pouch 10 include the particulate effervescent cleaning composition contained and retained in the internal volume 16 of the pouch 10 at least until the pouch 10 ruptures, for example during use and it releases its contents as shown in FIG. 9.

A pouch 10 under conditions of intended use is represented in FIG. 9. FIG. 9 illustrates the scenario when a user adds the pouch 10 to a liquid 20, such as water, in a container 21 to create a wash liquor, such as when a user adds the pouch 10 to a washing machine and/or to a dishwashing machine. As shown in FIG. 9, when the pouch 10 contacts the liquid 20 the pouch 10 ruptures, such as by part of the fibrous pouch wall material 14 dissolving, causing at least a portion if not all of its contents 18 to be released from the internal volume 16 of the pouch 10.

As shown above, a fibrous wall material may form one or more sides of the pouch and a film wall material may form one or more other sides of the pouch. In still another aspect, a water-soluble pouch wall material, such as a water-soluble fibrous wall material may form one or more sides of the pouch and a water-insoluble fibrous wall material may form one more other sides of the pouch.

The pouch of the present invention may be a single compartment pouch or a multi-compartment pouch, preferably a single compartment pouch.

Articles in the form of a pouch, and processes for making them, are described in more detail in U.S. Application Publication No. 2015/0071572 A1 incorporated herein by reference.

Edge Seal

The soluble fibrous structures of the article of the present invention may be sealed, for example around the perimeter of the article, to help prevent any particles, including the particulate effervescent cleaning composition, from escaping from the article prior to use.

Figure 10:
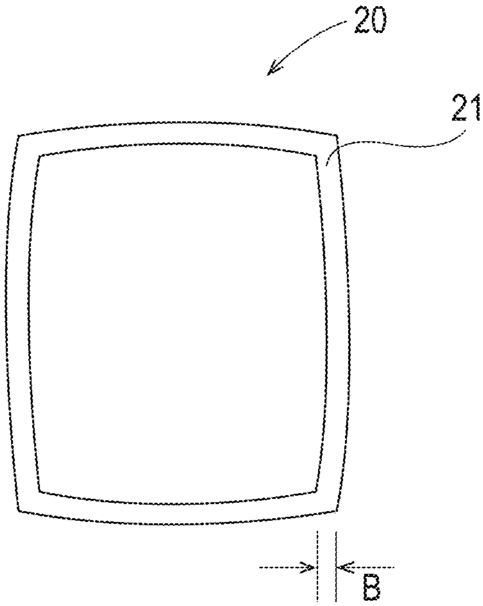
FIG. 10 is a schematic representation of an article having an edge seal.

FIG. 10 illustrates an article 20 that includes an edge seal 21, generally positioned along the perimeter of the article 20. As shown in FIG. 10, the edge seal 21 has an edge seal breadth B. In certain aspects, and as shown in FIG. 10, the edge seal 21 can be continuous. In other examples, however, the edge seal 21 can be discontinuous, such that the edge seal 21 is only positioned along a portion of the perimeter of the article 20. In certain aspects, at least one of the two or more fibrous structure plies can include one or more particles; and in certain aspects, the edge seal 21 can include one or more particles therein.

Figure 11:
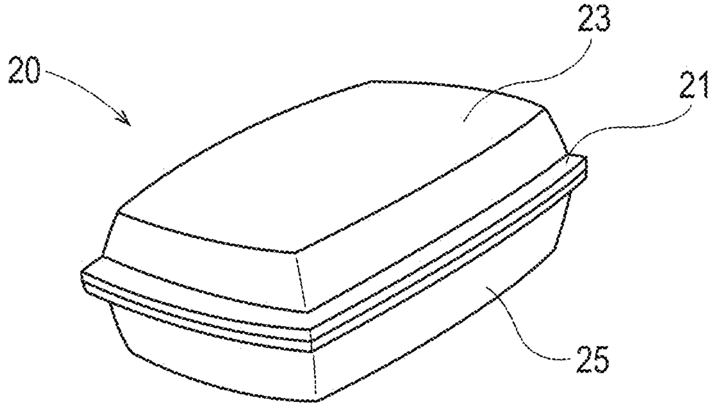
FIG. 11 is schematic representation of a perspective view of the article of FIG. 10.

In such examples of an article 20 having an edge seal 21, the article 20 may include two or more fibrous structure plies, such that the article 20 is a multi-ply article. In certain aspects, at least two of the two or more fibrous structure plies can be formed from compositions that are different from each other. In certain aspects, the article 20 can include a first outermost ply 23 and a second outermost ply 25, as shown, for example in FIG. 11, wherein edges of each of the first outermost ply 23 and the second outermost ply 25 can form the edge seal 21. The article 20 can further include one or more inner plies, where the one or more inner plies can be surrounded by the first outermost ply 23 and the second outermost ply 25. The article 20 can include any suitable amount of inner plies, but it will be understood that dissolution of an edge seal may be increasingly likely as an amount of inner plies increases. In certain aspects, the one or more inner plies do not form the edge seal 21. However, it will be appreciated that in other examples, edges of each of a first outermost ply, a second outermost ply, and one or more inner plies can form the edge seal. In certain aspects, the one or more inner plies can include the one or more particles therein; and in certain aspects, the first outermost ply 23 and the second outermost ply 25 can be substantially free of particles.

In another aspect, where the article is in the form of a pouch, the fibrous wall material of the pouch is typically sealed by any sealing means. For example, by heat sealing, wet sealing or by pressure sealing. In one aspect, a sealing source is contacted to the fibrous wall material and heat or pressure is applied to the fibrous wall material, and the fibrous wall material is sealed. The sealing source may be a solid object, for example a metal, plastic or wood object. If heat is applied to the fibrous wall material during the sealing process, then said sealing source is typically heated to a temperature of from about 40° C. to about 200° C. If pressure is applied to the fibrous wall material during the sealing process, then the sealing source typically applies a pressure of from about $1\times10^4$ $Nm^{-2}$ to about $1\times10^6$ $Nm^{-2}$, to the fibrous wall material.

In another aspect, the same piece of fibrous wall material may be folded, and sealed to form the pouches. Typically more than one piece of fibrous wall material is used in the process. For example, a first piece of the fibrous wall material may be vacuum pulled into the molds so that the fibrous wall material is flush with the inner walls of the molds. A second piece of fibrous wall material may be positioned such that it at least partially overlaps and/or completely overlaps, with the first piece of fibrous wall material. The first piece of fibrous wall material and second piece of fibrous wall material are sealed together. The first piece of fibrous wall material and second piece of fibrous wall material can be the same or different.

In another aspect of making pouches of the present invention, a first piece of fibrous wall material may be vacuum pulled into the molds so that the fibrous wall material is flush with the inner walls of the molds. A composition, such as one or more active agents and/or a detergent composition, may be added, for example poured, into the open pouches in the molds, and a second piece of fibrous wall material may be placed over the active agents and/or detergent composition and in contact with the first piece of fibrous wall material and the first piece of fibrous wall material and second piece of fibrous wall material are sealed together to form pouches, typically in such a manner as to at least partially enclose and/or completely enclose its internal volume and the active agents and/or detergent composition within its internal volume.

In another aspect, the pouch making process may be used to prepare pouches which have an internal volume that is divided into more than one compartment, typically known as a multi-compartment pouches. In the multi-compartment pouch process, the fibrous wall material is folded at least twice, or at least three pieces of pouch wall materials (at least one of which is a fibrous pouch wall material, for example a water-soluble fibrous pouch wall material) are used, or at least two pieces of pouch wall materials (at least one of which is a fibrous pouch wall material, for example a water-soluble fibrous pouch wall material) are used wherein at least one piece of pouch wall material is folded at least once. The third piece of pouch wall material, when present, or a folded piece of pouch wall material, when present, creates a barrier layer that, when the pouch is sealed, divides the internal volume of said pouch into at least two compartments.

Figure 12:
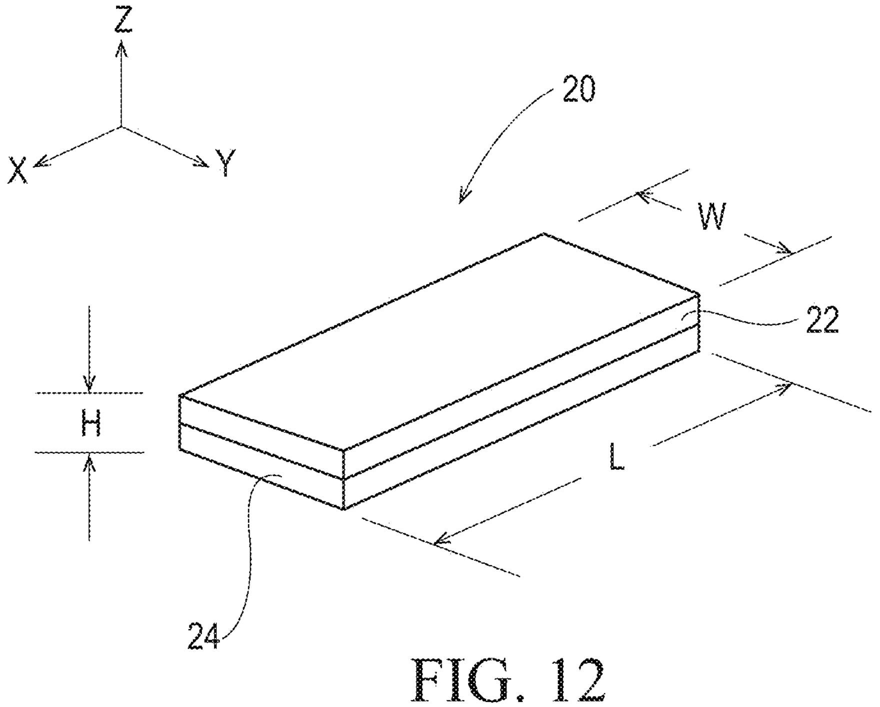
FIG. 12 is a schematic representation of an article of the present invention, depicting article dimensions.

FIG. 12 shows a view of the article 20, with plies 22 and 24. With respect to the article dimensions described below, the length (L), width (W), and height (H) of the article are shown in FIG. 12 to correspond to measurements in the x-, y-, and z-directions, respectively.

In certain aspects, the article can have a length of from about 1 cm to about 20 cm; from about 2 cm to about 20 cm; from about 2 cm to about 18 cm; from about 3 cm to about 15 cm; from about 3 cm to about 12 cm; from about 4 cm to about 8 cm; from about 4 cm to about 6 cm; or from about 5 cm to about 6 cm. In certain aspects, the article can have a length of from about 1 cm to about 10 cm; from about 2 cm to about 10 cm; or from about 7 cm to about 9 cm.

In certain aspects, the article can have a width of from about 1 cm to about 11 cm; from about 2 cm to about 11 cm; from about 2 cm to about 10 cm; from about 3 cm to about 9 cm; from about 4 cm to about 8 cm; or from about 4 cm to about 6 cm. In certain aspects, the article can have a width of from about 1 cm to about 6 cm; from about 2 cm to about 6 cm; from about 3 cm to about 5 cm; or from about 3.5 cm to about 4.5 cm. In other examples, the article can have a width of from about 6 cm to about 8 cm.

In certain aspects, a ratio of a length of an article to its width can be from about 3:1 to about 0.5:1; from about 5:2 to about 0.5:1; or from about 2:1 to about 1:1.

The article can have a height, or thickness, of about 0.01 mm or greater; about 0.05 mm or greater; about 0.1 mm or greater; about 0.5 or greater; about 1 mm or greater; about 2 mm or greater; about 3 mm or greater; or about 4 mm or greater. In certain aspects, the article can have a height, or thickness, of about 200 mm or less; about 150 mm or less; about 120 mm or less; about 100 mm or less; about 75 mm or less; about 50 mm or less; about 10 mm or less; about 5 mm or less; about 3 mm or less; about 1 mm or less; about 0.5 mm or less; or about 0.3 mm Thus, in certain aspects, the article can have a height from about 0.01 mm to about 200 mm; from about 0.01 mm to about 150 mm; from about 0.1 mm to about 120 mm; from about 0.1 mm to about 100 mm; from about 1 mm to about 75 mm; or from about 1 mm to about 50 mm. In certain aspects, the article can have a height, or thickness, of from about 3 mm to about 10 mm; or from about 4 mm to about 10 mm Height, or thickness, measurements are taken in accordance with the Thickness Test Method described herein.

The article can have a volume of from about 0.25 cubic centimeters (cc) to about 60 cc; from about 0.5 cc to about 60 cc; from about 0.5 cc to about 50 cc; from about 1 cc to about 40 cc; from about 1 cc to about 30 cc; from about 2 cc to about 20 cc; from about 3 cc to about 20 cc; from about 4 cc to about 15 cc; or from about 4 cc to about 10 cc. In certain aspects, the article can have a volume of from about 3 cc to about 6 cc. In other examples, the article can have a volume of from about 20 cc to about 35 cc; or from about 24 cc to about 30 cc.

The article can have a mass of about 50 g or less; about 40 g or less; about 30 g or less; about 25 g or less; about 20 g or less; about 15 g or less; about 10 g or less; about 7.5 g or less; about 5 g or less; about 4 g or less; about 3 g or less; about 2 g or less; about 1.5 g or less; about 1.25 g or less; about 1 g or less; about 0.75 g or less; or about 0.5 g or less. In certain aspects, the article can have a mass of from about 0.25 g to about 50 g; from about 0.25 g to about 40 g; from about 0.25 g to about 30 g; from about 0.25 g to about 25 g; from about 0.25 g to about 20 g; from about 0.5 g to about 15 g; from about 0.5 g to about 10 g; from about 0.5 to about 5 g; from about 0.5 g to about 4 g; from about 0.5 g to about 3 g; from about 0.5 g to about 2.5 g; or from about 1 g to about 2 g. In certain aspects, the article can have a mass of from about 5 g to about 15 g; or from about 8 g to about 12 g.

The article can have a density of about 0.05 g/cc or greater; about 0.08 g/cc or greater; about 0.1 g/cc or greater; about 0.15 g/cc or greater; about 0.2 g/cc or greater; about 0.25 g/cc or greater; about 0.3 g/cc or greater; about 0.35 g/cc or greater; or about 0.4 g/cc or greater. In certain aspects, the article can have a density of about 0.8 g/cc or less; about 0.6 g/cc or less; about 0.5 g/cc or less; about 0.4 g/cc or less; about 0.35 g/cc or less; about 0.3 g/cc or less; about 0.25 g/cc or less; about 0.2 g/cc or less; about 0.15 g/cc or less; about 0.12 g/cc or less; about 0.1 g/cc or less; about 0.08 g/cc or less; or about 0.05 g/cc or less. Thus, in certain aspects, the article can have a density of from about 0.05 g/cc to about 0.8 g/cc; from about 0.08 g/cc to about 0.8 g/cc; from about 0.1 g/cc to about 0.8 g/cc; from about 0.2 g/cc to about 0.6 g/cc; or from about 0.2 g/cc to about 0.4 g/cc. In certain aspects, the article can have a density of from about 0.3 g/cc to about 0.5 g/cc.

In certain aspects, the article has one or more of the following dimensions: a width from about 1 cm to about 11 cm; a length from about 1 cm to about 20 cm; a height from about 0.01 mm to about 200 mm; a mass from about 0.25 g to about 40 g; a volume from about 0.25 cc to about 60 cc; and a density from about 0.05 g/cc to about 0.8 g/cc. In certain aspects, the article has one or more of a width from about 1 cm to about 11 cm; a length from about 1 cm to about 20 cm; and a height from about 0.01 mm to about 100 mm. In certain aspects, the article has one or more of a mass from about 0.25 g to about 40 g; a volume from about 0.25 cc to about 60 cc; and a density from about 0.05 g/cc to about 0.8 g/cc. In certain aspects, the article has one or more of a width from about 1 cm to about 11 cm; a length from about 1 cm to about 20 cm; and a height from about 0.01 mm to about 50 mm; and one or more of a mass from about 0.25 g to about 40 g; a volume from about 0.25 cc to about 60 cc; and a density from about 0.05 g/cc to about 0.8 g/cc.

In one aspect, the article, for example fibrous structure of the present disclosure may exhibit an average disintegration time of less than 360 seconds (s) and/or less than 200 s and/or less than 100 s and/or less than 60 s and/or less than 30 s, and/or less than 10 s and/or less than 5 s and/or less than 2.0 s and/or less than 1.5 s and/or about 0 s and/or greater than 0 s as measured according to the Dissolution Test Method described herein.

In one aspect, the article, for example fibrous structure of the present disclosure may exhibit an average dissolution time of less than 3600 seconds (s) and/or less than 3000 s and/or less than 2400 s and/or less than 1800 s and/or less than 1200 s and/or less than 600 s and/or less than 400 s and/or less than 300 s and/or less than 200 s and/or less than 175 s and/or less than 100 s and/or less than 50 s and/or greater than 1 s as measured according to the Dissolution Test Method described herein.

In another aspect, the article, for example fibrous structure of the present disclosure exhibits an average dissolution time of less than 24 hours and/or less than 12 hours and/or less than 6 hours and/or less than 1 hour (3600 seconds) and/or less than 30 minutes and/or less than 25 minutes and/or less than 20 minutes and/or less than 15 minutes and/or less than 10 minutes and/or less than 5 minutes and/or greater than 1 second and/or greater than 5 seconds and/or greater than 10 seconds and/or greater than 30 seconds and/or greater than 1 minute as measured according to the Dissolution Test Method described herein.

In one aspect, the article, for example fibrous structure of the present disclosure may exhibit an average disintegration time per gsm of sample of about 1.0 second/gsm (s/gsm) or less, and/or about 0.5 s/gsm or less, and/or about 0.2 s/gsm or less, and/or about 0.1 s/gsm or less, and/or about 0.05 s/gsm or less, and/or about 0.03 s/gsm or less as measured according to the Dissolution Test Method described herein.

In one aspect, the article, for example fibrous structure of the present disclosure may exhibit an average dissolution time per gsm of sample of about 10 seconds/gsm (s/gsm) or less, and/or about 5.0 s/gsm or less, and/or about 3.0 s/gsm or less, and/or about 2.0 s/gsm or less, and/or about 1.8 s/gsm or less, and/or about 1.5 s/gsm or less as measured according to the Dissolution Test Method described herein.

Adjunct Ingredients/Active Agents

The water disintegrable, foam producing article of the present invention can optionally further comprise one or more additional adjunct ingredients or active agents. Such adjunct ingredients or active agents may be included within and/or on the fibrous elements of the soluble fibrous structure, and/or as a part of the particulate effervescent cleaning composition.

For example, the adjunct ingredients and active agents may be selected from the group consisting of: stain removal agents, soil release agents, dispersing agents, suds suppressing agents, suds boosting agents, anti-foam agents, hard surface care agents, and/or conditioning agents and/or polishing agents; other cleaning and/or conditioning agents such as antimicrobial agents, antibacterial agents, antifungal agents, hueing agents, perfume, bleaching agents (such as oxygen bleaching agents, hydrogen peroxide, percarbonate bleaching agents, perborate bleaching agents, chlorine bleaching agents), bleach activating agents, chelating agents, builders, brightening agents, air care agents, clay soil removing agents, anti-redeposition agents, polymeric soil release agents, polymeric dispersing agents, alkoxylated polyamine polymers, alkoxylated polycarboxylate polymers, amphiphilic graft copolymers, dissolution aids, buffering systems, water-softening agents, water-hardening agents, pH adjusting agents, enzymes, flocculating agents, effervescent agents, preservatives, deposition aid agents, coacervate-forming agents, silica, drying agents, odor control agents, dyes, pigments, liquid treatment adjunct agents; water-treatment agents such as water clarifying and/or water disinfecting agents, and mixtures thereof.

Perfumes

One or more perfume and/or perfume raw materials such as accords and/or notes may be incorporated into one or more of the fibrous elements and/or particles of the present disclosure. The perfume may comprise a perfume ingredient selected from the group consisting of: aldehyde perfume ingredients, ketone perfume ingredients, and mixtures thereof.

One or more perfumes and/or perfumery ingredients may be included in the fibrous elements and/or particles of the present disclosure. A wide variety of natural and synthetic chemical ingredients useful as perfumes and/or perfumery ingredients include but not limited to aldehydes, ketones, esters, and mixtures thereof. Also included are various natural extracts and essences which can comprise complex mixtures of ingredients, such as orange oil, lemon oil, rose extract, lavender, musk, patchouli, balsamic essence, sandalwood oil, pine oil, cedar, and the like. Finished perfumes can comprise extremely complex mixtures of such ingredients. In one aspect, a finished perfume typically comprises from about 0.01% to about 10% and/or from about 0.01% to about 8% and/or from about 0.01% to about 6% and/or from about 0.01% to about 4% and/or from about 0.01% to about 2% and/or from about 0.05% to about 2% by weight on a dry fibrous element basis and/or a dry particle basis and/or dry fibrous structure basis. In another aspect, the perfume is selected to be highly lipophilic with a high boiling point i.e., C log P>3, boiling point>250° C.)) so as to promote partitioning away from water and onto a hard surface, as well as to drive perfume longevity. Such a selection can help drive consumer acceptance in applications such as toilet bowl cleaners.

Certain perfume delivery systems, methods of making certain perfume delivery systems and the uses of such perfume delivery systems are disclosed in U.S. Application Publication No. 2007/0275866 A1 incorporated herein by reference.

Antimicrobials, Antibacterials & Antifungals

In an example, pyridinethione particulates are suitable antimicrobial active agents for use in the present disclosure. In an example, the antimicrobial adjunct agent is a 1-hydroxy-2-pyridinethione salt and is in particulate form. In an example, the concentration of pyridinethione particulate ranges from about 0.01 wt % to about 5 wt %, or from about 0.1 wt % to about 3 wt %, or from about 0.1 wt % to about 2 wt %, by weight of the dry fibrous element and/or dry particle and/or dry fibrous structure of the present disclosure. In an example, the pyridinethione salts are those formed from heavy metals such as zinc, tin, cadmium, magnesium, aluminium and zirconium, generally zinc, typically the zinc salt of 1-hydroxy-2-pyridinethione (known as "zinc pyridinethione" or "ZPT"), commonly 1-hydroxy-2-pyridinethione salts in platelet particle form. In an example, the 1-hydroxy-2-pyridinethione salts in platelet particle form have an average particle size of up to about 20 microns, or up to about 5 microns, or up to about 2.5 microns as measured according to the Median Particle Size Test Method described herein. Salts formed from other cations, such as sodium, may also be suitable. Pyridinethione adjuncts are described, for example, in U.S. Pat. Nos. 2,809,971; 3,236,733; 3,753,196; 3,761,418; 4,345,080; 4,323,683; 4,379,753; and 4,470,982.

In another aspect, the antibacterial is chosen from triclosan, triclocarban, chlorohexidine, metronitazole and mixtures thereof.

In an example, in addition to the antimicrobial active agent selected from polyvalent metal salts of pyrithione, the composition can further include one or more anti-fungal and/or anti-microbials. In an example, the anti-microbial agent is selected from the group consisting of: coal tar, sulfur, azoles, selenium sulphide, particulate sulphur, keratolytic agents, charcoal, whitfield's ointment, castellani's paint, aluminum chloride, gentian violet, octopirox (piroctone olamine), ciclopirox olamine, undecylenic acid and its metal salts, potassium permanganate, selenium sulphide, sodium thiosulfate, propylene glycol, oil of bitter orange, urea preparations, griseofulvin, 8-hydroxyquinoline ciloquinol, thiobendazole, thiocarbamates, haloprogin, polyenes, hydroxypyridone, morpholine, benzylamine, allylamines (such as terbinafine), tea tree oil, clove leaf oil, coriander, palmarosa, berberine, thyme red, cinnamon oil, cinnamic aldehyde, citronellic acid, hinokitol, ichthyol pale, Sensiva SC-50, Elestab HP-100, azelaic acid, lyticase, iodopropynyl butylcarbamate (IPBC), isothiazalinones such as octyl isothiazalinone, and azoles, and mixtures thereof.

Bleaching Agents

The fibrous elements and/or particles of the present disclosure may comprise one or more bleaching agents. Non-limiting examples of suitable bleaching agents include peroxyacids, perborate, percarbonate, chlorine bleaches, oxygen bleaches, hypohalite bleaches, bleach precursors, bleach activators, bleach catalysts, hydrogen peroxide, bleach boosters, photobleaches, bleaching enzymes, free radical initiators, peroxygen bleaches, and mixtures thereof.

One or more bleaching agents may be included in the fibrous elements and/or particulate cleaning composition of the present disclosure may be included at a level from about 0.05% to about 30% and/or from about 1% to about 20% by weight on a dry fibrous element basis and/or dry particle basis and/or dry fibrous structure basis. If present, bleach activators may be present in the fibrous elements and/or particles of the present disclosure at a level from about 0.1% to about 60% and/or from about 0.5% to about 40% by weight on a dry fibrous element basis and/or dry particle basis and/or dry fibrous structure basis.

Non-limiting examples of bleaching agents include oxygen bleach, perborate bleach, percarboxylic acid bleach and salts thereof, peroxygen bleach, persulfate bleach, percarbonate bleach, and mixtures thereof. Further, non-limiting examples of bleaching agents are disclosed in U.S. Pat. No. 4,483,781, U.S. patent application Ser. No. 740,446, European Patent Application 0 133 354, U.S. Pat. Nos. 4,412,934, and 4,634,551.

Non-limiting examples of bleach activators (e.g., acyl lactam activators) are disclosed in U.S. Pat. Nos. 4,915,854; 4,412,934; 4,634,551; and 4,966,723.

Enzymes

One or more enzymes may be present in the fibrous elements and/or particles of the present disclosure. Non-limiting examples of suitable enzymes include proteases, amylases, lipases, cellulases, carbohydrases including mannanases and endoglucanases, pectinases, hemicellulases, peroxidases, xylanases, phopholipases, esterases, cutinases, keratanases, reductases, oxidases, phenoloxidases, lipoxygenases, ligninases, pullulanases, tannases, penosanases, malanases, glucanases, arabinosidases, hyaluraonidases, chrondroitinases, laccases, and mixtures thereof.

The term "cleaning effective amount" refers to any amount capable of producing a cleaning, stain removal, soil removal, whitening, deodorizing, or freshness improving effect on substrates such as dishware, flooring, porcelain and ceramics, metal surfaces and the like. In practical terms for current commercial preparations, typical amounts are up to about 5 mg by weight, more typically 0.01 mg to 3 mg, of active enzyme per gram of the fibrous element and/or particle of the present disclosure. Stated otherwise, the fibrous elements and/or particles of the present disclosure will typically comprise from about 0.001% to about 5% and/or from about 0.01% to about 3% and/or from about 0.01% to about 1% by weight on a dry fibrous element basis and/or dry particle basis and/or dry fibrous structure basis.

A range of enzyme materials is also disclosed in WO 9307263 A; WO 9307260 A; WO 8908694 A; U.S. Pat. Nos. 3,553,139; 4,101,457; and 4,507,219.

Methods of Use

The present invention further encompasses methods of using the water disintegrable, foam producing article to clean surfaces.

In one aspect, the present invention encompasses a method of cleaning a toilet bowl of a toilet comprising the steps of: adding a water disintegrable, foam producing article of the present invention to said toilet bowl containing water; allowing said article to disintegrate in said water; and flushing said toilet after a period of at least 5 minutes, preferably at least 30 minutes, preferably at least 60 minutes, preferably at least 180 minutes, from said article being added to said water of said toilet bowl.

In one aspect, the present invention encompasses a method of cleaning a surface comprising the steps of: providing a vessel containing water; adding a water disintegrable, foam producing article of the present invention to said vessel containing water; allowing said article to disintegrate in said water to form a cleaning solution; and contacting said surface with said cleaning solution. Preferably the vessel is a bucket or a household sink. Preferably the surface is selected from the group consisting of household hard surfaces, exterior car surfaces, and dishware.

As used herein, the term "foam height" refers to the maximum vertical distance that foam generated from the article rises above the top surface of the water into which the article is placed within a period of five minutes from the time the article is added to the water. Given the different geometries of toilet bowls and other vessels, foam heights can vary considerably. For purposes of the current invention, foam height is defined by the following protocol: two thousand grams of de-ionized water (e.g., 2 liters) are charged into a 4-liter beaker (VWR catalog#10754-762). An article of the invention comprising fibrous web and foaming particles is placed on the water, and effervescent foam is allowed to fill the area above the water-air interface. The foam is allowed to collapse, and foam height is measured as the maximum vertical distance between the water line and the highest point of residue left by the foam on the beaker. As natural variation is unavoidable, it is preferred that formal foam height reporting involve at least 3 test replicates, more preferably 5 test replicates.

Preferably the methods of the present invention provide, or generate, a foam height of at least about 1 cm and/or at least about 3 cm and/or at least about 5 cm and/or at least about 7.5 cm and/or at least about 10 cm and/or at least about 12.5 cm.

Preferably the foam generated by the methods herein comprises particles of particulate foaming surfactant suspended in the foam.

Toilet Bowl Foaming Article

Proper selection of foaming surfactant type and combinations, surfactant particle size and combinations, amount of effervescent agent, selection of effervescent activator acid, and ratio of effervescent agent to effervescent activator can be used to drive the creation of high levels of high stability foam. This has been found to be highly beneficial for toilet bowl applications. It is found that the fibrous web of the invention is quickly disintegrated, even in cold water, and transported to toilet bowl surfaces (e.g., porcelain) via the foam created by the combination of the effervescent agent, foaming surfactant particle system and effervescent activator. Selection of the fibrous web of the invention, as opposed to an alternate particle delivery mechanism such as a single unit dose film, is beneficial. The fibrous web is more easily and more completely disintegrated by cold water versus a film-based material of correspondingly similar chemical composition. While not wishing to be limited by theory, it is believed that increased surface area and reduced surface density of the fibrous web are important factors responsible for the enhanced dissolution of the material. Reduced density for the fibrous web help buoyancy; by contrast, denser materials are more likely to sink in the water. Buoyancy allows the effervescent foam composition to lift the disintegrating fibrous web above the water line. In one aspect, the fibrous web floats on water as it is being disintegrated by water.

As the fibrous web disintegrates in water, it is carried by the effervescing foam system above the toilet bowl water line and up onto the walls of the toilet bowl surface, where it is re-deposited as an amorphous film that dries down as the foam ultimately collapses. The more hydrophobic the active agent, the greater the thermodynamic drive to partition away from water, thus increasing deposition on hard surfaces. This mechanism of action is experimentally confirmed by analysis of the perfume ingredients left behind on the walls of porcelain and glass surfaces above the water line. The disintegrated web can act as a plasticizer or conduit for deposition/entrainment of active agents, which the web may have originally carried/encased, on hard surfaces. As such, the web can transfer cleaning agents, carrier particles, enzymes, bacterial spores, anti-deposition polymers, antimicrobial and antifungal agents, chelants and perfume compounds as high on the toilet bowl surface as the foaming system is able to reach. In essence, the web provides a deposition mechanism for actives that in one embodiment can clean the toilet bowl, and in another embodiment can help a clean toilet bowl retard the natural re-soiling pattern (formation of the hard-water plus biofilm 'ring' just above the water line), and in yet another embodiment can deliver fresh fragrance to the toilet and the entire bathroom area in which the toilet is located. Importantly, such benefits are not mutually exclusive from each other.

The mechanism by which the fibrous web transports actives to the walls above the toilet bowl water line underscores the importance of creating high density, small bubble, lather-like foam that is carried as far up the toilet bowl surface as possible. This can be aided by fibrous web article size (i.e., the dimension of the fibrous web pouch and dosing amount instructions (i.e., dosing 2 articles into toilet bowl water can provide a higher level of foam and enhanced reach of actives up the toilet bowl walls relative to a single article dose). It also can be improved by careful selection of the fibrous web pouch surface area, shape (e.g., square shape ~6 cm×6 cm preference), basis weight (e.g., 40 $g/m^2$ to 100 $g/m^2$), polymer molecular weight (e.g., 10,000 to 500,000) and density properties (i.e., d<1), as well as by the hydrophilicity and chemical charge associated with the web. For example, for fibrous web pouches made primarily of poly (vinyl alcohol), control of polymer molecular weight, degree of hydrolysis, plasticizer type and amount, and fiber spinning process will all impact the speed and degree to which the material disintegrates in water and the degree to which it adheres onto the toilet bowl surface above the water line. In a preferred embodiment, the fibrous web pouch chemistry comprises 90% poly (vinyl alcohol) with a molecular weight of about 30,000 formed from hydrolysis of polyvinyl acetate (~88% hydrolyzed)+10% sorbitol; the fibrous pouch has dimensions of about 6 cm×6 cm and encases about 35 grams of effervescent foam chemistry within the 6 cm×6 cm sealed inner area of the pouch. In another preferred embodiment, the fibrous pouch has dimensions of about 7.5 cm×7.5 cm, and encases about 50-55 grams of effervescent particle chemistry within the sealed inner area of the pouch.

Once the web of the present invention is re-deposits as a film on the porcelain surface, it is no longer easily solubilized in cold water. Resistance to dissolution provides yet another benefit during toilet bowl flushing events. Slow polymer dissolution delays the inevitable toilet bowl re-soiling process. Additionally, as some of deposited film is withered away by each toilet bowl flushing, trapped actives now become exposed and can provide longer lasting benefits. Trapped antimicrobial compounds are activated and buried perfume compounds can bloom, thus refreshing the toilet bowl and area surrounding it. Additionally, upon hydration, many fibrous materials appear clear, and can impart enhanced gloss or shine to the toilet bowl surface.

Net, the combination of fibrous web and effervescent foaming surfactant chemistry surprisingly provide methods for soil cleaning and soiling prevention (anti-soiling benefit), leading to enhanced toilet bowl hygiene and freshness. While virtually all commercial toilet bowl cleaners leverage either ultra-strong acid or aggressive alkaline bleach chemistries that provide single use benefits, the article of the present invention can deliver longer lasting hygiene without the need for aggressive chemistry. In addition to offering a safety advantage, the article is also boasts improved use simplicity: just add a fibrous web article inside the toilet bowl and walk away.

In addition to effervescent agent, surfactant and effervescent activator, the article of the invention optionally though preferably includes one or more active agents for hygiene benefits. In another embodiment, the article comprises enzyme which may be encapsulated in zeolite or silica particles. Enzymes are preferably selected from the group consisting of amylases, proteases and esterases (including lipases), and mixtures thereof, to catalyze the break-up soils from feces and from microbial colonies that thrive below, at and above the toilet bowl water line. In another embodiment, the article comprises bacterial spores (for example, encapsulated in poly (ethylene glycol) or silica particles) that upon activation in water release enzymes that mitigate and control toilet bowl malodours. Non-limiting examples of suitable bacterial spores for use herein include *Bacillus, Brevibacillus* and *Paenibacillus* spores, most preferably *Bacillus* spores. Examples of such bacterial spores are also described in EP Patent Application No. 19207354.2, filed Nov. 6, 2019, incorporated herein by reference. When present, the level of bacterial spores account for 0.001% to 0.50%, more preferably from 0.005% to 0.10% by weight of the article. In another embodiment, the article comprises soil release polymers that modify the toilet bowl hard surface energy, for example making the surface more hydrophobic and/or more slippery. Silicon-based polymers including derivatives of poly (dimethyl siloxane) and especially block co-polymers dimethyl siloxane-ethylene oxide containing block copolymer are suitable for this purpose; non-limiting examples of suitable soil-release polymers include Silwet L7693 (available from Momentive Corporation) and DBE-814 (available from Gelest, Morrisville, PA, USA). When present, the level of soil release polymer is from about 0.1% to about 20%, more preferably from about 0.5% to 10% and most preferably from about 1% to about 8% by weight of the article. In another embodiment, the article comprises a chelant. The role of the chelant is to help remove encrusted hard water stains. Non-limiting examples of suitable chelants include methyglycine diacetic acid salts (MGDA available from BASF), ethylene diamine tetracetic acid salts (EDTA), hydroxyethylidine diphosphoric acid salts (HEDP), and the like. When present, the level of chelant is preferably from about 0.1% to 20%, more preferably from about 0.5% to about 10% and most preferably from about 1% to about 8% by weight of the article. In one aspect, the combination of effervescent agent, effervescent activator and foaming surfactant of the invention are sufficient to provide antimicrobial benefits without any additional antimicrobial compounds. The combination can result in a low pH solution that is hostile to bacteria (e.g., anionic surfactant+sodium bicarbonate+organic or inorganic acid yielding a toilet bowl solution pH<3). In another aspect, the combination of effervescent agent, activator and foaming surfactant provides for a pH neutral environment (e.g., pH 4-7) that comprises a high salt content (e.g., sodium citrate compounds, sodium bicarbonate and anionic surfactants); deposition of high salt content ingredients can deliver significant bacteriostatic properties to surfaces. Alternatively, an antimicrobial agent can be added for enhanced biocidal activity. In a preferred embodiment, the antimicrobial active agent is a very hydrophobic compound. In one example, the antimicrobial agent can consist of a combination of raw materials, for example, an anionic surfactant such as $C_{12}$-$C_{18}$ alkyl sulfate together with an organic acid such as citric acid or glycolic acid. Alternatively, the antimicrobial agent can also comprise a quaternary ammonium compound such as cetyl pyridium chloride or didecyl dimethyl ammonium chloride. When present, the level of antimicrobial agent (not counting anionic surfactant or acid effervescent activator) is from about 0.1% to 20%, more preferably from about 0.5% to about 10% and most preferably from about 1% to about 5% by weight of the article. In still another embodiment, the article comprises perfume. The perfume may optionally comprise terpene and sequiterpene raw materials and essential oils such as thymol, geraniol, camphor, lemon oil, spearmint, and the like. Perfume is incorporated into the final powder composition at levels preferably ranging from about 0.1% to about 20%, more preferably from about 0.5% to about 10% and most preferably from about 0.5% to about 5% by weight of the article.

Preferably the perfume oil present in the encapsulated perfume particle comprises one or more perfume ingredients (perfume active agents) characterized by a boiling point (B.P.) and an octanol/water partition coefficient (P). The octanol/water partition coefficient to a perfume ingredient is the ratio between its equilibrium concentrations in octanol and in water. The preferred perfume ingredients of this invention have a B.P., determined at the normal, standard pressure of about 760 mm Hg. of about 220° C. or higher and/or higher than about 240° C. and/or higher than about 250° C., and an octanol/water partition coefficient P of about 1,000 or higher. Since the partition coefficient of the preferred perfume ingredients of this invention have high values, they are more conveniently given in the form of their logarithm to the base 10, log P. Thus, the preferred perfume ingredients of this invention have a C log P of at least 3.0 and/or a C log P greater than 3.5 and/or a C log P greater than 4.0 and/or a C log P greater than 4.5. Perfume component hydrophobic character (C log P) is particularly important in this invention as the objective is to drive perfume ingredient actives out of the water/foam and up the walls of the toilet bowl surface. High boiling point is also very important for longevity reasons. In one aspect, the perfume comprises at least 5% and/or at least 10% and/or at least 20% and/or at least 30% by weight of at least one perfume ingredient having a boiling point (760 mm Hg) of at least 220° C. and/or at least 250° C. and a calculated C log P value of at least 3.0. In another aspect, the perfume ingredient (perfume active agent) comprises at least 30% by weight of at least one perfume ingredient having a boiling point (760 mm Hg) of at least 250° C. and a calculated C log P value of at least 3.0. In yet another aspect, the perfume ingredient (perfume active agent) comprises at least 20% by weight of at least one perfume ingredient having a boiling point (760 mm Hg) of at least 220° C. and/or at least 250° C., and a calculated C log P value of at least 3.0. In a still more preferred aspect, the perfume ingredient (perfume active agent) comprises at least 20% by weight of at least one perfume ingredient having a boiling point of at least 280° C. (in one example about 280° C. and a calculated C log P value of at least 4.0.

The boiling points of many perfume ingredients are given in, e.g., "Perfume and Flavor Chemicals (Aroma Chemicals), Steffen Arctander, published by the author, 1969, incorporated herein by reference. The log P of many perfume ingredients has been reported; for example, the Pomona'92 database, available from Daylight Chemical Information Systems, Inc. (Daylight CIS), Irvine, Calif., contains many, along with citations to the original literature. However, the log P values are most conveniently calculated by the "CLOGP program, also available from Daylight CIS. Use of calculated C log P values is preferred. Additional details are provided in U.S. Pat. No. 7,569,528 incorporated herein by reference.

The perfume compositions of the present invention can also comprise some low odor detection threshold perfume ingredients. The odor detection threshold of an odorous material is the lowest Vapor concentration of that material which can be olfactorily detected. The odor detection threshold and some odor detection threshold values are discussed in, e.g., "Standardized Human Olfactory Thresholds, M. Devosetal, IRL Press Oxford University Press, 1990, and "Compilation of Odor and Taste Threshold Values Data", F. A. Fazzalari, editor, ASTM Data Series DS48A, American Society for Testing and Materials, 1978, both of said publications being incorporated herein by reference. In one aspect, at least 5%, more preferably 20% and most preferably 30% of perfume ingredients have an odor detection threshold of less than 10 ppb.

Articles for high powered cleaning preferably comprise low pH chemistry can be introduced by encasing strong liquid-form acids into zeolite or silica carrier particles (solid particles), especially particles comprising a high surface area such as Zeodent 9175 (available from Evonik). Thus, poly (maleic acid) (available from Italmatch Corporation under the tradename Dequest P9000), sulfuric acid or methane sulfonic acid (available from BASF) can be delivered as silica-based carrier particles, providing the ability for a pH<2 solution inside the toilet bowl. In another embodiment, the acidity source is a powder/particle such as sulfamic acid, sodium hydrogen sulfate or urea hydrochloride, and the like. Milder acids, preferably in powder/particle form such as citric acid, malonic acid, tartaric acid, and the like can also be used. Articles of the invention formulated to drive toilet bowl water to low pH (less than about pH 4, more preferably less than about pH 3) can advantageously comprise acidic bleaches such as potassium monopersulfate (available from DuPont under the tradename Oxone). When present, the level of acid bleach is from about 0.1% to about 20%, more preferably from about 0.5% to about 10% by weight of the article.

Articles providing an in-situ toilet bowl water pH of about 3 to about 6 or 7 will provide less overall cleaning benefits but also deliver enhanced foam height, quality and stability. Such articles are recommended for soil prevention, longer lasting hygiene and delivery of fragrance benefits. In one embodiment, the long perfume is starch-encapsulated; in another embodiment, the perfume in encased in zeolite or silica. As a means of enhancing cleaning and bleaching at these mild pH conditions, 6-phthalimido peroxyhexanoic acid (PAP, available from Solvay under the tradename Eureco) can be used. When present, the active level of PAP is from about 0.5% to about 20%, more preferably from about 1% to about 10% by weight of the article.

In one example, the active agent comprises a bleach selected from the group consisting of potassium monopersulfate, 6-phthalimido peroxyhexanoic acid, sodium percarbonate, and mixtures thereof.

Other adjuvants that can be included in the article, including but not limited to, process aids to help embed oils and other liquids, preferably no water or low water content liquids, into silica particles (for example Pluronic P123 EO-PO-EO block copolymer available from BASF), polymeric disintegrants (e.g., Disintex 75 available from Ashland Chemical), hydrotropes for enhanced dissolution speed and avoidance of viscous phases, including hexagonal and lamellar phases (e.g., urea, sodium xylene sulfonate, sodium cumene sulfonate and 2,2,4-trimethyl-1,3-pentanediol), and dyes for colouring.

In summary, the article of the invention provides a series of novel methods for cleaning, soil prevention (e.g., anti-soiling) and freshness longevity benefits in toilet bowls as follows in the below non-limiting examples of such methods.

A method of preventing soil adhesion on toilet bowl surfaces in a toilet comprising:

a) adding a fibrous web article into toilet bowl water;
b) allowing the water to rapidly disintegrate the fibrous web;

c) allowing the disintegrated fibrous web and associated active particles to be lifted above the toilet bowl water line by the water-activated effervescent foaming composition originally encased in the fibrous web;

d) allowing the disintegrated fibrous web and associated active particles to deposit on surfaces above the toilet bowl water line;

e) optionally but preferably allowing the effervescent foam to collapse and leaving the disintegrated web and associated active particles to dry out on surfaces above the toilet bowl water line.

A method of preventing soil adhesion on toilet bowl surfaces as described above wherein the active particles are chosen from the group consisting of surfactants, effervescent agents, effervescent activators, effervescent protecting agents, perfumes, enzymes, bacterial spores, soil release polymers, chelants, antimicrobial compounds, bleaches and mixtures thereof.

A method cleaning soils on toilet bowl surfaces in a toilet:

a) adding a fibrous web article into toilet bowl water;

b) allowing the water to rapidly disintegrate the fibrous web;

c) allowing the disintegrated fibrous web and associated active particles to be lifted above the toilet bowl water line by the water-activated effervescent foaming composition originally encased in the fibrous web;

d) allowing the disintegrated fibrous web and associated active particles to deposit on surfaces above the toilet bowl water line;

e) optionally but preferably allowing the effervescent foam to collapse and leaving the disintegrated web and associated active particles to dry out on surfaces above the toilet bowl water line.

A method of cleaning soils on toilet bowl surfaces as described above wherein the active particles are chosen from the group consisting of surfactants, effervescent agents, effervescent activators, effervescent protecting agents, perfumes, enzymes, bacterial spores, soil release polymers, chelants, antimicrobial compounds, bleaches and mixtures thereof.

A method of delivering immediate and long lasting freshness to areas surrounding a toilet comprising the steps of:

a) adding a fibrous web article into toilet bowl water;

b) allowing the water to rapidly disintegrate the fibrous web;

c) allowing the disintegrated fibrous web and associated active particles to be lifted above the toilet bowl water line by the water-activated effervescent foaming composition originally encased in the fibrous web;

d) allowing the disintegrated fibrous web and associated active particles to deposit on surfaces above the toilet bowl water line;

e) optionally but preferably allowing the effervescent foam to collapse and leaving the disintegrated web and associated active particles to dry out on surfaces above the toilet bowl water line.

A method of delivering immediate and long lasting freshness benefits to areas surrounding a toilet as described above wherein the active particles are chosen from the group consisting of surfactants, effervescent agents, effervescent activators, effervescent protecting agents, perfumes, enzymes, bacterial spores, soil release polymers, chelants, antimicrobial compounds, bleaches and mixtures thereof.

Test Methods

Each of the test methods referenced herein are described in detail in US 2015/0071572 A1, US 2018/02162288 A1, and/or US 2019/0233974 A1. Such test methods are incorporated by reference herein.

EXAMPLES

The following are non-limiting examples of water disintegrable, foam producing articles of the present invention. The first example is an article in the form of a co-form. The second example is an article in the form of a pouch.

Co-Form Example

A first layer of fibrous elements is spun using a first spinning beam and collected on a forming belt. The forming belt having the first layer of fibers then passes under a second spinning beam that is modified with a particle addition system. The particle addition system is capable of substantially injecting particles of particulate effervescent cleaning composition toward a landing zone on the forming belt that is directly under the fibrous elements from the second spinning beam. Suitable particle addition systems may be assembled from a particle feeder, such as a vibratory, belt or screw feeder, and an injection system, such as an air knife or other fluidized conveying system. In order to aid in a consistent distribution of particles in the cross direction, the particles are preferably fed across about the same width as the spinning die to ensure particles are delivered across the full width of the composite structure. Preferably, the particle feeder is completely enclosed with the exception of the exit to minimize disruption of the particle feed. The commingling of particles and fibrous elements on the forming belt under the second spinning beam creates a composite structure where the particle packing is dilated and fibers substantially inter-penetrate the inter-particle porosity.

The resulting composite structure has a structure as illustrated in FIG. 5. The layer of fibrous elements has a basis weight of 95 gsm. The layer of fibrous elements commingled with particles of particulate effervescent cleaning composition has a basis weight of 1960 gsm. The composite structure therefore has a basis weight of 2055 gsm.

A second composite structure is created as described above. The first and second composite structures are then combined such that the layers of each composite structure comprising commingled particles and fibrous elements are adjacent each other. The resulting water disintegrable, foam producing article therefore comprises two plies, each ply comprising two layers. The resulting article therefore comprises four layers. The article is sealed around its perimeter with an edge seal.

Table 1 below sets forth the ingredients utilized to make the fibrous elements of the soluble fibrous structure and the ingredients utilized to make the particulate effervescent cleaning composition of the article, indicating the representative amounts of each as a weight percent based on the total weight of the article.

TABLE 1

| Ingredient | Equal composite pad g target | % on treated article |
|---|---|---|
| SOLUBLE FIBROUS STRUCTURE: | | |
| Water | 0.710 | 3.468% |
| PVA420H | 0.519 | 2.532% |
| PVA403 | 0.519 | 2.532% |

TABLE 1-continued

| Ingredient | Equal composite pad g target | % on treated article |
|---|---|---|
| Sodium Laureth-1-Sulfate (SLE1S) | 1.319 | 6.438% |
| Amine Oxide (spinning) | 0.327 | 1.594% |
| Sodium Gluconate | 0.251 | 1.226% |
| Citric Acid (Anhydrous) Spinning | 0.016 | 0.080% |
| PARTICULATE EFFERVESCENT CLEANING COMPOSITION: | | |
| Citric acid (Anhydrous) fizz particles | 4.915 | 23.996% |
| Sodium bicarbonate | 2.640 | 12.890% |
| Polyvinyl pyrrolidone (particles) | 0.100 | 0.486% |
| Zeolite A | 2.275 | 11.106% |
| 70% LAS granules | 6.675 | 32.589% |
| Perfume | 0.208 | 1.014% |
| Pigment | 0.01 | 0.048% |
| TOTAL ARTICLE | 20.483 | 100% |

Pouch Example

The following is an example of a water disintegrable, foam producing article of the present invention in the form of a pouch, such as that illustrated in FIGS. 8 and 9. The soluble fibrous structure is spun using a spinning beam and fibrous elements are collected on a forming belt to form a soluble fibrous structure. Two layers of soluble fibrous structures of made and a particulate effervescent cleaning composition is disposed in the internal volume between the two layers of soluble fibrous structures. The article is sealed around its perimeter with an edge seal.

Table 2 below sets forth the ingredients utilized to make the fibrous elements of the soluble fibrous structure and the ingredients utilized to make the particulate effervescent cleaning composition of the article, indicating the representative amounts of each as a weight percent based on the total weight of the article.

TABLE 2

| Ingredient | % on treated article |
|---|---|
| SOLUBLE FIBROUS STRUCTURE: | |
| Celvol 523 | 0.2358% |
| Celvol 205 | 0.2358% |
| Glycerin | 0.1405% |
| Sorbitol | 0.0493% |
| Silwet L-77 | 0.004% |
| Pentaerythritol | 0.034178% |
| PARTICULATE EFFERVESCENT CLEANING COMPOSITION: | |
| Citric acid (Anhydrous) fizz particles | 39% |
| Potassium bicarbonate | 40% |
| Monosodium citrate | 1% |
| Silica | 5.45% |
| Benzenesulfonic acid mono-C10-16-akyl derivative sodium salt | 12.73% |
| Water | Q.S. |
| TOTAL ARTICLE | 100% |

Toilet Ring Removal Results from Toilet Mug Porcelain Surfaces Example

The toilet ring model was prepared on the porcelain surface of a toilet mug (Evelots Toilet Coffee Mug/Cup-Ceramic from Amazon Inc;) by inoculating in the toilet mugs *Cladosporium cladosporioides* (CC) (ATCC #16022) and *Serratia marcescesns* (SM) ATCC#14756. The *Cladosporium cladosporioides* (CC) is a common mold that looks like black pepper. It is non-toxic mold but can cause the most allergy symptoms. Indoors, it thrives in damp and dark environments. It prefers to grow on non-porous surfaces such as window frames, tile grout, toilet tanks and refrigerators. It is also found on fiberglass duct liners, food, paint and textiles. The *Serratia marcescens* is a gram-negative bacterium responsible for the pink to blotchy red ring (prodigiosin pigment) that often accumulates just above the water line in a toilet bowl. *Serratia marcescens* thrives in conditions that are wet and see a constant introduction of fat or phosphorous-laden materials, such as feces, soap products and/or food products. *Serratia marcescens* has been found to be responsible for many infections, including urinary tract infections.

Evelots Toilet Mugs Inoculation

Prior to inoculation, *C. Clodosporium* was grown in Sabdex (Sabouraud Dextrose) Agar Slant (Hardy Diagnostics) for 3 days from which the working inoculum was prepared by extracted 1 slant into 15 ml of 0.85% saline (Hardy Diagnostics). For the *S. marcescens* bacteria, the overnight culture was prepared in Tryptic Soy Broth (TSB) broth (Hardy Diagnostics) from which the working inoculum was prepared by diluting the overnight culture 1:10 with 0.85% saline. The final inoculum was prepared by mixing the two inoculums into ratio 1:4 (SM:CC). The growth Tryptic Soy Broth (TSB): Sabouraud dextrose broth (SDB) media (in the porcelain toilet mug was kept at 1:4 to match that of the SM:CC. The solution was incubated and stirred at low setting with a sterile magnetic stir bar at room temperature on a multi-position magnetic stirrer (YELP Scientifica). The toilet mugs were covered with an aluminum foil to prevent evaporation during the toilet ring formation and water was added every 8 to 12 hours to maintain the water level and ring formation in the toilet mug as shown in Table 3 below. A visible toilet ring was formed at 72 hrs (3 days) of incubation and by day 7 a tenacious ring had formed in all toilet mugs. After tenacious toilet ring formation, the culture media was aseptically removed, and the toilet ring was rinsed once with about 10 ml of deionized (DI) water from a wash bottle to remove loosely formed parts of the ring. The excess water was aseptically removed, and the toilet ring was tested for tenacity by rinsing with water from 15 ml syringe at moderate pressure. The toilet ring that remained intact after the second rinse was very tenacious on the porcelain surface. Excess water was removed from the bottom of the porcelain toilet mugs and was photographed prior to use.

TABLE 3

| | Toilet Ring | Control Ring |
|---|---|---|
| SM/CC Ring Development Conditions | 1:4 (TSB:SDB) for 3-7 days at r.t.p | |
| Growth media (1:4 TSB:SDB) | 10.00 | 10.00 |
| Saline (0.85%) | 3.50 | 3.50 |
| DI Water | 86.50 | 86.50 |
| *C. Clodosporium* ATCC #16022 (1 slant extraction/15 ml of 0.85% saline | 3.25 | — |
| *S. marcescens* ATCC# 14756 (1:10 dilution in 0.85% saline) | 0.25 | — |
| Total Volume (ml) | 100.00 | 100.00 |

PVOH Toilet Pods Treatments

Four (4) prototype treatments were tested, 3 with polyvinyl alcohol (PVOH) and 1 without PVOH. Briefly, PVOH comes from 3 sources: web/fibers of the invention (Product 1), film (Product 2), and raw material powder (Product 3).

Product 3 was previously prepared as per vendors instructions (allow about 90 min to prepare prior to use). Specifically, prior to use of Product 3, the PVOH raw material is added to the 100 mL deionized water by heating/holding solution at 85° C. for 1 hr and used within few hours. All PVOH Products 1-3 were tested within one hour. The control Product 4 did not contain PVOH. To the porcelain toilet mugs with toilet ring about 100 ml of DI water was added and a magnetic stirrer was placed at the bottom of each mug. To each Porcelain Toilet Mug the corresponding PVOH treatments were added as shown in Table 4 below. After overnight incubation at room temperature, all the solution from the porcelain toilet mugs was aseptically removed and the toilet ring was observed, and photographs of the toilet were taken and compared photographs of the same before treatment. The visual Toilet ring visual

TABLE 4

| Ingredients | Porcelain Toilet Mug #1 Product 1 (gm/100 ml) | Porcelain Toilet Mug #2 Product 2 (gm/100 ml) | Porcelain Toilet Mug #3 Product 3 (gm/100 ml) | Porcelain Toilet Mug #4 Product 4 (gm/100 ml) |
|---|---|---|---|---|
| Dodecylbenzene sulfonate (LAS), blown powder | 0.5 | 0.5 | 0.5 | 0.5 |
| Sodium bicarbonate ($Na_2CO_3$) | 1.57 | 1.57 | 1.57 | 1.57 |
| Citric Acid (CA) | 1.53 | 1.53 | 1.53 | 1.53 |
| PVA fibers (celvol 205, 523, and Silwet) | 0.0185 (~0.019) | — | — | — |
| PVA film (cast from Celvol 205) | — | 0.0185 (~0.019) | — | — |
| Celvol 205 PVOH (powder dissolved in water) | — | | 0.0185 (~0.019) | — |

TABLE 5

| | Product 1 | Product 2 | Product 3 | Product 4 |
|---|---|---|---|---|
| Toilet ring removal (Visual Grading) | Complete removal | Noticeable removal | Noticeable removal | No removal |
| Toilet Ring Removal (1-5 Scale) | 5 | 3 | 3 | 1 |

grading was done (5=Complete removal, 4=Significant removal, 3=Noticeable removal, 2=Hardly noticeable removal, 1=No Removal) as shown in Table 5 above.

Evaluation of the Logarithmic Reduction and Mold Growth

Prior to the treatment with the products 1-4, the toilet ring was swabbed with 6-inch cotton swab. Specifically, two Puritan Sterile Standard Cotton Swab (Model #: 25-806 2WC) were used to collect the sample from the toilet ring by pressing gently and rolling the cotton swab over the entire circumference of the ring (or ring region). One of the two cotton swabs was broken into glass tube of 9 mL of 0.85% saline and vortexed for 10 sec to extract the *S. marcescens* bacteria from the swab followed by a total of 8 serial dilutions (in step of 1:10 each) in saline. From the dilutions, 1 ml of even numbered dilutions ($2^{nd}$, $4^{th}$, $6^{th}$ & $8^{th}$) corresponding to $10^{-2}$, $10^{-4}$, $10^{-6}$ and $10^{-8}$ were plated on TSA plates with overnight incubation at 35° C. The logarithmic reduction (LR) was reported by counting the numbers of colony forming units (cfu/mL) for before and after treatment. The plates with less than 10 cfu/ml or more than 300 cfu/mL were not considered. The second cotton swab was used on MoldCheck Test Kit (Part number MC010, Purchased from Home Depot, Cincinnati, OH USA) for *C. cladosporioide*. The mold sensitive film on the MoldCheck Kit was opened and a cross mark was made on the mold sensitive film. A drop of mold growth media was added at the center of the cross following manufacturer's instructions then closed with provided lid for mold to develop at room temperature. The mold development and progress were checked daily up to 7 days when the final and confirmatory results were recorded. The procedure was

TABLE 6

Figure 13:
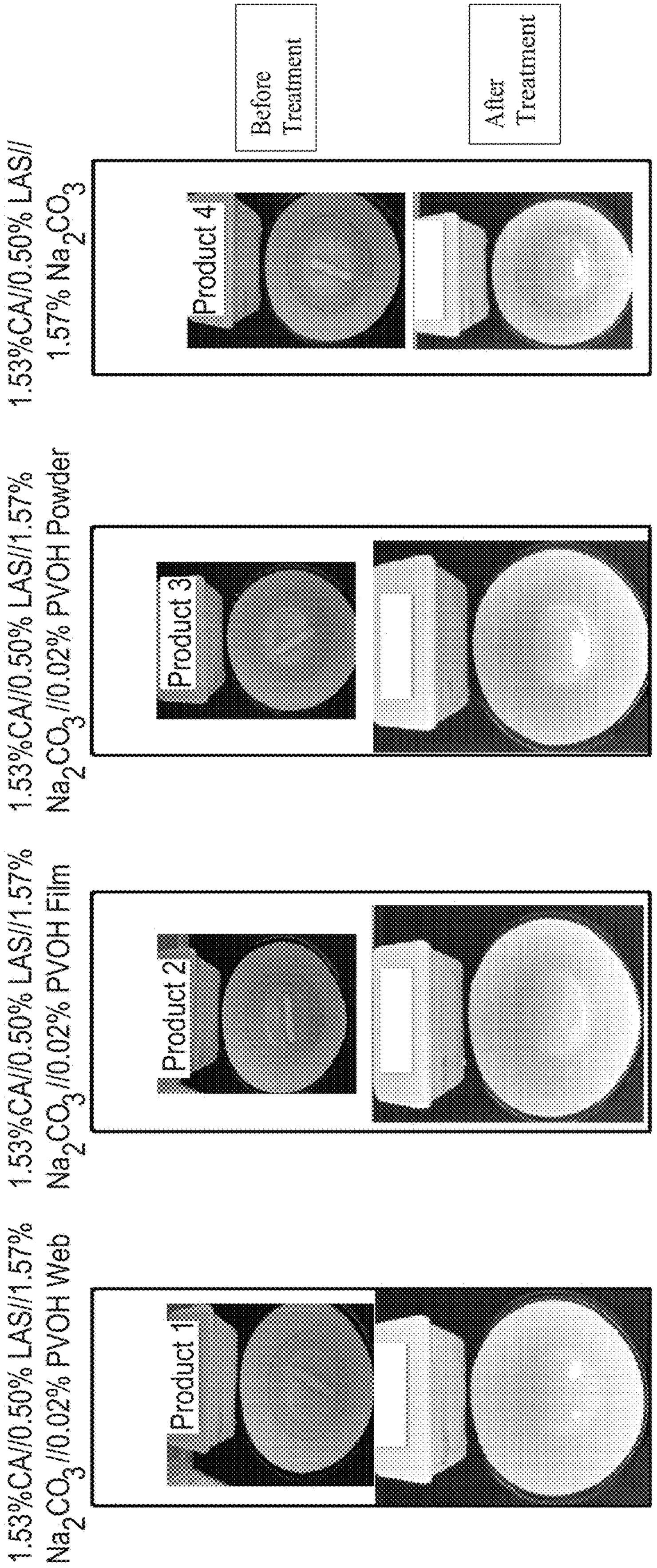
FIG. 13 show images of toilet bowls showing the Evaluation of the Logarithmic Reduction and Mold Growth.

| | Test Time Point | Product 1 | Product 2 | Product 3 | Product 4 |
|---|---|---|---|---|---|
| Bacteria Log Count (cfu/mL)) *Serratia marcescens* (N = 2) | Before Treatment | 9.43 | 6.00 | 8.42 | 9.83 |
| | After Treatment | 2.30 | 3.04 | 8.08 | 7.83 |
| | Log Reduction | 7.12 | 2.94 | 0.34 | 2.00 |
| Mold: *Cladosporium cladosporioides* (N = 2 | Before Treatment | Yes | Yes | Yes | Yes |
| | After Treatment | None | Yes (slight) | Yes | Yes |

repeated with after treatment to determine the LR and mold growth for all the 4 products (see Table 6 and FIG. 13).

Conclusions

Despite the fact that Products 1-3 are chemically identical compositions, physical form of polyvinyl alcohol (fibrous web vs. film vs. powder) drives unexpectedly different cidal efficacy results. Product 1 (chemistry particles with fibrous web of the invention) is clearly most effective in driving antimicrobial activity vs. microorganisms formed just above the water line of the Evelots toilet coffee mugs, delivering a 7 log reduction vs. *Serratia marcescens* and complete removal of *Cladosporium cladosporium* mold. The activity provided the identical composition delivered by a polyvinyl alcohol film (Product 2) or polyvinyl alcohol powder particles (Product 3) is inferior. A comparion of the results achieved by Product 1 vs. Product 4 (no polyvinyl alcohol) also show the benefits associated with use of the fibrous web pouch (fibrous structure pouch or article) of the invention.

Left-Behind Perfume Ingredient Analysis Experiment

Fibrous Web Making:

Melt making: Into a stainless steel tank, 4 kg of Sorbitol was dissolved into 60 kg of water under stirring. After that, 36 kg of the PVOH resin (Selvol 205) was dispersed into the water under constant stirring. The temperature of the tank was raised to 80 C and held there for 2 hours under stirring to ensure the full dissolving of the PVOH resin. After that, the PVOH solution was degassed and cooled down for the fiber spinning process.

Fiber spinning process non-limiting example: The PVOH solution is then spun into a plurality of fibrous elements as follows.

A pressurized tank, suitable for batch operation is filled with a suitable the PVOH solution. A pump, such as a Zenith®, type PEP II, having a capacity of 5.0 cubic centimeters per revolution (cc/rev), manufactured by Parker Hannifin Corporation, Zenith Pumps division, of Sanford, N.C., USA is used to facilitate transport of the PVOH solution to a spinning die. The flow of the PVOH solution from the pressurized tank to the spinning die is controlled by adjusting the number of revolutions per minute (rpm) of the pump. Pipes are used to connect the pressurized tank, the pump, and the spinning die.

The spinning die has several rows of circular extrusion nozzles (fibrous element-forming holes) spaced from one another at a pitch P of about 1.524 millimeters (about 0.060 inches). The nozzles have individual inner diameters of about 0.305 millimeters (about 0.012 inches) and individual outside diameters of about 0.813 millimeters (about 0.032 inches). Each individual nozzle is encircled by an annular and divergently flared orifice (concentric attenuation fluid hole) to supply attenuation air to each individual melt capillary. The PVOH solution extruded through the nozzles is surrounded and attenuated by generally cylindrical, humidified air streams supplied through the orifices.

Attenuation air can be provided by heating compressed air from a source by an electrical-resistance heater, for example, a heater manufactured by Chromalox, Division of Emerson Electric, of Pittsburgh, Pa., USA. An appropriate quantity of steam was added to saturate or nearly saturate the heated air at the conditions in the electrically heated, thermostatically controlled delivery pipe. Condensate was removed in an electrically heated, thermostatically controlled, separator.

The embryonic fibrous elements are dried by a drying air stream having a temperature from about 149° C. (about 300° F.) to about 315° C. (about 600° F.) by an electrical resistance heater (not shown) supplied through drying nozzles and discharged at an angle of about 90 degrees relative to the general orientation of the non-thermoplastic embryonic fibers being extruded. The dried embryonic fibrous elements are collected on a collection device, such as, for example, a movable foraminous belt or patterned collection belt. The addition of a vacuum source directly under the formation zone may be used to aid collection of the fibrous elements.

TABLE 7

| Raw Material | Composition (%) |
|---|---|
| PVOH (Selvol 205) | 90.0000 |
| Sorbitol | 10.0000 |
| Total | 100.0000 |

Fibrous Web Composition:

Fibrous Web Pouch Making:

Using a clicker press and rule die cutter, cut the fibrous web film into 15 cm×25 cm sections. Place these sections into a 25 C+50% RH room for at least 30 minutes prior to making pouches. Stack 2 sections on top of each other, and a similarly sized (or larger) Teflon sheet on top and bottom of the stacked web sections engage a heated seal tooling to delineate the 15 cm×25 cm section stacked webs into smaller 6 cm×6 cm distinct sections sealed on three sides.

Remove the sheet of Teflon from the sealed web, and using scissors or a precision knife+ruler, carefully cut out the pouches by cutting along the middle of the sealed edges of the web (~0.5 mm thick) along the middle of the sealed areas. Throw out excess fibrous web material.

Perfume and Surfactant Particle Making Procedure

'Blue Light' perfume comprises about 30 perfume ingredients of which about 70% have a boiling point above 250° C., about 79% have a C log P greater than 3, and about 35% have C log P greater than 4.0. Additionally, about 56% of the Blue Light perfume raw materials have a boiling point greater than 250° C. and a C log P greater than 3, and about 20% of the raw materials have a boiling point greater than 250° C. and a C log P greater than 4.

'Blue Light' perfume particles are made by blending the perfume oil (35%) into Zeodent 9175 silica particles (50%) and Pluronic P123 (15%) as follows: 7 grams of perfume and 3 grams of Pluronic P123 (BASF) are mixed in together in a glass jar to form a clear homogeneous solution. The homogenous solution is then added to into a second glass jar containing 10 grams of Zeodent 9175 (Evonik) silica particles. The combined solution and particles are then mixed with a speed mixer to form as free flowing perfume particle.

Disodium cocoyl glutamate (DSCG) particle was produced by feeding disodium cocoyl glutamate EVERSOFT UCS-50-SG (Sino Lion)+sodium carbonate solution (70% distilled water, 24% Eversoft UCS-50SC, 6% sodium carbonate) into a rotary Niro atomizer having an incoming temperature of 200° C. and an outlet temperature of 105° C. From approximately 4.7 kg of DSCG raw material solution, about 2.5 kg of blown powder were recovered.

Effervescent Foaming Composition and Article

The effervescent foaming composition is formed by sequentially blending together sodium bicarbonate powder (Arm & Hammer) DSCG particle, Citrocoat N (Jungbunzlauer International AG) and Blue Light perfume particle in a mixer. The final product comprises 1.1% disodium cocoyl glutamate particle, 4.1% perfume particle, 47.4% Citrocoat N particle and 47.4% sodium bicarbonate. Thirty five grams of the blended effervescent foaming composition are placed inside a pre-made fibrous web pouch sealed on three sides, and the fourth side is then sealed using a Midwest Pacific impulse heat sealer to complete the article. Pouches are kept at low humidity conditions (40% RH, 20° C.-25° C.) prior to use.

Testing is run in a laboratory with 8 air exchanges per hour. Wide mouth one gallon glass jars (height ~25.5 cm outer diameter, width ~14 cm, jar threaded opening diameter ~8 cm) fitted with screw top plastic lids are used throughout the experiment. A hole is drilled (~0.8 cm diameter) in the center of each of the lids, and a 15 mm foam septum (topac's instrumentsonline.com septa catalog #94301) used for analytical sampling (vide infra) is centered and bonded on the plastic lid above each drilled hole.

Test Product Open Air Exposure and Simulated 'Flushing' Methodology:

Two thousand grams (i.e., 2 liters) of tap water (pH~7.5, hardness ~7 gpg) are transferred from a clean plastic container into each of six one-gallon test jars (3 experimental, 3 control) by means of a VWR 10 ml polystyrene serological pipet (catalog#89130-898) fitted into VWR PVC tubing (¼ inch I.D.×⅜ inch O.D). The transfer of water is achieved using a peristaltic pump (Masterflex model 7518-50 console drive (Cole-Parmer Instrument Company, Chicago, Illinois, USA). Pre-made pouches comprising effervescent foaming composition (see above) are gently placed inside each of three of the water-filled glass jars. Almost immediately, effervescent foam rises above the water line of the jars. Maximum height is achieved in about 5 minutes and the foam height persists for about 1 hour, after which it begins collapse. At the 3 hour mark, foam in each of the experimental test product jars has completely collapsed. Effervescent foaming composition particles weighed out into plastic bags (35 grams), and stored at identical conditions as the pouch-based compositions prior to use, are also gently poured out of into each of the three remaining tap water-charged one-gallon jars. Foam is produced almost instantaneously and rises up each of the three jars even faster than the pouch-based composition, achieving about the same height. At the 3 hour mark, the foam from the control product jars has also completely collapsed. Visual inspection readily confirms that the experimental test products (i.e., compositions of the invention comprising the fibrous web pouch) produce significantly more residue above the water line, including a highly perceptible though uneven film vs. what is produced by the control products (i.e., compositions not encased in the fibrous web pouch). The control product jar residue above the water line consists mainly of silica particles left between the water-foam interface line and at the highest points achieved by the foam; there is also no film.

Following the 3 hour foam generation/collapse cycle, the water and particles remaining at the bottom of the jars (mainly silica) are aspirated out, and the gallon jars are then all refilled with an equivalent volume (e.g., 2 liters) of fresh tap water. The refilling procedure is made to simulate water replenishment in a toilet bowl following a toilet bowl flush. With the peristatic pump running, tap water is evenly washed down along the walls of the jar by moving the tip of the serological pipet quickly in circular motions along the jar neck interior edges so as to refill the jar with 2 liters of water (~30 seconds). The jars are left open to the air for 21 hours. At that point, water (and any remaining particles) are aspirated out, and plastic lids with septa are fastened on one of the experimental test product jars (i.e., pouch-based product) and on one control test product jar (i.e., chemistry particles only product), and the jars are set aside for perfume component analysis (flush #1). The remaining four test product jars (two experimental test product jars and two control test product jars) have water aspirated out and are then refilled with fresh tap water, and are again allowed to stand open to the environment (i.e., with direct exposure to air) for another 21 hours. Thereafter, water is aspirated out from two of the test product jars (one experimental and one control) followed by plastid lid fastening (flush #2). The remaining 2 test jars (one experimental+one control) are again emptied and refilled in analogous as described above, and allowed to stand open to the environment (i.e., with direct exposure to air) for another 21 hours. Thereafter, water is aspirated out, and the jars are closed to the external environment using the septum-containing plastic lids (flush #3). In summary, the six test products for perfume analysis are made as follows as set forth in Table 8:

TABLE 8

| Experimental (free flowing particles in pouch) | Control (free flowing particles, no pouch) |
|---|---|
| Simulated flush #1 (after 3 + 21 hours) | Simulated flush #1 (after 3 + 21 hours) |
| Simulated flush #2 (after additional 21 hours) | Simulated flush #2 (after additional 21 hours) |
| Simulated flush #3 (after additional 21 hours) | Simulated flush #3 (after additional 21 hours) |

Solid Phase Micro Extraction (SPME) GCMS Method for Analyzing Perfume Components in the Gas Phase:

This method is used to analyze perfume components in the headspace using Gas Chromatography Mass Spectrometry. This procedure is suitable for relative concentration comparisons of perfume components in the headspace in a sealed container, such as glass jars. Suitable instruments for conducting this type of GC-MS analyses includes equipment such as: Agilent Gas Chromatograph model 7890 series GC (Agilent Technologies Inc., Santa Clara, California, U.S.A.); Agilent Model 5977N Mass Selective Detector (MSD) transmission quadrupole mass spectrometer (Agilent Technologies Inc., Santa Clara, California, U.S.A.); Multipurpose AutoSampler MPS2 equipped with headspace SPME sampling function (GERSTEL Inc., Linthicum, Maryland, U.S.A); and 5%-Phenyl-methylpolysiloxane Column J&W DB-5 (30 m length×0.25 mm internal diameter×0.25 μm film thickness) (Agilent Technologies Inc., Santa Clara, California, U.S.A.).

One skilled in the art will understand that in order to analyse perfume components in the headspace, the analytical steps may involve the use of external reference standards to verify retention times and mass spectrum for suitable perfume components.

Sample Preparation:

Simulated toilet-flush samples are prepared in 4-liter glass jars equipped with a septum cap suitable for headspace SPME sampling. The headspace in the jar is equilibrated at ambient temperature for at least 2 hours before SPME sampling. SPME sampling was conducted manually at ambient temperature for 30 minutes followed by thermal desorption at 250° C. in the GCMS inlet for 7 minutes using 1 to 20 split ratios.

GCMS Instrument Parameters:

GC oven was kept at 40° C. for 1 minutes followed by 8° C./minutes programing to 250° C. and keep at 250° C. for 5 minutes to bake out any residual materials. Mass spectrometry was programmed to a scan range of 35 to 300 mass to charge ratios using full scan mode.

Data Analysis:

Perfume components of interest were identified using NIST17 MS library (Agilent Technologies Inc., Santa Clara, California, U.S.A). Total ion counts (TIC) for each monitored perfume components were used to make comparisons between test samples and the corresponding controls. In this experiment, the following perfume components was monitored across the range of least volatile to most volatile components in the perfume of interest: Gamma-terpinene, Verdox, Alpha-Cedrene, Beta-Cedrene, Ethyl-Linalool, Methyl Dihydrojasmonate, Cedrol, and Iso E Super.

Analytical Results:

The ratio of total perfume ingredients shown in Tables 9 and 10 (experimental to control) test products for flush #1 is 1.75:1 and for flush #3 it is 7:1 (the control for flush #2 showed virtually no perfume left behind). Significantly more perfume components remain on walls of the jars treated with fibrous web-based compositions for each of the 3 flushes than what remains for the jars treated with free flowing particles not encased in a fibrous web pouch. Moreover, the ratio of specific perfume ingredients is very telling:

TABLE 9

1st Simulated Flush Results: Left Behind Perfume Raw Material Data

| Perfume Ingredient | Boiling Point | C log P | ODT Prediction* | Ion Count No Pouch† | Ion Count w/Pouch† |
|---|---|---|---|---|---|
| Gamma terpinene | 172° C. | 4.1 | 65 ppb | <10 | <10 |
| Cedrene** | 278° C. | 5.9 | 4.8 ppb | 580 | 550 |
| Verdox | 223° C. | 4.5 | 1.8 ppb | 70 | 50 |
| Ethyl linalool | 223° C. | 3.6 | 7.1 ppb | 100 | 80 |
| Iso E Super | 315° C. | 5.2 | 0.2 ppb | 80 | 490 |
| Cedrol | 331° C. | 4.5 | 0.3 ppb | 20 | 310 |
| Methyl dihydro jasmonate | 323° C. | 2.9 | 1.2 ppb | 15 | 340 |

TABLE 10

| 3rd Simulated Flush Results: Left Behind Perfume Raw Material Data | | | | | |
|---|---|---|---|---|---|
| Perfume Ingredient | Boiling Point | C log P | ODT Prediction* | Ion Count No Pouch† | Ion Count w/Pouch† |
| Gamma terpinene | 172° C. | 4.1 | 65 ppb | <5 | <5 |
| Cedrene** | 278° C. | 5.9 | 4.8 ppb | 160 | 300 |
| Verdox | 223° C. | 4.5 | 1.8 ppb | 10 | 30 |
| Ethyl linalool | 223° C. | 3.6 | 7.1 ppb | ND | 110 |
| Iso E Super | 315° C. | 5.2 | 0.2 ppb | 20 | 720 |
| Cedrol | 331° C. | 4.5 | 0.3 ppb | ND | 460 |
| Methyl dihydro jasmonate | 323° C. | 2.9 | 1.2 ppb | ND | 130 |

*ODT=Odour Detection Limit prediction by CADmol software **alpha & beta cedrene combined; † actual ion count is multiplied by a factor of 1,000,000 for all perfume ingredients Perfume raw material hydrophobicity is clearly driving the higher content of left-behind perfume ingredients observed in for fibrous web. After three simulated flushes and over 60 hours exposure to the open environment in a room providing 8 air changes per hour, virtually all perfume raw materials for the chemistry powder-only leg have been lost to environmental factors (air and simulated flushes). For the article comprising fibrous pouch with encased effervescent foam composition, low boiling materials are also lost to the environment, but more hydrophobic perfume ingredients, with high boiling perfume wither high C log P values, are retained. The data highlight the importance of hydrophobic active selection for entrainment on hard surfaces, and this requires use of the fibrous web of the present invention.

Foam Height Measurements

Two thousand grams of de-ionized water (e.g., 2 liters) are charged into a 4-liter beaker (VWR catalog #10754-762). An article of the invention comprising fibrous web and foaming particles is placed on the water, and effervescent foam is allowed to fill the area above the water-air interface. The foam is allowed to collapse, and foam height is measured as the maximum vertical distance between the water line and the highest point of residue left by the foam on the beaker. The following compositions set forth in Table 11 below are made for foam height composition measurements, and then encased into 6 cm×6 cm fibrous web pouches (polyvinylalcohol×sorbitol).

TABLE 11

| Ingredients & Weights | 1 | 2 | 3 | 4 |
|---|---|---|---|---|
| Sodium Bicarbonate (Arm & Hammer) (g) | 16.6 | 16.5 | 16.4 | 16.3 |
| Citrocoat N (Jungbunzlauer) (g) | 16.6 | 16.5 | 16.4 | 16.3 |
| Blue Light Perfume Particle (g) | 1.5 | 1.5 | 1.5 | 1.5 |
| Sulfonated APG (Suga Nate 160 Dry, Colonial) (g) | 0.4 | 0.6 | 0.8 | 1.0 |
| Total Particle Weight (g) | 35.0 | 35.0 | 35.0 | 35.0 |
| Foam Height (maximum cm) | 10 | 9 | 10 | 11.5 |
| Foam collapse time (hours) | 1 | 1.8 | >2 | >2 |

Excellent foam heights are achieved with a lone (though highly preferred) foaming surfactant of the invention, sulfonated APG. While a 10 cm foam height is achieved using only about 1% surfactant (0.4 g/35.0 g=1.1%), higher concentrations provide longer lasting foam stability. Those skilled in the art will recognize that an alternative option is to use a zwitterionic or nonionic co-surfactant.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular examples of the present disclosure have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method of cleaning soil from a toilet bowl containing water, the method comprising the steps of:

1) adding an active agent-containing a water disintegrable, particle containing foam producing pouch article comprising:

i) a soluble fibrous structure comprising one or more filaments, wherein the soluble fibrous structure encases;

ii) a particulate effervescent cleaning composition, wherein the particulate effervescent foaming composition comprises:

a) a particulate foaming surfactant selected from the group consisting of linear C11-C12 alkylbenzene sulfonate, sodium C12-C16 alkyl methyl taurate, sodium alkyl sulfate, C12-C18 alpha olefin sulfonate, disodium lauroyl or cocoyl glutamate, sulfonated C12-C16 alky polyglucoside, lauryl sulfosuccinate, C12-C16 dimethyl amine oxide, lauramido propyl betaine, cocamido propyl betaine, lauramido propyl hydroxyl sultaine, cocamido propyl hydroxyl sultaine, and mixtures thereof;

b) an effervescent agent selected from the group consisting of sodium bicarbonate, sodium carbonate, and mixtures thereof c) an effervescent activator selected from the group consisting of citric acid, tartaric acid, sulfamic acid, sulfuric acid on silica carrier, and mixtures thereof;

d) an effervescent protecting agent selected from the group consisting of silica, zeolite, and mixtures thereof; and e) an active agent selected from the group consisting of perfumes, soil release polymers, enzymes, bacterial spores, chelants, antimicrobial compounds, bleaches, and mixtures thereof;

to the water within the toilet bowl; wherein the fibrous structure exhibits a basis weight of greater than 10 $g/m^2$ to about 5000 $g/m^2$;

wherein the water disintegrable, particle containing foam producing pouch article exhibits a dry density of less than water;

2) allowing the water to rapidly disintegrate the article to produce a particle containing foam while the article floats on the water within the toilet bowl;

3) allowing particles of the effervescent foaming composition to deposit on walls of the toilet bowl surface above the water line of the toilet bowl; wherein A) the particle containing foam producing pouch article exhibits an undissolved particle residue height of at least 1 cm, as measured by the foam height method described herein;

B) the undissolved particle residue height of at least 1 cm persists for about 1 hour; and C) the particle containing foam particulate residue deposited on the walls of the toilet bowl comprises particles of unreacted or partially reacted particulate foaming surfactant previously suspended in the foam.

2. The method of claim 1 wherein the active agent comprises a perfume comprising at least 30% by weight of at least one perfume ingredient having a boiling point greater than about 250° C. and a calculated C log P value greater than about 3.0.

3. The method of claim 1 wherein the active agent comprises a bleach selected from the group consisting of potassium monopersulfate, 6-phthalimido peroxyhexanoic acid, sodium percarbonate, and mixtures thereof.

4. The method of claim 1, wherein the soluble fibrous structure forms a pouch which encases the particulate effervescent cleaning composition.

5. The method of claim 1, wherein the particulate effervescent cleaning composition is commingled with the soluble fibrous structure to form a coform structure.

6. The method of claim 1, wherein the foam comprises particles of particulate surfactant suspended in the foam.

* * * * *